United States Patent
Ko et al.

(10) Patent No.: US 12,010,762 B2
(45) Date of Patent: *Jun. 11, 2024

(54) WIRELESS COMMUNICATION METHOD USING BSS IDENTIFIER AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Geonjung Ko, Seoul (KR); Woojin Ahn, Gyeonggi-do (KR); Juhyung Son, Gyeonggi-do (KR); Jinsam Kwak, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,424

(22) Filed: Feb. 12, 2022

(65) Prior Publication Data

US 2022/0167461 A1  May 26, 2022

Related U.S. Application Data

(63) Continuation of application No. 16/590,302, filed on Oct. 1, 2019, now Pat. No. 11,284,475, which is a
(Continued)

(30) Foreign Application Priority Data

| Apr. 14, 2017 | (KR) | 10-2017-0048762 |
| Nov. 4, 2017 | (KR) | 10-2017-0146356 |
| Nov. 4, 2017 | (KR) | 10-2017-0146358 |

(51) Int. Cl.
*H04W 80/08* (2009.01)
*H04W 72/0446* (2023.01)
(Continued)

(52) U.S. Cl.
CPC ....... *H04W 80/08* (2013.01); *H04W 72/0446* (2013.01); *H04W 72/1268* (2013.01); *H04W 74/0866* (2013.01); *H04W 76/11* (2018.02)

(58) Field of Classification Search
CPC . H04W 80/08; H04W 76/11; H04W 72/0446; H04W 72/1268; H04W 74/0866;
(Continued)

(56) References Cited

U.S. PATENT DOCUMENTS

| 2016/0174254 A1 | 6/2016 | Hedayat |
| 2016/0212246 A1 | 7/2016 | Seok |

(Continued)

FOREIGN PATENT DOCUMENTS

| CN | 104350799 | 2/2015 |
| CN | 106487737 | 3/2017 |

(Continued)

OTHER PUBLICATIONS

IEEE: doc.: IEEE 802.11-16/0024r1, Mar. 2016 (Year: 2016).*
(Continued)

*Primary Examiner* — Mohammed S Chowdhury
(74) *Attorney, Agent, or Firm* — Ladas & Parry, LLP

(57) ABSTRACT

Provided is a wireless communication terminal that wirelessly communicates. The wireless communication terminal includes a transceiver configured to transmit and receive wireless signals; and a processor configured to process the wireless signals. The processor is configured to: generate a trigger frame for triggering uplink transmission based random dom access of at least one wireless communication terminal,
(Continued)

and insert the trigger frame into a physical layer protocol data unit (PPDU) to transmit the PPDU.

4 Claims, 29 Drawing Sheets

Related U.S. Application Data continuation of application No. PCT/KR2018/004397, filed on Apr. 16, 2018.

(51) Int. Cl.
*H04W 72/1268* (2023.01)
*H04W 74/08* (2009.01)
*H04W 76/11* (2018.01)

(58) Field of Classification Search
CPC . H04W 74/0833; H04W 84/12; H04W 74/06; H04W 52/02; H04W 52/0216; H04W 28/06; H04W 74/002; Y02D 30/70
See application file for complete search history.

(56) References Cited

U.S. PATENT DOCUMENTS

| | | | |
|---|---|---|---|
| 2016/0330742 | A1 | 11/2016 | Li et al. |
| 2016/0353275 | A1 | 12/2016 | Liu et al. |
| 2017/0070962 | A1 | 3/2017 | Wang et al. |
| 2017/0325178 | A1 | 11/2017 | Verma et al. |
| 2017/0325202 | A1* | 11/2017 | Verma ............... H04L 5/0053 |
| 2017/0367129 | A1* | 12/2017 | Yang ............... H04W 24/02 |
| 2018/0014327 | A1* | 1/2018 | Park ............... H04W 74/006 |
| 2018/0110046 | A1* | 4/2018 | Patil ............... H04W 72/0446 |
| 2018/0146426 | A1* | 5/2018 | Park ............... H04W 52/0229 |
| 2018/0176865 | A1* | 6/2018 | Kim ............... H04W 74/06 |
| 2018/0184285 | A1 | 6/2018 | Patil et al. |
| 2018/0227950 | A1 | 8/2018 | Iwai et al. |
| 2018/0242355 | A1 | 8/2018 | Lou et al. |
| 2019/0182864 | A1 | 6/2019 | Huang et al. |
| 2020/0037395 | A1 | 1/2020 | Ko et al. |
| 2021/0127427 | A1 | 4/2021 | Noh et al. |

FOREIGN PATENT DOCUMENTS

| | | |
|---|---|---|
| KR | 10-2017-0038746 | 4/2017 |
| KR | 10-2426755 | 7/2022 |
| WO | 2016/024770 | 2/2016 |
| WO | 2016/112306 | 7/2016 |
| WO | 2016/186469 | 11/2016 |
| WO | 2016/195402 | 12/2016 |
| WO | 2018/190697 | 10/2018 |

OTHER PUBLICATIONS

IEEE 802.11-16/1415r2; IEEE P802.11—Wireless LANs; Author(s): Abhishek et al.; Affiliation: Qualcomm; Nov. 2016 (Year: 2016).*
IEEE P802.11 Wireless LANs; Proposed resolution for comments related to Section 27.11.4 (BSS Color; Author(s): Abhishek et al.; Affiliation: Qualcomm; Mar. 2017. (Year: 2017).*
International Search Report for PCT/KR2018/004397 dated Aug. 7, 2018 and its English translation from WIPO (now published as WO 2018/190697).
Written Opinion of the International Searching Authority for PCT/KR2018/004397 dated Aug. 7, 2018 and its English translation by Google Translate (now published as WO 2018/190697).
Geonjung Ko et al., "Text for Intra-PPDU Power Save for a Multiple BSSID Set Case", WILUS, IEEE 802.11-16/1205r0, Sep. 12, 2016. pp. 1-2.
Geonjung Ko et al., "Discussions on Partial BSS Color", WILUS, IEEE 802.11-16/0918r1; Sep. 12, 2016. Slides 1-14.
International Preliminary Report on Patentability (Chapter I) for PCT/KR2018/004397 dated Oct. 15, 2019 and its English translation from WIPO (now published as WO2018/190697).
Office Action for Indian Patent Application No. 201927042859 dated Mar. 25, 2021.
Office Action for Korean Patent Application No. 10-2019-7028525 dated Sep. 9, 2020 and its English translation from Global Dossier.
Office Action dated Sep. 27, 2021 for Chinese Patent Application No. 201880024847.X and its English translation provided by Applicant's foreign counsel.
Khan, Gul Zameen et al.: "On the Field Level Loss of a VHT PPDU in a MIMO-OFDM System for a WiFi Direct 802.11ac WLAN", Conference Title: Proceedings of the 14th International Conference on Frontiers of Information Technology Proceedings—FIT 2016, pp. 1-6.
Graham Smith: "TG ax: A Unified Approach to Spatial Reuse", SR technologies, IEEE 802.11-16/1064r3, Oct. 2016, pp. 1-14.
Jianhan Liu et al.: "AID Assign Rule Based on BSS Color and HE Operation Element", Mediatek, USA, IEEE 802.11-16/0364r3, Mar. 11, 2016, Slides 1-19.
Notice of Allowance dated Nov. 8, 2021 for U.S. Appl. No. 16/590,302 (now published as US 2020/0037395).
Office Action dated Jun. 28, 2021 for U.S. Appl. No. 16/590,302 (now published as US 2020/0037395).
Notice of Allowance dated Sep. 28, 2021 for Korean Patent Application No. 10-2021-7020224 and its English translation provided by Applicant's foreign counsel.
Office Action dated Jun. 30, 2022 for Chinese Patent Application No. 201880024847.X and its English translation provided by Applicant's foreign counsel.
Office Action dated Mar. 3, 2022 for Chinese Patent Application No. 201880024847.X and its English translation provided by Applicant's foreign counsel.
Office Action dated Jan. 23, 2023 for U.S. Appl. No. 17/670,419.
Office Action dated Apr. 27, 2023 for Korean Patent Application No. 10-2022-7025792 and its English translation provided by Applicant's foreign counsel.
Office Action dated May 18, 2023 for U.S. Appl. No. 17/670,419.
Notice of Hearing dated Aug. 21, 2023 for Indian Patent Application No. 201927042859.
Office Action dated Sep. 8, 2023 for U.S. Appl. No. 17/670,419.

* cited by examiner

| Frame Control | Duration | RA | TA | Common Info | User Info | ... | User Info | Padding | FCS |
|---|---|---|---|---|---|---|---|---|---|
| 2 | 2 | 6 | 6 | 8 or more | 5 or more | | 5 or more | variable | 4 |

Octets:

*FIG. 7*

(a) Common Info

| Trigger Type | Length | Cascade Indication | CS Required | BW | GI and LTF Type | MU-MIMO LTF Mode | Number of HE-LTF Symbols | STBC |
|---|---|---|---|---|---|---|---|---|
| B0 B3 | B4 B15 | B16 | B17 | B18 B19 | B20 B21 | B22 | B23 B25 | B26 |

Bits: 4, 12, 1, 1, 2, 2, 1, 3, 1

| LDPC Extra Symbol | AP TX Power | Packet Extension | Spatial Reuse | Doppler | HE-SIG-A Reserved | Reserved | Trigger Dependent Common Info |
|---|---|---|---|---|---|---|---|
| B27 | B28 B33 | B34 B36 | B37 B52 | B53 | B54 B62 | B63 | |

Bits: 1, 6, 3, 16, 1, 9, 1, variable

(b) User Info

| AID12 | RU Allocation | Coding Type | MCS | DCM | SS Allocation | Target RSSI | Reserved | Trigger Dependent User Info |
|---|---|---|---|---|---|---|---|---|
| B0 B11 | B12 B19 | B20 | B21 B24 | B25 | B26 B31 | B32 B38 | B39 | |

Bits: 12, 8, 1, 4, 1, 6, 7, 1, variable

*FIG. 8*

(a) User Info for the associated STA(s)

| B0  B11 | B12  B19 | B20 | B21  B24 | B25 | B26  B31 | B32  B38 | B39 | |
|---|---|---|---|---|---|---|---|---|
| AID12 | RU Allocation | Coding Type | MCS | DCM | SS Allocation | Target RSSI | Reserved | Trigger Dependent User Info |
| Bits: 12 | 8 | 1 | 4 | 1 | 6 | 7 | 1 | variable |

(b) User Info not for the associated STA(s)

| B0  B11 | B12  B19 | B20 | B21  B24 | B25 | B26  B31 | B32  B38 | B39 | |
|---|---|---|---|---|---|---|---|---|
| AID12 | RU Allocation | Coding Type | MCS | DCM | BSS Color | Target RSSI | Reserved | Trigger Dependent User Info |
| Bits: 12 | 8 | 1 | 4 | 1 | 6 | 7 | 1 | variable |

*FIG. 16*

| Condition | GROUP_ID | PARTIAL_AID |
|---|---|---|
| Addressed to AP | 0 | BSSID[39:47] |
| Addressed to Mesh STA | 0 | RA[39:47] |
| Sent by an AP and addressed to a STA associated with that AP or Sent by a DLS or TDLS STA in a direct path to a DLS or TDLS peer STA | 63 | (AID + (BSSID[44:47] XOR BSSID[40:43]) * 2^5) mod 2^9 |
| Otherwise (see NOTE) | 63 | 0 |

NOTE The last row covers the following cases:
- A PPDU sent to an IBSS STA
- A PPDU sent by an AP to a non associated STA
- Any other condition not explicitly listed elsewhere in the table

*FIG. 18*

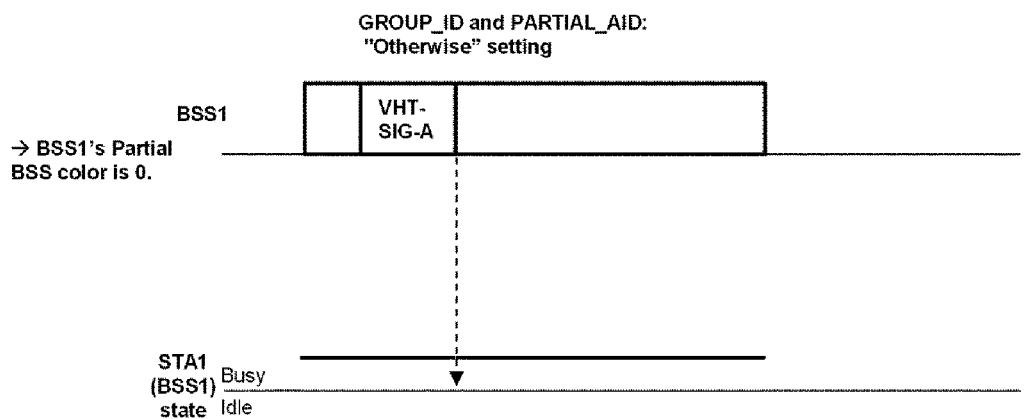

*FIG. 19*

| B19 – B13 | Description | Number of entries |
|---|---|---|
| 0–36 | Possible 26-tone RU cases in 80 MHz | 37 |
| 37–52 | Possible 52-tone RU cases in 80 MHz | 16 |
| 53–60 | Possible 106-tone RU cases in 80 MHz | 8 |
| 61–64 | Possible 242-tone RU cases in 80 MHz | 4 |
| 65–66 | Possible 484-tone RU cases in 80 MHz | 2 |
| 67 | 996-tone RU cases in 80 MHz | 1 |
| 68 | 2 996-tone RU case | 1 |
| 69–127 | Reserved | 59 |
| Total | | 128 |

*FIG. 24*

WIRELESS COMMUNICATION METHOD USING BSS IDENTIFIER AND WIRELESS COMMUNICATION TERMINAL USING SAME

CROSS-REFERENCE TO RELATED APPLICATIONS

This application is a continuation of U.S. patent application Ser. No. 16/590,302 filed on Oct. 1, 2019, which is a continuation of International Patent Application No. PCT/KR2018/004397 filed on Apr. 16, 2018, which claims the priority to Korean Patent Application No. 10-2017-0048762 filed in the Korean Intellectual Property Office on Apr. 14, 2017, Korean Patent Application No. 10-2017-0146358 filed in the Korean Intellectual Property Office on Nov. 4, 2017, and Korean Patent Application No. 10-2017-0146356 filed in the Korean Intellectual Property Office on Nov. 4, 2017, the entire contents of which are incorporated herein by reference.

TECHNICAL FIELD

The present invention relates to a wireless communication method and a wireless communication terminal using a BSS identifier.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An object of an embodiment of the present invention is to provide a wireless communication terminal using a BSS identifier.

Technical Solution

According to an embodiment of the present invention, a base wireless communication terminal communicating wirelessly includes a transceiver configured to transmit and receive wireless signals; and a processor configured to process the wireless signals. The processor may be configured to: generate a trigger frame for triggering uplink transmission based random access of at least one wireless communication terminal, and insert the trigger frame into a physical layer protocol data unit (PPDU) to transmit the PPDU.

When the trigger frame triggers uplink transmission based random access of a wireless communication terminal unassociated with a Basic Service Set (BSS) operated by the base wireless communication terminal, the processor may be configured to transmit the PPDU using a PPDU format including a field indicating a BSS color. In this case, the BSS color may be a kind of identifier for identifying the BSS.

In more detail, when the trigger frame triggers uplink transmission based random access of a wireless communication terminal unassociated with a BSS operated by the base wireless communication terminal, the processor may transmit the PPDU using a high efficiency (HE) PPDU format.

In another specific embodiment, when the trigger frame triggers uplink transmission based random access of a wireless communication terminal unassociated with a BSS operated by the base wireless communication terminal, the processor may be configured to insert a field indicating a BSS color in the trigger frame. In this case, the BSS color may be a kind of identifier for identifying the BSS.

Specifically, the processor may be configured to insert a field representing the BSS color into a User Info field signaling information that is individually applied to the one or more wireless communication terminals for which the trigger frame triggers transmission. In another specific embodiment, a field indicating the BSS color may be inserted into a Common Info field for signaling information that is commonly applied to the one or more wireless communication terminals for which the trigger frame triggers transmission.

The processor may be configured to set a specific field of the trigger frame to a value of a predetermined Association ID (AID) to trigger random access of a wireless communication terminal unassociated with a BSS operated by the base wireless communication terminal.

The processor may be configured to transmit the trigger frame based on a predetermined schedule. In this case, the trigger frame triggers uplink transmission based random access of a wireless communication terminal performing a power saving operation based on the predetermined schedule.

In more detail, the processor may be configured to set a Receiver Address (RA) field of the trigger frame to a group address indicating a wireless communication terminal performing a power saving operation based on the predetermined schedule.

In another specific embodiment, the trigger frame may include a User Info field for signaling information that is individually applied to the one or more wireless communication terminals to trigger transmission, and the processor may be configured to set a value of an association ID (AID) indicated by a User Info field corresponding to a frequency band allocated for the uplink transmission based random access to a predetermined value indicating a wireless communication terminal performing a power saving operation based on the predetermined schedule. In this case, the predetermined value may be a reserved value that is not allocated for another purpose.

In another specific embodiment, the trigger frame may include a User Info field for signaling information that is individually applied to the one or more wireless communication terminals to trigger the transmission, and the processor may set a TID Aggregation limit field included in a User Info field corresponding to a frequency band allocated for the uplink transmission based random access to a predetermined value indicating a wireless communication terminal performing a power saving operation based on the predetermined schedule. In this case, the TID Aggregation limit field may be a field used to indicate the limit of the number of TIDs corresponding to data that can be aggregated in an A-MPDU transmitted based on the trigger frame.

According to an embodiment of the present invention, a wireless communication terminal wirelessly communicating with a base wireless communication terminal includes a transceiver configured to transmit and receive wireless signals; and a processor configured to process the wireless signals. The processor may be configured to: receive a physical layer protocol data unit (PPDU) including a trigger frame for triggering transmission to the base wireless communication terminal, and transmit the trigger-based PPDU based on the trigger frame.

When the PPDU including the trigger frame indicates a Basic Service Set (BSS) color, the processor may be configured to set a value of a BSS color indicated by the trigger-based PPDU based on the value of the BSS color indicated by the PPDU including the trigger frame. In this case, the BSS color may be one of identifiers identifying a BSS.

In addition, if the PPDU including the trigger frame does not indicate a BSS color, the processor may be configured to set a value of a BSS color indicated by the trigger-based PPDU according to an active BSS color of the wireless communication terminal. In this case, the active BSS color may indicate a BSS color actually used by the wireless communication terminal.

The processor may be configured to receive information on a BSS color change from the base wireless communication terminal. In this case, when a BSS color change time point indicated by the information on the BSS color change is reached, the processor may be configured to set the active BSS color to a value of a BSS color indicated by the information on the BSS color change.

The BSS color change time point may be set based on a target beacon transmission time transmitted by the base wireless communication terminal.

If the PPDU indicates a partial BSS color using a Partial Association ID (AID) field, the processor may determine whether the PPDU is an Intra-BSS PPDU or an Inter-BSS PPDU based on the partial BSS color when the value of the partial AID field is non-zero. In this case, the partial AID field may be a signaling field used to indicate part of an AID value. In addition, the Intra-BSS PPDU may be a PPDU transmitted from a BSS including the wireless communication terminal, and the Inter-BSS PPDU may be a PPDU transmitted from a BSS not including the wireless communication terminal.

According to an embodiment of the present invention, an operation method of base wireless communication terminal communicating wirelessly includes generating a trigger frame for triggering uplink transmission based random access of at least one wireless communication terminal; and inserting the trigger frame into a physical layer protocol data unit (PPDU) to transmit the PPDU.

The transmitting the PPDU may include, when the trigger frame triggers uplink transmission based random access of a wireless communication terminal unassociated with a Basic Service Set (BSS) operated by the base wireless communication terminal, transmitting the PPDU using a PPDU format including a field indicating a BSS color of a Basic Service Set (BSS) operated by the base wireless communication terminal. The BSS color may be a kind of identifier for identifying a BSS.

Advantageous Effects

An embodiment of the present invention provides a wireless communication method using a BSS identifier and a wireless communication terminal using the same.

DESCRIPTION OF DRAWINGS

FIG. 7 shows a trigger frame format according to an embodiment of the present invention.

FIG. 8 shows formats of a Common Info field and a User Info field included in a trigger frame according to an embodiment of the present invention.

FIG. 16 shows the format of a User Info field of a trigger frame according to an embodiment of the present invention.

FIG. 18 shows a method of a wireless communication terminal to set TXVECTOR parameters GROUP_ID and PARTIAL_AID of a VHT SU PPDU according to an embodiment of the present invention.

FIG. 19 is a view of determining whether a VHT PPDU received by a wireless communication terminal according to an embodiment of the present invention is an Inter-BSS PPDU or an Intra-BSS PPDU using the value of the Partial AID field of the signaling field of the VHT PPDU received by the wireless communication terminal.

FIG. 24 shows an encoding value of an RU Allocation field used by a wireless communication terminal according to an embodiment of the present invention.

MODE FOR CARRYING OUT THE INVENTION

Figure 1:
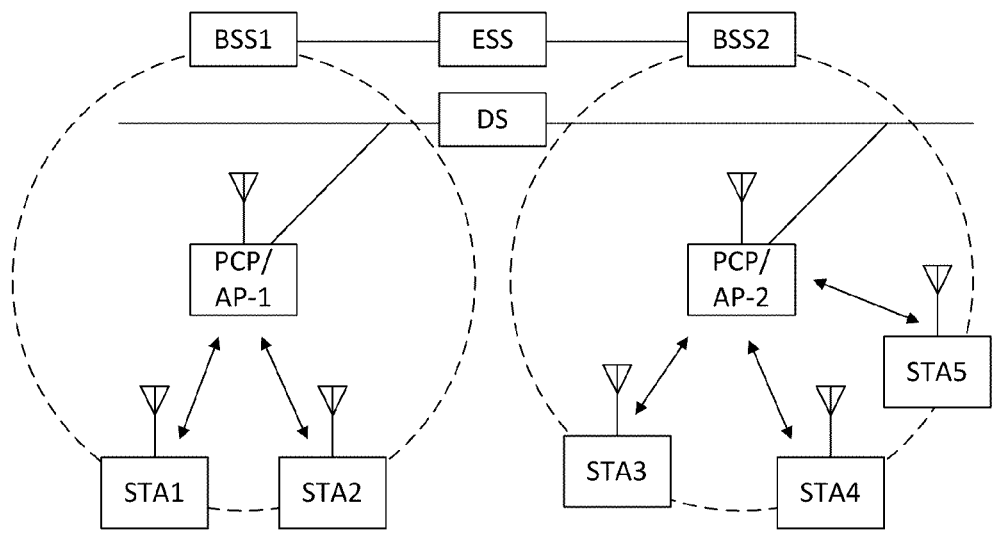
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2017-0048762 (2017.04.14), Nos. 10-2017-0146358 (2017.11.04), and Nos. 10-2017-0146356 (2017.11.04) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
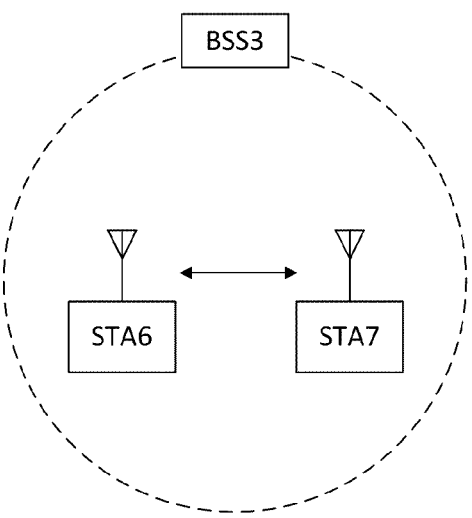
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
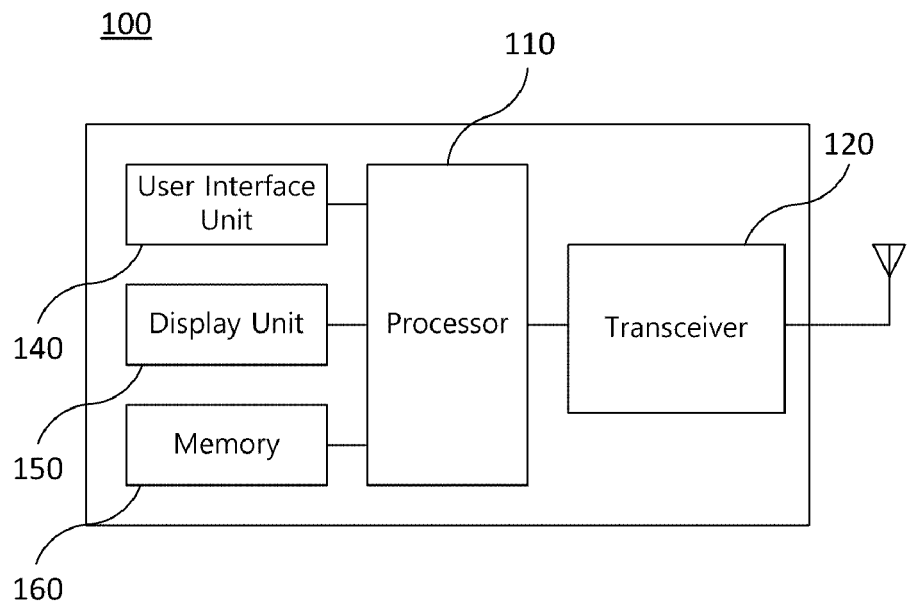
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
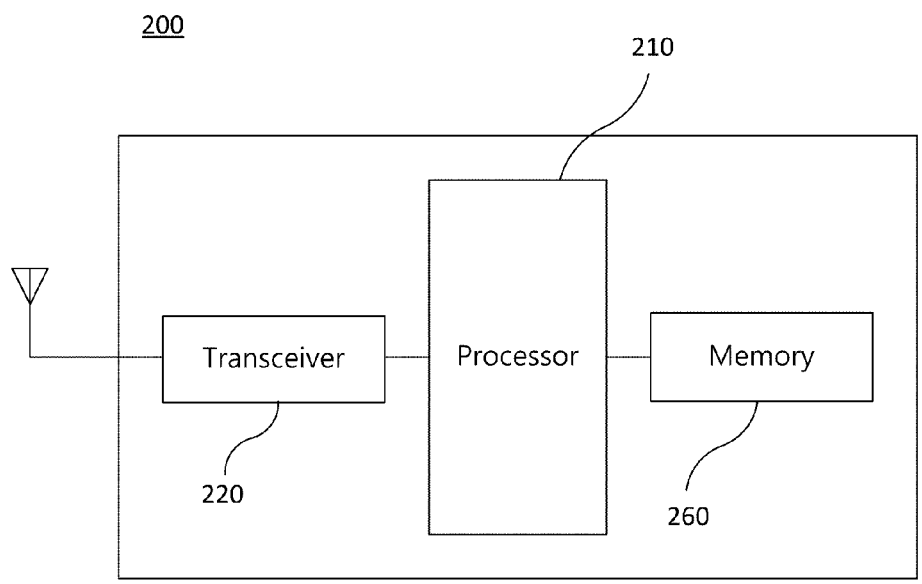
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
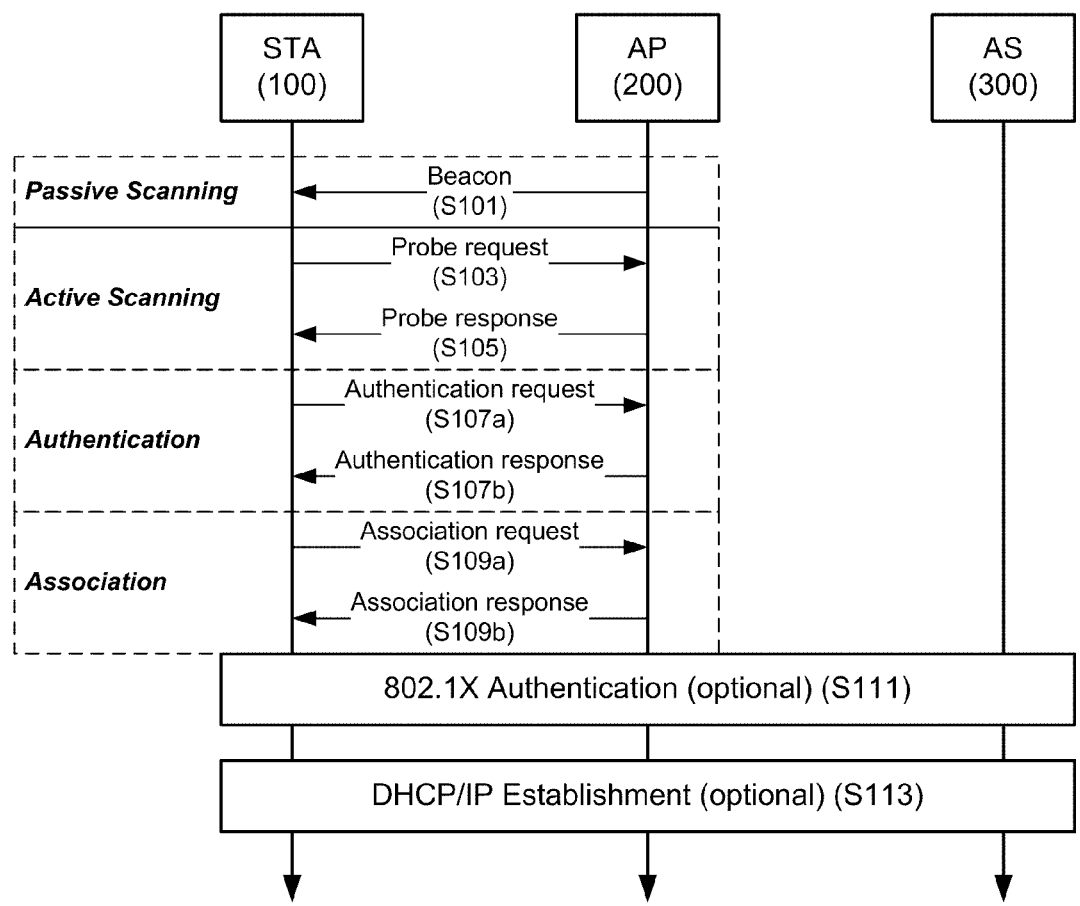
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

The base wireless communication terminal may be a wireless communication terminal that allocates and schedules medium resources in communication with a plurality of wireless communication terminals. Specifically, the base wireless communication terminal may serve as a cell coordinator. In a specific embodiment, the base wireless communication terminal may be a wireless communication terminal that allocates and schedules communication medium resources in an independent network, such as an ad-hoc network, that is not connected to an external distribution service.

When data is transmitted using Orthogonal Frequency Division Modulation (OFDMA) or Multi Input Multi Output (MIMO), any one wireless communication terminal may transmit data to a plurality of wireless communication terminals simultaneously. Also, any one wireless communication terminal may simultaneously receive data from a plurality of wireless communication terminals.

For convenience of description, any one wireless communication terminal communicating with a plurality of wireless communication terminals at the same time will be referred to as a base wireless communication terminal. Furthermore, the base wireless communication terminal may be referred to as a base communication device. In addition, the base wireless communication terminal may be a wireless communication terminal that allocates a communication medium resource and performs scheduling in communication with a plurality of wireless communication terminals. Specifically, the base wireless communication terminal may perform the role of a cell coordinator. In this case, the base wireless communication terminal may be the access point 200. In addition, the plurality of wireless communication terminals may be the station 100 associated with the access point 200. In a specific embodiment, the base wireless communication terminal may be a wireless communication terminal that allocates a communication medium resource and performs scheduling in an independent network, such as an ad-hoc network, which is not connected to an external distribution service. In addition, the base wireless communication terminal may be at least one of a base station, an eNB, and a transmission point TP. Through FIGS. 6 to 32, an operation in which a plurality of wireless communication terminals transmit data and a base wireless communication terminal receives data will be described.

Figure 6:
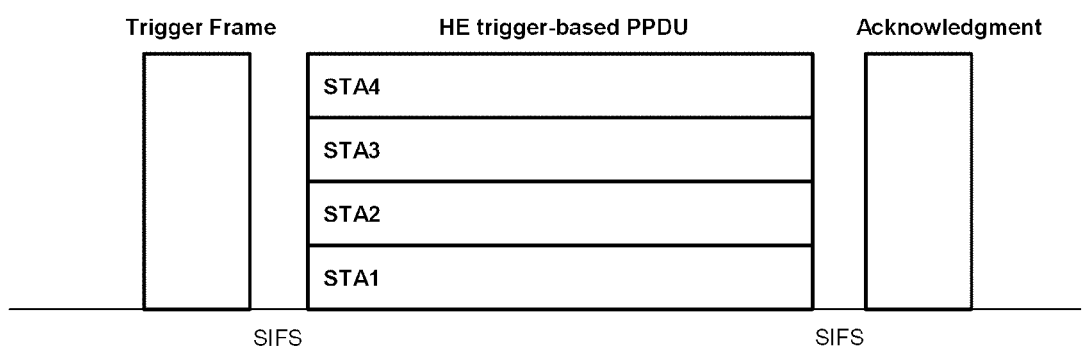
FIG. 6 illustrates an operation of transmitting a trigger based PPDU by a plurality of wireless communication terminals based on a trigger frame according to an embodiment of the present invention.

FIG. 6 illustrates an operation of transmitting a trigger based PPDU by a plurality of wireless communication terminals based on a trigger frame according to an embodiment of the present invention.

The base wireless communication terminal may transmit a trigger frame including trigger information for triggering transmission of at least one wireless communication terminal or Uplink multi-user response scheduling (UMRS) of the MAC header. At least one wireless communication terminal receiving the trigger frame or the UMRS including the trigger information may transmit a trigger based PPDU based on the trigger information. The trigger based PPDU may indicate a PPDU including a response frame to a trigger frame. In more detail, the trigger-based PPDU may indicate an HE trigger-based PPDU. One or more wireless communication terminals may simultaneously transmit a trigger-based PPDU to the base wireless communication terminal using at least one of MU-MIMO and OFDMA. In this case, one or more wireless communication terminals may transmit the trigger-based PPDU within a predetermined time from receiving a trigger frame including trigger information or UMRS. At this point, the predetermined time may be an SIFS. In addition, transmitting a response frame to a frame received within a predetermined time by the wireless communication terminal may be referred to as an immediate response.

As described above, the UMRS may include trigger information. Also, UMRS may be included in the A-Control field of the MAC header. In addition, one or more wireless communication terminals may transmit a non-HT PPDU in response to the trigger frame. Specifically, when the trigger frame is MU-RTS type, one or more wireless communication terminals may transmit a non-HT PPDU in response to the trigger frame.

In addition, the A-MPDU may include trigger information. In more detail, the A-MPDU may include a trigger frame. The A-MPDU may include two or more trigger frames. In this case, the contents of the trigger frame may be the same. In addition, when including an A-MPDU trigger frame, the base wireless communication terminal may not be allowed to include in the A-MPDU an MPDU including UMRS that triggers uplink transmission of the same wireless communication terminal as the wireless communication terminal where the corresponding trigger frame triggers uplink transmission.

In the embodiment of FIG. 6, the AP transmits a trigger frame to the first station STA1 to the fourth station STA4. The first station STA1 to the fourth station STA4 receive a trigger frame and simultaneously transmit a trigger-based PPDU to the AP based on the trigger frame. The AP receives a trigger-based PPDU and transmits an ACK frame based on the MPDU included in the trigger-based PPDU. A specific format of the trigger frame will be described with reference to FIG. 7.

FIG. 7 shows a trigger frame format according to an embodiment of the present invention. FIG. 8 shows formats of a Common Info field and a User Info field included in a trigger frame according to an embodiment of the present invention.

The trigger frame may include information on the wireless communication terminal where the trigger frame triggers the transmission. In detail, the trigger frame may include a Common Info field indicating information that is commonly applied to at least one wireless communication terminal where the trigger frame triggers the uplink transmission. In addition, the trigger frame may include a User Info field indicating information that is individually applied to at least one wireless communication terminal where the trigger frame triggers the uplink transmission. In a specific embodiment, the trigger frame may include a Frame Control field, a Duration field, an RA field, a TA field, a Common Info field, at least one User Info field, a Padding field, and an FCS field, as in the embodiment of FIG. 7.

The RA field may indicate the address of a station receiving the trigger frame. When there is only one wireless communication terminal triggered by the trigger frame, the RA field may indicate an address of the corresponding wireless communication terminal. When there is more than one wireless communication terminal triggered by the trigger frame, the RA field may indicate a broadcast address. When the trigger type of the trigger frame is GCR MU-BAR, the RA field may indicate an address of a wireless communication terminal group for which transmission of reception status is requested.

The TA field may indicate the address of a station transmitting the trigger frame. When the base wireless communication terminal does not use multiple BSSIDs, the TA field may indicate the MAC address of the base wireless communication terminal transmitting the trigger frame. In addition, when the base wireless communication terminal uses multiple BSSIDs and the base wireless communication terminal transmits a trigger frame to the wireless communication terminal to communicate with the base wireless communication terminal, the TA field may indicate the MAC address of the base wireless communication terminal. In this case, the wireless communication terminal communicating with the base wireless communication terminal may include not only a wireless communication terminal associated with the base wireless communication terminal, but also a wireless communication terminal unassociated with the base wireless communication terminal. In addition, when the base wireless communication terminal uses multiple BSSIDs and the base wireless communication terminal transmits a trigger frame to a plurality of wireless communication terminals communicating with two or more BSSs of a multiple BSSIDs set, the TA field may indicate a transmitted BSSID.

The Padding field may indicate meaningless data. In more detail, when the wireless communication terminal receiving the trigger frame needs time to secure the response transmission preparation for the trigger frame, the base wireless communication terminal may insert a Padding field into the trigger frame. In this case, the base wireless communication terminal may determine the length of the Padding field based on the capability of the wireless communication terminal receiving the trigger frame. When the wireless communication terminal receiving the trigger frame does not need time for response transmission preparation for the trigger frame, the base wireless communication terminal may not insert the Padding field in the trigger frame. The base wireless communication terminal may indicate the start of the padding field by setting the start portion of the padding field to a specific value. In this case, the specific value may be 0xFFF(4095). In addition, the base wireless communication terminal may set the remaining portion other than the start portion of the padding field to a value different from the specific value.

In more detail, the User Info field may indicate a frequency band allocated to a wireless communication terminal triggered by a trigger frame. The User Info field may include a wireless communication terminal identifier for identifying a wireless communication terminal triggered by the trigger frame and information indicating a bandwidth of a frequency band allocated to the wireless communication terminal. In this case, the wireless communication terminal identifier may be an identifier for shortening an association ID (AID). For example, the trigger frame may include an identifier for shortening the AID of the wireless communication terminal triggered by the trigger frame and an index indicating a frequency band allocated to the wireless communication terminal. In this case, the identifier for shortening the AID may be 12 Least Significant Bits (LSBs) of the AID. According to a specific embodiment, the User Info field may include an AID12 field indicating a wireless communication terminal identifier for identifying a wireless communication terminal triggered by the trigger frame.

The base wireless communication terminal may set a value of the wireless communication terminal identifier of the User Info field to a specific value to indicate that a frequency band of the corresponding User Info field is allocated for random access. In more detail, the base wireless communication terminal may set the value of the wireless communication terminal identifier of the User Info field to a first specific value to indicate that the frequency band of the corresponding User Info field is allocated for random access for the wireless communication terminal associated the base wireless communication terminal. In addition, the base wireless communication terminal may set the value of the wireless communication terminal identifier of the User Info field to a first specific value to indicate that the frequency band of the corresponding User Info field is allocated for random access for the wireless communication terminal unassociated with the base wireless communication terminal. In this case, the first specific value may be 0. In addition, the second specific value may be 2045. The wireless communication terminal unassociated with the base wireless communication terminal may be a wireless communication terminal unassociated with any base wireless communication terminal.

The User Info field may indicate a frequency band allocated to the wireless communication terminal in a resource unit (RU). In more detail, the User Info field may include an RU allocation field indicating an RU allocated to a wireless communication terminal corresponding to the User Info field.

As described above, the wireless communication terminal receiving the trigger frame may need time to prepare to transmit a response to the trigger frame. In this case, the base wireless communication terminal may insert a Padding field into the trigger frame according to the time required for the wireless communication terminal to prepare to transmit a response to the trigger frame. The minimum time required for the wireless communication terminal to prepare to transmit a response to the trigger frame may be referred to as MinTrigProcTime. When the base wireless communication terminal transmits a trigger frame that triggers random access, the base wireless communication terminal can not determine which wireless communication terminal will perform transmission through the random access. Therefore, when the base wireless communication terminal transmits a trigger frame that triggers a random access, there is a problem in a method of a base wireless communication terminal to set the field of a trigger frame in order to ensure that the wireless communication terminal has the time necessary to prepare to transmit a response to the trigger frame.

When the trigger frame triggers random access of the wireless communication terminal associated with the base wireless communication terminal, the base wireless communication terminal may set a field of the trigger frame based on MinTrigProcTime of the wireless communication terminal that the trigger frame explicitly triggers. Specifically, when the trigger frame triggers random access of the wireless communication terminal associated with the base wireless communication terminal, the base wireless communication terminal may set a field of the trigger frame based on the longest MinTrigProcTime among MinTrigProcTimes of the wireless communication terminal that the trigger frame explicitly triggers. In this case, the wireless communication terminal triggered explicitly by the trigger frame may indicate a wireless communication terminal indicated by the identifier of the wireless communication terminal through the User Info field described above. In another specific embodiment, when the trigger frame triggers random access of the wireless communication terminal associated with the base wireless communication terminal, the base wireless communication terminal may set a field of the trigger frame based on the longest MinTrigProcTime among MinTrigProcTimes of the wireless communication terminals associated with the base wireless communication terminal.

When the trigger frame triggers random access of the wireless communication terminal unassociated with the base wireless communication terminal, the base wireless communication terminal may set a field of the trigger frame based on the largest value among the MinTrigProcTime values that the wireless communication terminal is capable of signaling. In this case, the largest value among the MinTrigProcTime values that the wireless communication terminal is capable of signaling may be 16 us.

In the above-described embodiments, the base wireless communication terminal sets at least one of a Padding field, an A-MPDU padding, an A-MPDU subframe, an EOF padding, a frame, and a reserved field of a frame so that it is possible to ensure the time required to prepare to transmit a response to the trigger frame.

In addition, the base wireless communication terminal may be inserted before the User Info field indicating any one of the wireless communication terminal than the User Info field indicating the random access. For example, the base wireless communication terminal may insert a User Info field including an AID12 subfield having a value other than 0 and 2045 before the User Info field having a value of 0 or 2045 in the AID12 subfield.

Specific formats of the User Info field and the Common Info field may be shown in FIGS. 8(a) and 8(b).

Figure 9:
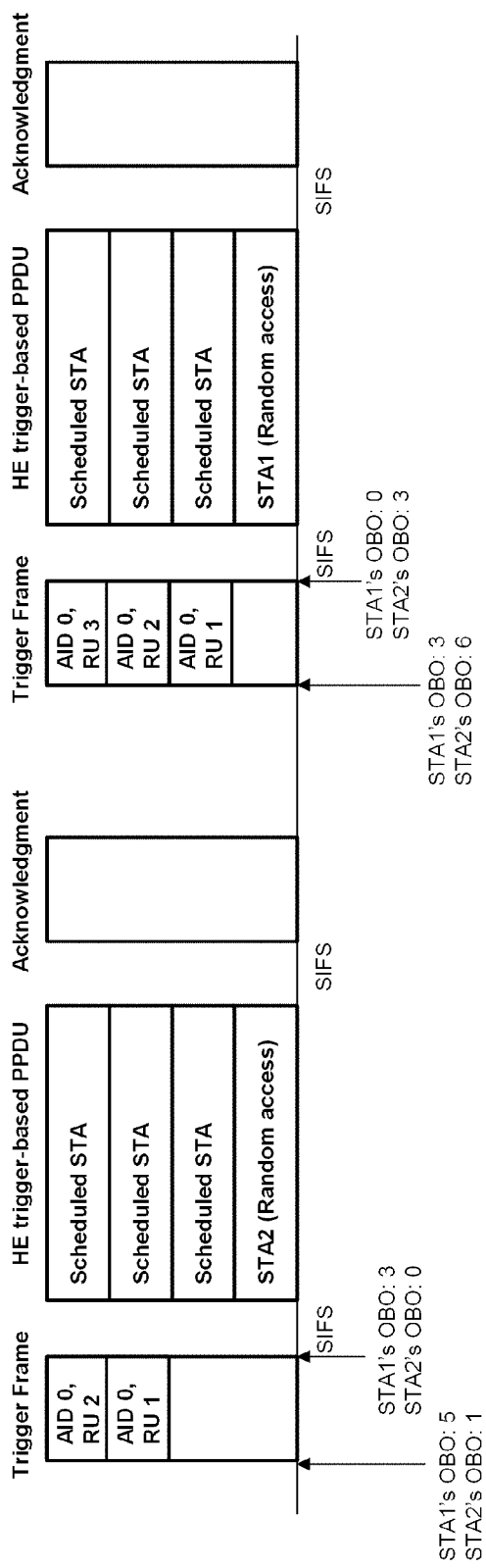
FIG. 9 shows a method of performing random access by a wireless communication terminal according to an embodiment of the present invention.

FIG. 9 shows a method of performing random access by a wireless communication terminal according to an embodiment of the present invention.

As in the embodiments described with reference to FIG. 8, the base wireless communication terminal may trigger a random access of the wireless communication terminal using a trigger frame. In this case, the wireless communication terminal may randomly access the frequency band indicated by the trigger frame using OFDMA. In more detail, the wireless communication terminal may access an RU allocated for random access based on any number in the OFDMA Contention Window (OCW). In this case, a random number is referred to as an OFDMA backoff (OBO) counter. In more detail, the wireless communication terminal receiving the trigger frame that triggers the random access may reduce the OBO counter by the number of RUs allocated for the random access. The wireless communication terminal associated with the base wireless communication terminal may decrease the OBO counter by the number of RUs indicated as an RU allocated for the random access of the wireless communication terminal associated with the base wireless communication terminal by the trigger frame. In addition, the wireless communication terminal unassociated with the base wireless communication terminal may reduce the OBO counter by the number of RUs indicated as an RU allocated for the random access of the wireless communication terminal unassociated with the base wireless communication terminal by the trigger frame.

When the OBO counter becomes to 0, the wireless communication terminal is allowed to access any of the RUs allocated for random access. Specifically, when the OBO counter becomes 0, the wireless communication terminal may randomly select any one of the RUs allocated for the random access to access the selected RU. In a specific embodiment, the wireless communication terminal associated with the base wireless communication terminal may randomly select any one of RUs indicated as an RU allocated for random access of the wireless communication terminal associated with the base wireless communication terminal by the trigger frame. In addition, the wireless communication terminal unassociated with the base wireless communication terminal may randomly select any one of the RUs indicated as an RU allocated for the random access of the wireless communication terminal unassociated with the base wireless communication terminal by the trigger frame. When the selected RU is busy, the wireless communication terminal may stop access to the RU and maintain the OBO counter as 0. When the RU is busy according to at least one of physical carrier sensing and virtual carrier sensing, the wireless communication terminal may determine that the RU is busy. In this case, the wireless communication terminal may perform physical carrier sensing and virtual carrier sensing according to the carrier sensing method in the UL MU procedure.

When the wireless communication terminal receives a new UL OFDMA Random Access (UORA) parameter set element from the base wireless communication terminal or performs random access for the first time, the wireless communication terminal may set the OCW to the minimum value OCWmin of the OCW. In this case, the UORA parameter set element may be an element signaling a parameter used for OFDMA random access. The UORA parameter set element will be described in detail with reference to FIG. 10. In addition, the base wireless communication terminal may be a base wireless communication terminal associated with the wireless communication terminal. The base wireless communication terminal may be a base wireless communication terminal to receive the uplink transmission to be performed by the wireless communication terminal. In addition, in the case of an unassociated wireless communication terminal, the base wireless communication terminal may be a base wireless communication terminal transmitting a UORA parameter set element or transmitting a trigger frame.

In addition, the wireless communication terminal may adjust the value of the OCW according to the result of transmission using the random access. In this case, the value of OCW may indicate the maximum value of the range indicated by OCW, and the minimum value of the range indicated by OCW may be 0. In more detail, the wireless communication terminal may randomly select one of natural numbers from 0 to an OCW value and set it as an OBO counter. When the wireless communication terminal fails to transmit using random access, the wireless communication terminal may set the value of the OCW to (2*OCW+1). In this case, the wireless communication terminal may obtain the OBO counter again using the newly set OCW. When the value of the OCW is the maximum value OCWmax that the value of the OCW is capable of having, the wireless communication terminal may maintain the value of the OCW as it is. The wireless communication terminal may obtain OCWmin and OCWmax from the base wireless communication terminal. In more detail, the wireless communication terminal may obtain OCWmin and OCWmax from the UORA parameter set element received from the base wireless communication terminal. The base wireless communication terminal may transmit the UORA parameter set element using a beacon frame or a probe response frame.

In the embodiment of FIG. 9, the first station STA1 and the second station STA2 are associated with an AP transmitting a trigger frame or an AP included in the same multiple BSSIDs set as an AP transmitting a trigger frame. The OBO counter of the first station STA1 is five and the OBO counter of the second station STA2 is one. The first station STA1 and the second station STA2 receive a trigger frame indicating that two RUs are allocated for random access from the AP. The first station STA1 and the second station STA2 decrement the OBO counter by two. Since the OBO counter of the second station STA2 reaches 0, the second station STA2 randomly selects one of two RUs indicated as an RU allocated for random access by the trigger frame, and then attempts the transmission for AP through the selected RU. The second station STA2 receives an ACK for the transmission for the AP from the AP. In this case, the second station STA2 sets the OCW to OCWmin and obtains a new OBO counter value as 6 in the newly set OCW.

The OBO counter of the first station STA1 is three and the OBO counter of the second station STA2 is six. The first station STA1 and the second station STA2 receive a trigger frame indicating that three RUs are allocated for random access from the AP. The first station STA1 and the second station STA2 decrement the OBO counter by three. Since the OBO counter of the first station STA1 reaches 0, the first station STA1 randomly selects one of three RUs indicated as an RU allocated for random access by the trigger frame, and then attempts the transmission for AP through the selected RU.

Figure 10:
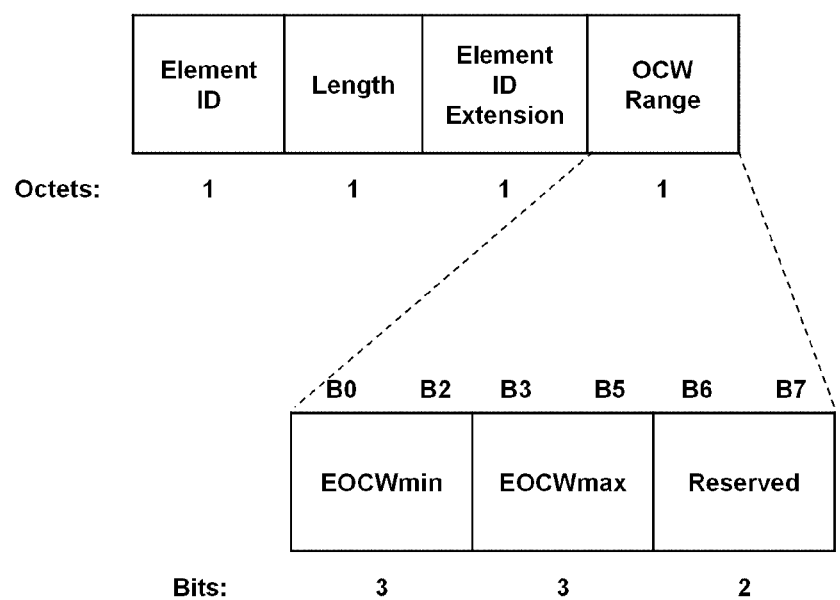
FIG. 10 shows a specific format of the UORA parameter set element according to an embodiment of the present invention.

FIG. 10 shows a specific format of the UORA parameter set element according to an embodiment of the present invention.

As described above, the base wireless communication terminal may signal a parameter used for UORA using a UORA parameter set element. In more detail, the base wireless communication terminal may transmit a UORA parameter set element using a beacon frame or a probe response frame. The UORA parameter set element may include information necessary to obtain OCWmin and OCWmax. In more detail, the UORA parameter set element may include an Element ID field, a Length field, an Element ID Extension field, and an OCW Range field as shown in FIG. 10. The Element ID field and the Element ID Extension field may indicate values for identifying a UORA parameter set element. In addition, the Length field may indicate the length of the UORA parameter set element. The OCW Range field may include information necessary to obtain OCWmin and OCWmax. In more detail, the OCW Range field may include an EOCWmin field and an EOCWmax. The wireless communication terminal may obtain $2^{\wedge}EOCWmin-1$ as OCWmin. In addition, the wireless communication terminal may obtain $2^{\wedge}EOCWmax-1$ as OCWmax.

The wireless communication terminal may set OCWmin and OCWmax based on the most recently received UORA parameter set element. In this case, the wireless communication terminal may set OCWmin and OCWmax based on the most recently received UORA parameter set element regardless of an Access Category (AC) to be transmitted. In more detail, the wireless communication terminal may set OCWmin and OCWmax using information indicated by the most recently received UORA parameter set element regardless of an Access Category (AC) to be transmitted.

As in the embodiments described with reference to FIGS. 9 through 10, the fact that a wireless access terminal randomly accesses a frequency band indicated by a trigger frame and performs uplink transmission is referred to as uplink transmission based random access. In more detail, the uplink transmission based random access may indicate that the wireless communication terminal performs uplink transmission using OFDMA in a frequency band indicated by a trigger frame.

The wireless communication terminal may select a PPDU to be used for transmission according to at least one of a transmission condition and a capability of the wireless communication terminal. For example, when the receiver reports that the DCM can be received or the ER Single User (SU) payload can be received, the wireless communication terminal may transmit a 242-tone extended range (ER) SU PPDU to the wireless communication terminal to receive the PPDU. In addition, when the receiver reports that the UL HE MU PPDU can be received, the wireless communication terminal may transmit the UL HE MU PPDU to the wireless communication terminal that is to receive the PPDU. Whether to receive the ER Single User (SU) payload may be whether to receive the 106-tone ER SU PPDU. In addition, when the wireless communication terminal receives a HE ER SU PPDU using STBC or a HE SU PPDU using STBC, the wireless communication terminal may transmit a PPDU including a control frame in response to the received PPDU using the same format as the received PPDU.

In addition, the base wireless communication terminal may transmit a PPDU including a control frame in response to the trigger-based PPDU using a PPDU format supported by the receiver. When the base wireless communication terminal transmits a trigger frame that is not the MU RTS type, the base wireless communication terminal may transmit a PPDU including a trigger frame using a PPDU format supported by the receiver. When the wireless communication terminal receives a PPDU including a trigger frame that is not MU RTS type or a MAC frame including UMRS, the wireless communication terminal may transmit a trigger-based PPDU including a control frame in response to the corresponding PPDU.

When the wireless communication terminal receives a HE ER SU PPDU including a fine timing measurement (FTM) frame or a HE SU PPDU including a FTM frame, the wireless communication terminal may transmit an ACK frame in response to the FTM frame using the same format as the received PPDU. In this case, when the wireless communication terminal receives the HE SU PPDU including the FTM frame and the PPDU that is most recently successfully transmitted is HE ER SU PPDU after associated with the transmitter, the wireless communication terminal may transmit the control frame to the HE ER SU PPDU.

When the wireless communication terminal transmits a control frame in response to the HE ER SU PPDU, the wireless communication terminal may transmit a control frame using a HE ER SU PPDU. When the most recently successful PPDU is not a HE ER SU PPDU after the wireless communication terminal associates with the transmitter, the wireless communication terminal may transmit a control frame using a non-high efficiency (HE) PPDU.

When the wireless communication terminal transmits a control frame in response to the HE ER SU PPDU, the wireless communication terminal may transmit the control frame using a non-HT PPDU or a non-HT duplicate PPDU. When the most recently successful PPDU is not a HE ER SU PPDU after the wireless communication terminal associates with the transmitter, the wireless communication terminal may transmit a control frame using a HE ER SU PPDU.

A PPDU format change may occur between a HE ER SU PPDU and a non-HT PPDU in a subsequent TXOP. In more detail, the wireless communication terminal may transmit a HE ER SU PPDU in response to the non-HT PPDU. In addition, the wireless communication terminal may transmit the non-HT PPDU in response to the HE ER PPDU. The transmitter soliciting the transmission of the control frame in response may set the duration of the TXOP based on the format of the response PPDU. In addition, when the wireless communication terminal receives an immediate ACK for the most recently transmitted PPDU, the wireless communication terminal may determine that the most recent transmission of the PPDU is successful.

When multiple BSSs are overlapped, the communication efficiency of the wireless communication terminal may be degraded due to interference caused by transmission in another BSS. In particular, when a frequency band is used through a contention procedure, a wireless communication terminal may not secure even a transmission opportunity due to interference with other wireless communication terminals. To solve this problem, a wireless communication terminal may perform a spatial reuse (SR) operation. Specifically, the SR operation may include an operation of accessing the channel depending on whether the received frame is a MAC frame transmitted from a BSS including the wireless communication terminal or a MAC frame transmitted from another BSS. For convenience of description, when a frame is used without any description in the following description, it is assumed to refer to a MAC frame.

In a specific embodiment, the operation of accessing the channel may include a NAV setup and reset operation, a CCA operation, and a deferral operation. For example, the wireless communication terminal may adjust a Clear Channel Assessment (CCA) threshold according to whether a frame received by the wireless communication terminal is a frame transmitted from a BSS including the wireless communication terminal or a frame transmitted from an OBSS. Also, the wireless communication terminal may adjust the transmission power of the PPDU to be transmitted according to the CCA threshold adjustment during the SR operation.

For convenience of explanation, a BSS including the wireless communication terminal is referred to as Intra-BSS, and a basic service set overlapped with Intra-BSS is referred to as an Overlapped Basic Service Set (OBSS). In addition, a BSS different from the Intra-BSS is referred to as Inter-BSS. In addition, a frame transmitted from the Intra-BSS is referred to as an Intra-BSS frame, and a frame transmitted from the OBSS is referred to as an OBSS frame or an Inter-BSS frame. In addition, the PPDU transmitted from the Intra-BSS is referred to as an Intra-BSS PPDU, and the PPDU transmitted from the OBSS is referred to as an OBSS PPDU or an Inter-BSS PPDU.

Specifically, the wireless communication terminal may apply the CCA threshold according to whether the received PPDU is an Inter-BSS PPDU or an Intra-BSS PPDU while the received PPDU is transmitted. In the specific embodiment, the CCA threshold according to whether the received PPDU is an Inter-BSS PPDU or an Intra-BSS PPDU while the payload of the received PPDU is transmitted may be applied. Also, the wireless communication terminal may receive the first PPDU and receive the second PPDU while applying the CCA threshold according to whether the first PPDU is an Inter-BSS PPDU or an Intra-BSS PPDU. Specifically, the wireless communication terminal may apply the CCA threshold according to whether the received PPDU is an Inter-BSS PPDU or an Intra-BSS PPDU while the received PPDU is transmitted. Specifically, when the wireless communication terminal receives the Inter-BSS PPDU and applies the CCA threshold corresponding to the Inter-BSS PPDU, it may receive the Intra-BSS PPDU. In this case, the wireless communication terminal may apply the CCA threshold corresponding to the Intra-BSS PPDU instead of the CCA threshold corresponding to the Inter-BSS PPDU. However, when the wireless communication terminal receives the Intra-BSS PPDU and applies the CCA threshold corresponding to the Intra-BSS PPDU, and the wireless communication terminal may receive the Inter-BSS PPDU while the transmission of the Intra-BSS PPDU is not completed. In this case, the wireless communication terminal may maintain the CCA threshold corresponding to the Intra-BSS PPDU until the transmission of the intra-BSS PPDU is completed. Specifically, the wireless communication terminal may not apply the CCA threshold corresponding to the inter-BSS PPDU until the transmission of the Intra-BSS PPDU is completed. In the above-described operations, the CCA threshold corresponding to the Inter-BSS PPDU may be equal to or greater than the CCA threshold corresponding to the Intra-BSS PPDU. For convenience of description, performing a Preamble Detection (PD) using a CCA threshold corresponding to an Inter-BSS PPDU may be referred to as an OBSS PD based SR operation.

A method of identifying whether a PPDU received by a wireless communication terminal is an intra-BSS PPDU or an Inter-BSS PPDU will be described.

The wireless communication terminal may determine whether the PPDU is an Intra-BSS PPDU or an Inter-BSS PPDU based on the BSS color indicated by the signaling field of the PPDU. In this case, the BSS color is one kind of BSS identifier. In addition, the number of values that the BSSID can have may be smaller than the number of values that the BSSID can have. The base wireless communication terminal determines the BSS color of the BSS operated by the base wireless communication terminal. In this case, the base wireless communication terminal may determine any one of 1 to 63 as the BSS color. The BSS colors of the BSSs included in the same multiple BSSI set may all be the same. Accordingly, the base wireless communication terminal may set the value of the BSS color so that the BSS colors of the BSSs included in the same multiple BSSI set is the same. The base wireless communication terminal may signal the BSS color of the BSS operated by the base wireless communication terminal using the HE Operation element or the BSS Color Change Announcement element. The wireless communication terminal other than the base wireless communication terminal may set the value of the BSS color received from the base wireless communication terminal to the value of the BSS Color field of the HE operation element. In addition, when the base wireless communication terminal changes the value of the BSS color of the BSS operated by the base wireless communication terminal, the base wireless communication terminal may signal the value of the BSS color to be changed by transmitting information on the BSS color change. In this case, the information on the BSS color change may be a BSS Color Change Announcement element.

The wireless communication terminal may set the value of the BSS color received from the base wireless communication terminal to the value of the active BSS color. In this case, the active BSS color may indicate a BSS color actually used by the wireless communication terminal. In more detail, the BSS color set by the wireless communication terminal to the value of the BSS Color field of the HE-SIG-A field of the PPDU and the value of the BSS Color field of the HE Operation element may be referred to as an active BSS color. Therefore, the wireless communication terminal may set the value of the active BSS color to the value of the BSS color indicated by the PPDU transmitted by the wireless communication terminal. Specifically, the wireless communication terminal sets the value of the active BSS color to the value of the BSS Color field of the HE-SIG-A field of the PPDU transmitted by the wireless communication terminal. For example, the base wireless communication terminal may set the value of the active BSS color with BSS_COLOR of the TXVECTOR parameter and set the value of the active BSS color in the BSS Color field of the HE-SIG-A field of the PPDU. When the wireless communication terminal receives the information on the BSS color change and reaches the BSS color change time point indicated by the information on the BSS color change, the wireless communication terminal may set the active BSS color to a value of the BSS color indicated by the information on the BSS color change. In this case, the value of the BSS color indicated by the information on the BSS color change may be a value indicated by the New BSS Color subfield of the BSS Color Change Announcement element. The BSS color change time point may be determined based on target beacon transmission times (TBTT). In addition, when the wireless communication terminal establishes an association, a tunneled direct-link setup (TDLS) link, a direct-link setup (DLS) link, or an IBSS membership with another wireless communication terminal, the wireless communication terminal may set the value of the BSS Color field of the HE-SIG-A field of the PPDU transmitted to the corresponding wireless communication terminal to the value of the active BSS color. In the following description, the value of the BSS color of the BSS may refer to an active BSS color.

The base wireless communication terminal may stop performing the OBSS PD based SR operation of the wireless communication terminal receiving the PPDU by setting the value of the BSS color indicated by the PPDU to 0. In a specific embodiment, when at least one of the intended receivers of the PPDU is unassociated with the BSS operated by the base wireless communication terminal, the base wireless communication terminal may set the BSS color indicated by the corresponding PPDU to 0. In addition, when the intended receiver of the HE SU PPDU or the HE ER SU PPDU is unassociated with the BSS operated by the base wireless communication terminal, the base wireless communication terminal may set the BSS color indicated by the corresponding PPDU to 0.

When the wireless communication terminal receives a PPDU indicating a value of 1 to 63 of the BSS color, the wireless communication terminal may perform an OBSS PD based SR operation. In addition, when the wireless communication terminal receives the PPDU indicating that the value of the BSS color is 0, the wireless communication terminal may not perform the OBSS PD-based SR operation. In more detail, when the wireless communication terminal receives a PPDU indicating that the value of the BSS color is 0, the wireless communication terminal may not determine whether the channel is idle based on the OBSS PD threshold. In addition, when the wireless communication terminal receives a PPDU indicating that the value of the BSS color is 0, the wireless communication terminal may not discard the corresponding PPDU. Specifically, when the wireless communication terminal receives a HE SU PPDU or HE ER SU PPDU indicating that the value of the BSS color is 0, the wireless communication terminal may not discard the corresponding PPDU. Through these embodiments, the base wireless communication terminal may transmit a PPDU to a wireless communication terminal unassociated with the BSS operated by the base communication terminal. In addition, the wireless communication terminal may receive the PPDU from the base wireless communication terminal unassociated with the wireless communication terminal.

When at least one of the intended receivers of the PPDU is unassociated with the BSS operated by the base wireless communication terminal, it may be the case that the intended receiver of the PPDU transmitted by the base wireless communication terminal, the intended receiver of the A-MPDU included in the PPDU, or the intended receiver of the frame is unassociated with the BSS operated by the base wireless communication terminal. In addition, as described above, the base wireless communication terminal may use the trigger frame to trigger random access of the wireless communication terminal that is unassociated with the base wireless communication terminal. In this case, the base wireless communication terminal may set the value of the BSS color indicated by the PPDU including the trigger frame to 0. In this case, the operation of the wireless communication terminal will be described with reference to FIGS. 11 to 13.

Figure 11:
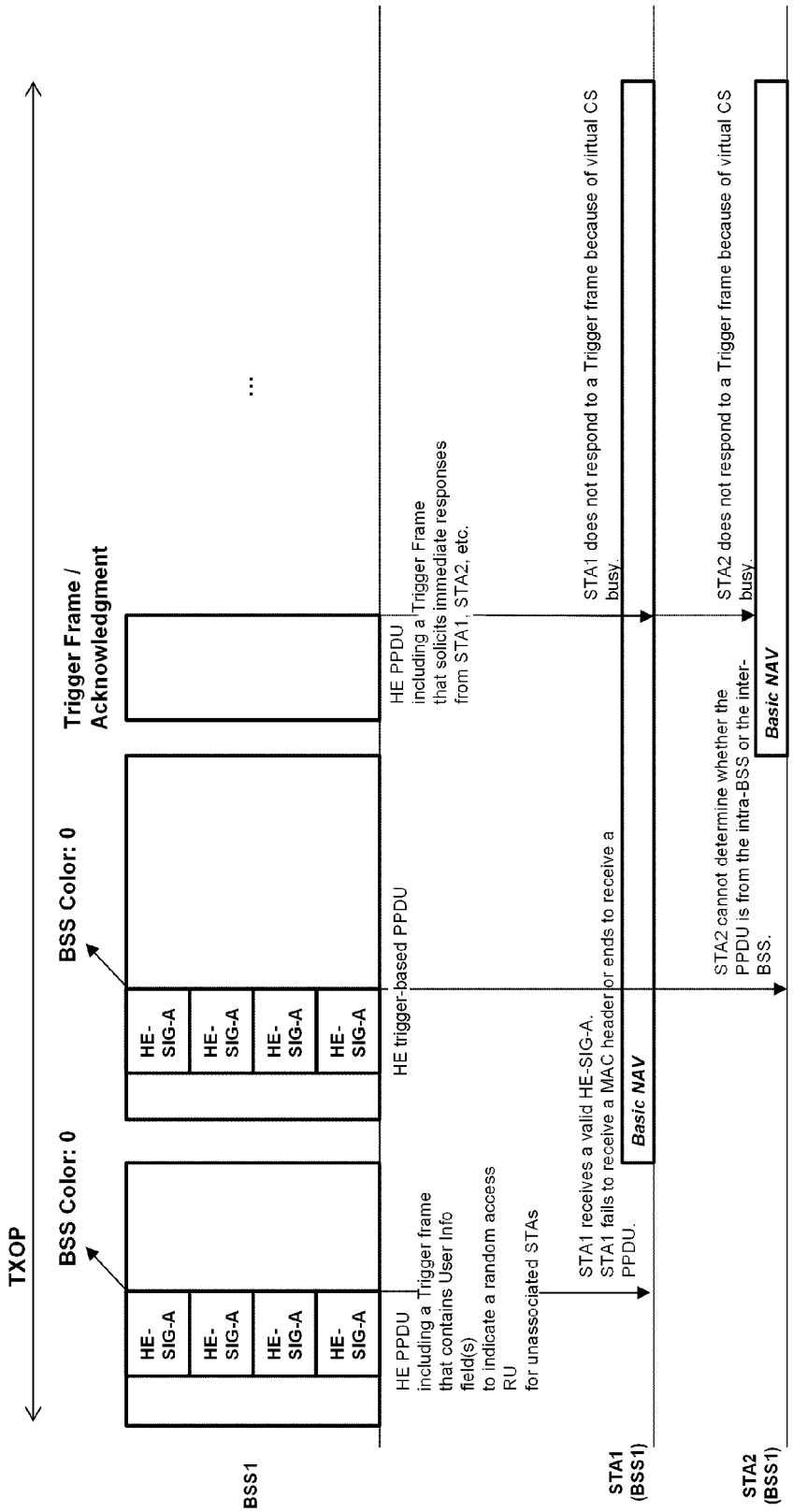
FIG. 11 shows a method of determining whether a PPDU received by a wireless communication terminal is an intra-BSS PPDU or an Inter-BSS PPDU according to an embodiment of the present invention.

FIG. 11 shows a method of determining whether a PPDU received by a wireless communication terminal is an intra-BSS PPDU or an Inter-BSS PPDU according to an embodiment of the present invention.

As described above, the wireless communication terminal may determine whether the received PPDU is an Intra-BSS PPDU or an Inter-BSS PPDU based on the BSS color indicated by the signaling field of the PPDU. In more detail, the wireless communication terminal may determine whether the corresponding PPDU is an intra-BSS PPDU or an Inter-BSS PPDU based on the value of the BSS color indicated by the PPDU received by the wireless communication terminal. The wireless communication terminal may determine the value of the BSS color indicated by the received PPDU based on the value indicated by the BSS Color field of the HE-SIG-A field of the received PPDU. In more detail, the wireless communication terminal may determine the value of the BSS color indicated by the received PPDU based on the BSS_COLOR of the RXVECTOR.

In addition, the wireless communication terminal may determine whether the frame is an Inter-BSS frame or an Intra-BSS frame based on the MAC header of the frame. Specifically, when the receiver address RA or the transmitter address TA of the MAC header of the frame received by the wireless communication terminal is the BSSID of the BSS including the wireless communication terminal or is included in the multiple BSSIDs set including the wireless communication terminal, the wireless communication terminal may identify the received frame as an Intra-BSS frame.

In addition, the wireless communication terminal may determine whether the VHT PPDU is an Inter-BSS PPDU or an Intra-BSS PPDU based on the Partial AID field of the VHT PPDU. In more detail, the wireless communication terminal may determine whether the VHT PPDU is an Inter-BSS PPDU or an Intra-BSS PPDU based on the Partial AID field and the Group ID field of the VHT PPDU. When the Group ID field of the VHT PPDU received by the wireless communication terminal is 0 and the value of the Partial AID field match the values from the 39th bit to the 47th bit included in the BSSID of the BSS including the wireless communication terminal or the BSSID included in the multiple BSSIDs set included in the BSSID of the BSS including the wireless communication terminal, the wireless communication terminal may identify the VHT PPDU as an Intra-BSS PPDU. In addition, if the Group ID field of the VHT PPDU received by the wireless communication terminal is 0 and the value of the Partial AID field do not match the values from the bit with index 39 to the bit with index 47 (BSSID[39:47]) included in the BSSID of the BSS including the wireless communication terminal or the BSSID included in the multiple BSSIDs set included in the BSSID of the BSS including the wireless communication terminal, the wireless communication terminal may identify the VHT PPDU as an Inter-BSS PPDU.

When the Group ID field of the VHT PPDU received by the wireless communication terminal is 63 and the value from the fifth bit to the eighth bit of the Partial AID field matches the value of the partial BSS color of the BSS including the wireless communication terminal, the wireless communication terminal may identify the VHT PPDU as an Intra-BSS PPDU. In addition, when the Group ID field of the VHT PPDU received by the wireless communication terminal is 63 and the values from the bit with the index 5 to the bit with the index 8 of the Partial AID field (Partial AID [5:8]) do not match the values of the partial BSS color of the BSS including the wireless communication terminal, the wireless communication terminal may identify the corresponding VHT PPDU as an Inter-BSS PPDU. The partial BSS color may be four LSBs of the BSS color of the BSS. When the base wireless communication terminal allows partial BSS color based Intra-BSS PPDU or Inter-BSS PPDU, the wireless communication terminal may determine whether the VHT PPDU received by the wireless communication terminal is an Inter-BSS PPDU or an Intra-BSS PPDU based on the partial BSS color. The base wireless communication terminal may indicate that partial BSS color based Intra-BSS PPDU or Inter-BSS PPDU identification is allowed using the Partial BSS Color field of the HE Operation element.

When the TA field of the frame received by the wireless communication terminal does not exist and the RA field matches the transmission opportunity (TXOP) holder address of the BSS including the wireless communication terminal, the wireless communication terminal may identify the frame as an Intra-BSS frame. At this point, the frame may be limited to the control frame. In addition, the TXOP holder may indicate a wireless communication terminal that obtains the TXOP through a contention procedure.

In addition, when the UL/DL field of the HE-SIG-A field of the PPDU received by the base wireless communication terminal indicates downlink transmission, the base wireless communication terminal may identify the corresponding PPDU as an Inter-BSS PPDU. In this case, the value of the UL/DL field may be 0.

In a specific embodiment, when a frame or PPDU received by a wireless communication terminal satisfies any one of the following conditions, the wireless communication terminal may determine the frame as an Intra-BSS frame or the PPDU as an Intra-BSS PPDU.

The value of the BSS color indicated by the PPDU including the frame is equal to the value of the BSS color of the BSS including the wireless communication terminal. In this case, the value of the BSS color of the BSS including the wireless communication terminal may be a value of the BSS color signaled by the base wireless communication terminal associated with the wireless communication terminal.

When the Individual/Group bit of the RA field, TA field or BSSID field of the frame is set to 0, the value of the corresponding field is equal to the BSSID of the BSS including the wireless communication terminal.

When the base wireless communication terminal associated with the wireless communication terminal is a member of the multiple BSSIDs set and sets the Individual/Group bit of the RA field, TA field, or BSSID field of the frame to 0, the value of this field is equal to the BSSID of the BSS including the wireless communication terminal.

The PPDU is a VHT PPDU, the Group ID field of the VHT PPDU is 0, and the value of the Partial AID field are equal to the values from the bit with index 37 to the bit with index 47 (BSSID [39:47]) of the BSSID of the BSS including the wireless communication terminal.

The Partial BSS Color field of the HE Operation element most recently transmitted from the BSS including the wireless communication terminal is one, the PPDU is a VHT PPDU, the Group ID field of the VHT PPDU is 63, and the values from the bit with index 5 to the bit with index 8 (Partial AID[5:8]) of the Partial AID field of the PPDU are equal to the BSS color of the partial BSS of the BSS including the wireless communication terminal.

The frame is a control frame having no TA field, and the RA field of the frame is equal to the address of the TXOP holder of the BSS including the wireless communication terminal.

In addition, when a frame or PPDU received by a wireless communication terminal satisfies any one of the following conditions, the wireless communication terminal may determine the frame as an Inter-BSS frame or the PPDU as an Inter-BSS PPDU.

The value of the BSS color indicated by the PPDU is not 0, and the value of the BSS color indicated by the PPDU is not equal to the value of the BSS color of the BSS including the wireless communication terminal. In this case, the value of the BSS color of the BSS including the wireless communication terminal may be a value of the BSS color signaled by the base wireless communication terminal associated with the wireless communication terminal.

When the Individual/Group bit of the BSSID field of the frame is set to 0, the value of the corresponding field is not equal to the BSSID of the BSS including the wireless communication terminal. In this case, the PPDU receiving the frame may not indicate the BSS color.

When the frame does not include a BSSID field and sets the Individual/Group bits of the RA and TA fields of the frame to 0, the value of any one field is not equal to the BSSID of the BSS including the wireless communication terminal.

When the base wireless communication terminal associated with the wireless communication terminal is a member of the multiple BSSIDs set and sets the Individual/Group bits of the RA field, TA field, and BSSID field of the frame to 0, the value of any one field is not equal to the BSSID of the BSS including the wireless communication terminal.

The PPDU is a VHT PPDU, the Group ID field of the PPDU is 0, and the value of the Partial AID field are not equal to the values from the bit with index 37 to the bit with index 47 (BSSID[39:47]) of the BSSID of the BSS including the wireless communication terminal.

The Partial BSS Color field of the HE Operation element most recently transmitted from the BSS including the wireless communication terminal is one, the PPDU is a VHT PPDU, the Group ID field of the VHT PPDU is 63, and the values from the bit with index 5 to the bit with index 8 (Partial AID[5:8]) of the Partial AID field of the PPDU are not identical to the BSS color of the partial BSS of the BSS including the wireless communication terminal.

The UL/DL field of the HE-SIG-A field of the PPDU received by the base wireless communication terminal indicates downlink transmission.

In the above embodiments, the wireless communication terminal may prioritize the first determination that determines whether the frame or PPDU is transmitted from the Inter-BSS or the Intra-BSS based on the MAC address over the second determination that determines whether a frame or PPDU is transmitted from Inter-BSS or Intra-BSS based on the BSS color indicated by the PPDU. As described above, the PPDU may indicate the BSS color through the BSS Color of the HE-SIG-A field. In addition, the PPDU may indicate the BSS color through the Group ID field Partial AID field. In addition, when a frame or PPDU satisfies both an Intra-BSS frame or PPDU condition and an Inter-BSS frame or PPDU condition, the wireless communication terminal may determine the corresponding frame or PPDU as an Inter-BSS frame or PPDU. In addition, when a frame or PPDU does not satisfy both an Intra-BSS frame or PPDU condition and an Inter-BSS frame or PPDU condition, the wireless communication terminal may not determine the corresponding frame or PPDU as an Inter-BSS frame or PPDU, or an Intra-BSS frame or PPDU.

The wireless communication terminal may maintain a network allocation vector (NAV), which is an indicator that indicates that transmission that the wireless communication terminal did not initiate continues on a wireless medium. In more detail, the wireless communication terminal may set the NAV based on the duration information indicated by the Duration/ID field of the MAC header. In addition, the wireless communication terminal may set the NAV based on the duration information indicated by the TXOP Duration field of the HE-SIG-A of the PPDU. In this case, when the TXOP Duration field of the HE-SIG-A of the PPDU indicates duration information, the wireless communication terminal may set the NAV based on the TXOP Duration field of the HE-SIG-A of the PPDU. For example, when all bits of the TXOP Duration field of the HE-SIG-A of the PPDU are set to 1, the wireless communication terminal may not set the NAV based on the TXOP Duration field of the HE-SIG-A of the PPDU. In these embodiments, when the value of TXOP indicated by the duration information obtained by a wireless communication terminal from the Duration/field of the MAC header or the TXOP Duration field of the HE-SIG-A of the PPDU is greater than the current NAV, the wireless communication terminal may set the NAV according to the obtained duration information.

The wireless communication terminal may manage the NAV differently depending on whether the frame or the PPDU is transmitted from the Intra-BSS. Through this, the wireless communication terminal can increase the efficiency of using a wireless medium when there is an OBSS. In more detail, the wireless communication terminal may maintain two NAVs, that is, an Intra-BSS NAV set based on an Intra-BSS PPDU or a frame, and a Basic NAV set based on an Inter-BSS PPDU or a frame. In this case, the wireless communication terminal may set a basic NAV based on a PPDU or frame that cannot be identified as an Inter-BSS PPDU or frame or as an Intra-BSS PPDU or frame. A detailed operation related to NAV setting of a wireless communication terminal will be described.

When a frame or a PPDU including the corresponding frame does not solicit an immediate response, the wireless communication terminal may set the Intra-BSS NAV based on the Duration/ID field of the MAC header of the corresponding frame or the TXOP Duration field of the corresponding PPDU. In addition, when the wireless communication terminal does not transmit an immediate response even when the frame or the PPDU including the corresponding frame solicits an immediate response, the wireless communication terminal may set the Intra-BSS NAV based on the Duration/ID field of the MAC header of the corresponding frame or the TXOP Duration field of the corresponding PPDU. In addition, when the wireless communication terminal is a TXOP holder, it is possible to set the NAV based only on frames that are not solicited by the wireless communication terminal.

In addition, when the wireless communication terminal does not obtain the duration information from the Duration/ID field of the frame included in the PPDU, the wireless communication terminal may be allowed to set the NAV based on the HE-SIG-A TXOP Duration field of the PPDU. When the wireless communication terminal obtains the duration information from the Duration/ID field of the frame included in the PPDU and the duration information from the TXOP Duration field of the HE-SIG-A of the PPDU, the wireless communication terminal may ignore the duration information obtained from the TXOP Duration field of the HE-SIG-A of the corresponding PPDU. In this case, the wireless communication terminal may set the NAV according to the duration information obtained from the Duration/ID field of the corresponding frame.

In addition, when the PPDU received by the wireless communication terminal is not triggered by the wireless communication terminal, the wireless communication terminal may be allowed to set the NAV based on the HE-SIG-A TXOP Duration field of the PPDU.

According to the embodiments described above, when the wireless communication terminal transmits a trigger-based PPDU, the wireless communication terminal may set the BSS color indicated by the trigger-based PPDU according to the BSS color of the PPDU including the trigger frame soliciting the trigger-based PPDU. In more detail, the wireless communication terminal may set the BSS Color field of the HE-SIG-A field of the trigger based PPDU according to the BSS color of the PPDU including the trigger frame soliciting the trigger based PPDU. When the PPDU including the trigger frame soliciting the trigger-based PPDU does not indicate BSS color, the wireless communication terminal may set the BSS Color field of the HE-SIG-A field of the trigger-based PPDU using the value of the BSS Color field of the HE operation element most recently received. In addition, when the PPDU including the trigger frame soliciting the trigger-based PPDU reaches the BSS Color change time point without indicating the BSS color, the wireless communication terminal may set the BSS Color field of the HE-SIG-A field of the trigger-based PPDU using the New BSS Color field value of the most recently received BSS Color Change Announcement element. In this case, the BSS Color change time point may be a time point at which a predetermined number of TBTTs elapse since the BSS Color Change Announcement element is changed from the base wireless communication terminal.

In addition, when the intended receiver of the trigger frame is unassociated with the base wireless communication terminal that transmits the trigger frame, as described above, the base wireless communication terminal may set the value of the BSS color indicated by the PPDU including the trigger frame to 0. In this case, since the value of the BSS color indicated by the PPDU is 0, when the wireless communication terminal that receives the PPDU including the trigger frame fails to decode the frame included in the PPDU, the wireless communication terminal cannot determine whether the corresponding PPDU is an Intra-BSS PPDU or an Inter-BSS PPDU. Therefore, the wireless communication terminal receiving the PPDU including the trigger frame may set the basic NAV based on the TXOP Duration field of the corresponding PPDU according to the above-described embodiment. In this case, when the PPDU is transmitted in a modulation method not supported by the wireless communication terminal, the wireless communication terminal may not be able to decode a frame included in the corresponding PPDU. In more detail, the PPDU may be transmitted in an MCS, a DCM, and a coding type that the wireless communication terminal does not support. In addition, after the wireless communication terminal receives the preamble of the PPDU, frame decoding may fail. In addition, when the PPDU is a trigger-based PPDU, since the wireless communication terminal cannot determine the composition of the PPDU and the PSDU, it may not be able to receive a frame included in the PPDU.

In this situation, when the PPDU is transmitted from the base wireless communication terminal associated with the wireless communication terminal, the wireless communication terminal updates the basic NAV even though the Intra-BSS NAV needs to be updated. As the basic NAV is set, the wireless communication terminal may not transmit an immediate response to the base wireless communication terminal even when the base wireless communication terminal associated with the corresponding wireless communication terminal requests an immediate response. When the base wireless communication terminal associated with the wireless communication terminal requests an immediate response, the corresponding wireless communication terminal may ignore the Intra-BSS NAV and transmit the immediate response. When the base wireless communication terminal associated with the wireless communication terminal requests an immediate response, the corresponding wireless communication terminal may ignore the Intra-BSS NAV and transmit the immediate response. However, this is because even if the base wireless communication terminal associated with the wireless communication terminal requests the immediate response, the wireless communication terminal cannot ignore the basic NAV and transmit the immediate response.

In the embodiment of FIG. 11, the AP operating the first BSS BSS1 transmits a trigger frame that triggers random access of a station unassociated with the AP. In this case, the AP sets the BSS Color field of the HE-SIG-A of the PPDU including the trigger frame to 0. The first station STA1 included in the first BSS BSS1 configures the basic NAV based on the PPDU including the trigger frame.

The wireless communication terminal not included in the first BSS BSS1 sets the BSS color to 0 to transmit the trigger-based PPDU. The second station STA2 included in the first BSS BSS1 sets the basic NAV based on the trigger-based PPDU.

Thereafter, the AP operating the first BSS BSS1 transmits a trigger frame for triggering transmission of the first station STA1 and the second station STA2. The first station STA1 and the second station STA2 determine that the channel used for transmission is busy due to the basic NAV, and does not transmit the trigger based PPDU.

Figure 12:
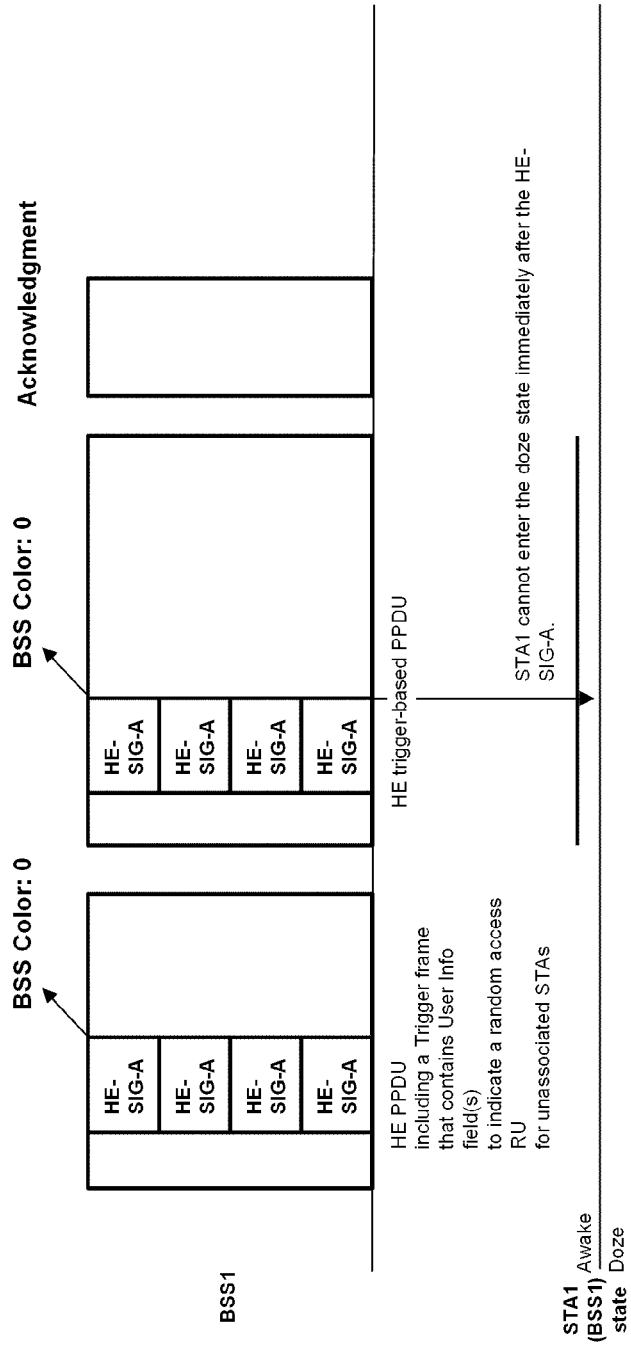
FIG. 12 shows a power save operation of a wireless communication terminal according to an embodiment of the present invention.

FIG. 12 shows a power save operation of a wireless communication terminal according to an embodiment of the present invention.

While the PPDU is transmitted between other wireless communication terminals in the BSS including the wireless communication terminal, the wireless communication terminal may determine that the PPDU cannot be received or transmitted. In this case, the wireless communication terminal may enter a doze state. The doze state may indicate a state in which the wireless communication terminal turns off a part of functions to reduce power consumption. In detail, when the wireless communication terminal receives an Intra-BSS PPDU of which the wireless communication terminal is not the intended receiver, the wireless communication terminal may maintain the doze state while the corresponding PPDU is transmitted. This is because when the wireless communication terminal receives the Intra-BSS PPDU, and the wireless communication terminal is not the intended receiver of the PPDU, the wireless communication terminal cannot receive or transmit the PPDU while the corresponding PPDU is transmitted. In a specific embodiment, the wireless communication terminal which is not the base wireless communication terminal may determine that the wireless communication terminal is not an intended receiver of an Uplink (UL) PPDU. In addition, when the wireless communication terminal which is not the base wireless communication terminal receives a Downlink (DL) PPDU, and the identifier of the receiver indicated by the signaling field of the corresponding PPDU does not indicate the wireless communication terminal, the wireless communication terminal may determine that the wireless communication terminal is not the intended receiver of the PPDU. For example, when the HE-SIG-B field of the HE MU PPDU does not indicate an Association ID (AID) of the wireless communication terminal, the wireless communication terminal may determine that it is not an intended receiver of the corresponding PPDU. Operation of such a wireless communication terminal may be referred to as an Intra-PPDU power save.

Intra-PPDU power save operation is described in more detail. When a wireless communication terminal other than the base wireless communication terminal receives a PPDU satisfying any one of the following conditions, the wireless communication terminal other than the base wireless communication terminal may maintain the doze state until transmission of the corresponding PPDU is terminated.

The PPDU is a HE MU PPDU, the BSS Color field of the HE-SIG-A field of the PPDU is equal to the BSS color of the BSS including the wireless communication terminal, the UL/DL field of the HE-SIG-A field of the PPDU indicates downlink transmission, and the HE-SIG-B of the PPDU does not include a STA ID field indicating a wireless communication terminal or a broadcast ID indicating a plurality of wireless communication terminals including the wireless communication terminal.

The PPDU is HE MU PPDU, HE SU PPDU or HE ER SU PPDU, the BSS Color field of the HE-SIG-A field of the PPDU is equal to the BSS color of the BSS including the wireless communication terminal, and the UL/DL field of the HE-SIG-A field of the PPDU indicates uplink transmission.

The PPDU is HE MU PPDU, HE SU PPDU or HE ER SU PPDU, the BSS Color field of the HE-SIG-A field of the PPDU is equal to the BSS color of the BSS including the wireless communication terminal, the UL/DL field of the HE-SIG-A field of the PPDU indicates uplink transmission, and the PPDU is transmitted at a rate not supported by the wireless communication terminal.

The PPDU is a trigger-based PPDU, and the BSS Color field of the HE-SIG-A field of the PPDU is equal to the BSS color of the BSS including the wireless communication terminal.

The PPDU is a VHT PPDU, the value of the Partial AID field of the PPDU are equal to the values from the bit with index 37 to the bit with index 47 (BSSID[39:47]) of the BSSID of the BSS including the wireless communication terminal, and the value of the Group ID field of the PPDU is 0.

The MPDU included in the PPDU includes an RA field, a TA field, or a BSSID field indicating any one of a BSSID of a BSS including the wireless communication terminal or a BISSID of a multiple BSSIDs set including a BSSID of a BSS including the wireless communication terminal. The RA field does not indicate the MAC address of the wireless communication terminal.

The wireless communication terminal may set the value indicated by the UL/DL field of the HE-SIG-A field of the transmitting PPDU to downlink or UL_FLAG of TXVECTOR. In addition, the wireless communication terminal may set the value indicated by the BSS Color field of the HE-SIG-A field of the transmitted PPDU to BSS_COLOR of TXVECTOR.

The wireless communication terminal may determine the value indicated by the UL/DL field of the HE-SIG-A field of the received PPDU based on the UL_FLAG of the RXVECTOR. The wireless communication terminal may determine the value indicated by the BSS Color field of the HE-SIG-A field of the received PPDU based on the BSS_COLOR of the RXVECTOR. The wireless communication terminal may determine whether the PPDU is transmitted at a rate not supported by the wireless communication terminal based on whether PHY-RXEND.indication(UnsupportedRate) primitive is received in the MAC layer.

In the embodiment of FIG. 12, the AP operating the first BSS BSS1 transmits a trigger frame that triggers random access of a station unassociated with the AP. In this case, the AP sets the BSS Color field of the HE-SIG-A of the PPDU including the trigger frame to 0. The wireless communication terminal not included in the first BSS BSS1 sets the BSS color to 0 to transmit the trigger-based PPDU. Since the value of the BSS color indicated by the trigger-based PPDU is 0, the first station STA1 included in the first BSS BSS1 may not perform the Intra-BSS power save operation immediately after decoding the signaling field of the PPDU. When the first station STA1 decodes the MAC header of the trigger-based PPDU, the first station STA1 may maintain the doze state until the transmission of the trigger-based PPDU is terminated. When the PPDU indicates that a value of the BSS color is 0 in such a way, although the wireless communication terminal is able to perform the Intra-BSS power save operation, the wireless communication terminal may not be able to determine whether the received PPDU is Intra-BSS and thus may not perform the Intra-BSS power save operation.

Figure 13:
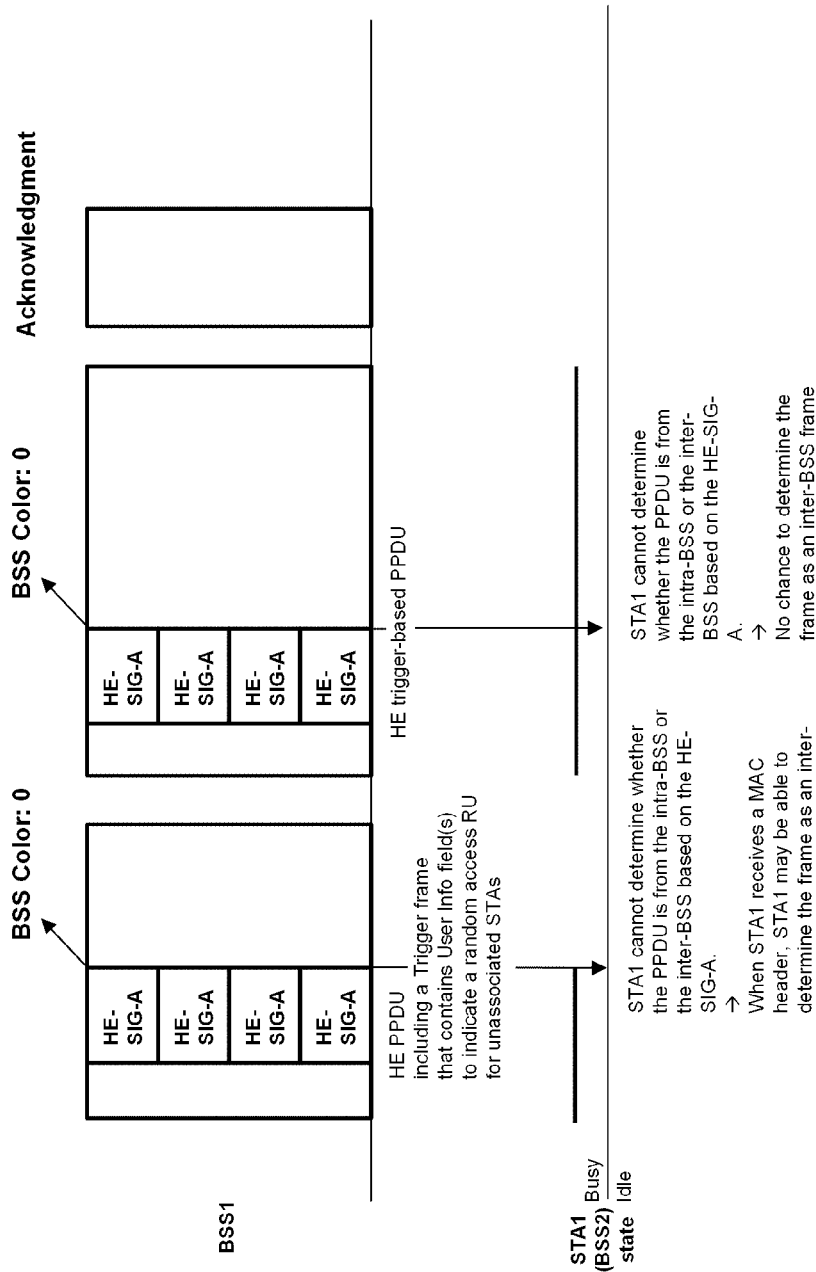
FIG. 13 shows an operation of performing a UL MU transmission by a wireless communication terminal according to an embodiment of the present invention.

FIG. 13 shows an operation of performing a UL MU transmission by a wireless communication terminal according to an embodiment of the present invention.

As described above, when the Intra-BSS PPDU is transmitted while the Inter-BSS PPDU is transmitted, the wireless communication terminal may perform CCA using a PD threshold level having a value equal to or greater than a used PD threshold level. In this case, the PD threshold used by the wireless communication terminal may be referred to as an OBSS PD threshold. Through this, the wireless communication terminal can increase the probability that the channel is idle than when the Intra-BSS PPDU is transmitted while the Inter-BSS PPDU is transmitted. However, when the value of the BSS color indicated by the PPDU is 0, the wireless communication terminal cannot perform the OBSS PD based SR operation.

In the embodiment of FIG. 13, the AP operating the first BSS BSS1 transmits a trigger frame that triggers random access of a station unassociated with the AP. In this case, the AP sets the BSS Color field of the HE-SIG-A of the PPDU including the trigger frame to 0. The first station STA1 included in the second BSS BSS2 cannot identify that the PPDU including the trigger frame is an Inter-BSS PDDU until the trigger frame is decoded. Accordingly, the first station STA1 may determine whether the channel is idle by using the OBSS PD threshold after decoding the trigger frame. In the embodiment of FIG. 13, since the first station STA1 uses the OBSS PD threshold larger than the normal PD threshold after decoding the trigger frame, the first station STA1 determines that a channel previously determined to be busy is idle.

The wireless communication terminal not included in the first BSS BSS1 sets the BSS color to 0 to transmit the trigger-based PPDU. Since the value of the BSS color indicated by the trigger-based PPDU is 0, the first station STA1 cannot identify whether the trigger-based PPDU is an Inter-BSS PPDU. In addition, since the first station STA1 cannot decode the payload of the trigger based PPDU, the first station STA1 cannot perform the OBSS PD based SR operation while the trigger based PPDU is transmitted.

In order to solve the problem described with reference to FIGS. 11 to 13, an operation of a wireless communication terminal to be described below may be considered.

Figure 14:
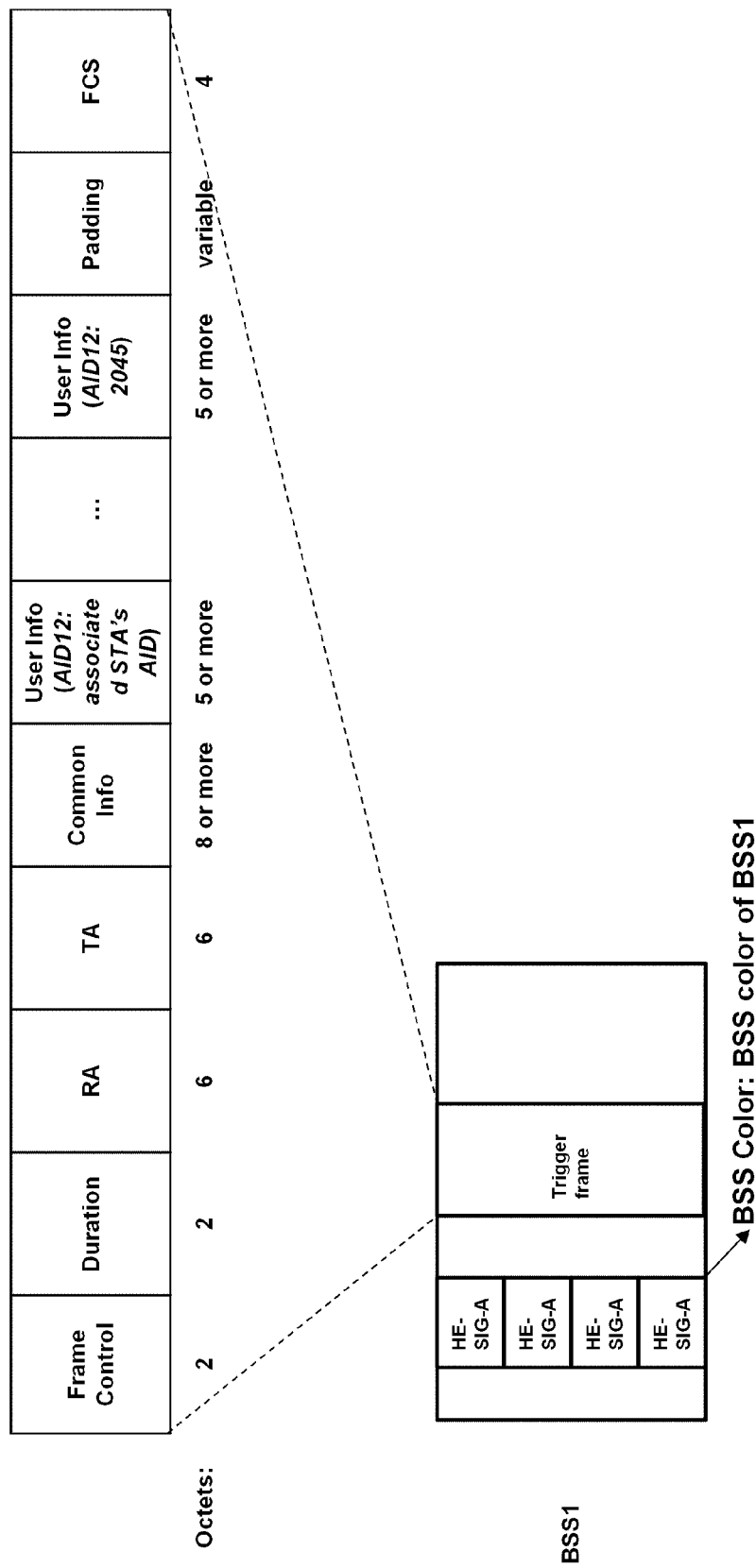
FIG. 14 shows a method of configuring a BSS color of a corresponding PPDU when a base wireless communication terminal according to an embodiment of the present invention transmits a PPDU including a trigger frame that triggers the transmissions of a wireless communication terminal unassociated with a base wireless communication terminal and a wireless communication terminal associated with a base wireless communication terminal.

FIG. 14 shows a method of setting a BSS color of a corresponding PPDU when a base wireless communication terminal according to an embodiment of the present invention transmits a PPDU including a trigger frame that triggers the transmissions of a wireless communication terminal unassociated with a base wireless communication terminal and a wireless communication terminal associated with a base wireless communication terminal.

The base wireless communication terminal may set the value of the BSS color indicated by the PPDU including the trigger information to the value of the BSS color of the BSS operated by the base wireless communication terminal other than 0. Specifically, when the trigger information triggers the transmission of the wireless communication terminal that is not included in the BSS operated by the base wireless communication terminal, the base wireless communication terminal may set the value of the BSS color indicated by the PPDU including the trigger information to the value of the BSS color of the BSS operated by the base wireless communication terminal. The trigger information for triggering the transmission of the wireless communication terminal not included in the BSS operated by the base wireless communication terminal may be a trigger frame for triggering random access of the wireless communication terminal not included in the BSS operated by the base wireless communication terminal. In addition, the PPDU including the trigger information may be a PPDU including a trigger frame for triggering transmission of a wireless communication terminal not included in a BSS operated by the base wireless communication terminal and a frame transmitted to a wireless communication terminal included in a BSS operated by the base wireless communication terminal. The PPDU including the trigger information may be a PPDU including a trigger frame for triggering transmission of a wireless communication terminal not included in a BSS operated by the base wireless communication terminal and a frame transmitted to a wireless communication terminal included in a BSS operated by the base wireless communication terminal. In addition, the PPDU including the trigger information may be a PPDU including a trigger frame for triggering the transmission of a wireless communication terminal not included in a BSS operated by the base wireless communication terminal and the transmission of a wireless communication terminal included in a BSS operated by the base wireless communication terminal.

In the embodiment of FIG. 14, the AP operating the first BSS BSS1 transmits a PPDU including a trigger frame. In this case, the base wireless communication terminal sets the AID field values of the User Info field of the trigger frame to 12 and 2045 to perform transmission of the first station AID 12 associated with the AP and trigger random access of the wireless communication terminal unassociated with the AP. Therefore, the AP sets the value of the BSS color indicated by the PPDU to the value of the BSS color of the first BSS BSS1.

Through these embodiments, the wireless communication terminal can solve the problem caused by not determining whether the PPDU received by the wireless communication terminal is an Intra-BSS PPDU or an Inter-BSS PPDU. In addition, the wireless communication terminal may apply these embodiments to the HE SU PPDU or the HE ER SU PPDU.

Figure 15:
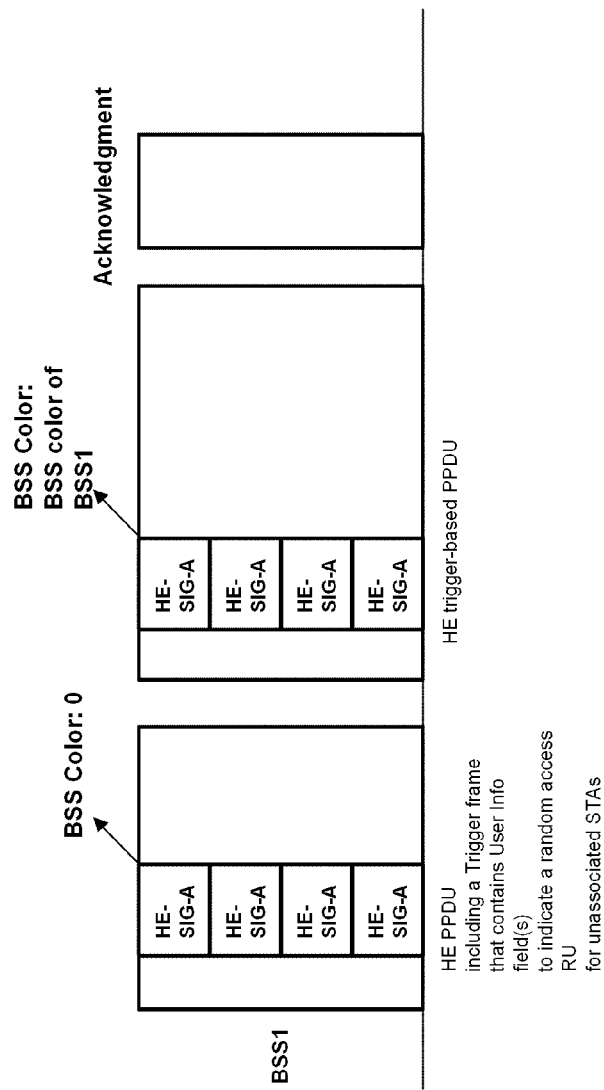
FIG. 15 shows a method of configuring a BSS color of a corresponding PPDU when a base wireless communication terminal according to an embodiment of the present invention transmits a PPDU to a wireless communication terminal included in a multiple BSSIDs set including a BSS operated by the base wireless communication terminal.

FIG. 15 shows a method of setting a BSS color of a corresponding PPDU when a base wireless communication terminal according to an embodiment of the present invention transmits a PPDU to a wireless communication terminal included in a multiple BSSIDs set including a BSS operated by the base wireless communication terminal.

As described above, when the base wireless communication terminal transmits a PPDU including trigger information for triggering the transmission of the wireless communication terminal included in the multiple BSSIDs set including the BSS operated by the base wireless communication terminal, the base wireless communication terminal may set the value of the BSS color indicated by the PPDU to 0. In addition, the wireless communication terminal including the trigger information and receiving the PPDU indicating the value 0 of the BSS color may set the value of the BSS color indicated by the trigger-based PPDU to 0 to transmit the trigger-based PPDU to the base wireless communication terminal. In this embodiment, similarly to those described with reference to FIGS. 11 to 13, a problem may occur in which wireless communication terminals cannot identify whether a PPDU is an Inter-BSS PPDU or an Intra-BSS PPDU.

When the intended receiver of the PPDU includes a wireless communication terminal included in a BSS operated by a base wireless communication terminal and a wireless communication terminal of the BSS corresponding to the multiple BSSIDs set including the BSSID of the BSS operated by the base wireless communication terminal, the base wireless communication terminal may set the value of the BSS color indicated by the PPDU to the value of the BSS color of the BSS operated by the base wireless communication terminal. In more detail, when the base wireless communication terminal transmits a PPDU including trigger information for triggering the transmission of the wireless communication terminal included in the multiple BSSIDs set including the BSS operated by the base wireless communication terminal, the base wireless communication terminal may set the value of the BSS color indicated by the PPDU to the value of the BSS color of the BSS operated by the base wireless communication terminal.

In addition, the wireless communication terminal may set the value of the BSS color indicated by the trigger-based PPDU to a value other than 0. In the above-described embodiment, the wireless communication terminal may set the value of the BSS color indicated by the trigger-based PPDU to the value of the BSS color indicated by the PPDU including trigger information. In addition, when the PPDU received by the wireless communication terminal includes trigger information and the value of the BSS color indicated by the PPDU is 0, the wireless communication terminal may set the value of the BSS color indicated by the trigger-based PPDU to the value of the BSS color of the BSS operated by the base wireless communication terminal that transmits the trigger information. The wireless communication terminal may transmit the trigger-based PPDU as a response to the PPDU including the trigger information. In this case, the wireless communication terminal may obtain the value of BSS color of the BSS operated by the base wireless communication terminal from the HE Operation element previously transmitted by the base wireless communication terminal. In addition, the base wireless communication terminal may obtain the value of the BSS color of the BSS operated by the base wireless communication terminal from the trigger frame. This will be described in more detail with reference to FIG. 16.

In the embodiment of FIG. 15, the AP operating the first BSS BSS1 transmits a PPDU including a trigger frame. In this case, the trigger frame triggers random access of a station not included in the first BSS BSS1, and the base wireless communication terminal sets the value of the BSS color indicated by the PPDU including the trigger frame to 0. The station transmitting the trigger-based PPDU based on the trigger frame sets the value of the BSS color indicated by the trigger-based PPDU to the BSS color of the first BSS BSS1 to transmit the trigger-based PPDU to the AP.

Before the wireless communication terminal obtains the UORA parameter set element from the base wireless communication terminal, the wireless communication terminal may attempt random access based on the trigger frame transmitted by the base wireless communication terminal. Specifically, when the trigger frame triggers random access of the wireless communication terminal unassociated with the base wireless communication terminal, the unassociated wireless communication terminal may attempt random access to the base wireless communication terminal before obtaining the UORA parameter set element from the base wireless communication terminal. In this case, the unassociated wireless communication terminal may attempt random access using a predetermined default UORA parameter set element. Similarly, the PPDU including the trigger frame may not indicate the value of the BSS color of the BSS in which the PPDU is transmitted and the wireless communication terminal may not obtain the HE Operation element from the base wireless communication terminal that transmits the trigger frame. In more detail, the PPDU including the trigger frame may be a non-HE PPDU. In addition, the value of the BSS color indicated by the PPDU including the trigger frame may be 0. Accordingly, the base wireless communication terminal may signal the BSS color of the BSS operated by the base wireless communication terminal through a trigger frame. Through this, the wireless communication terminal transmitting the trigger-based PPDU cannot obtain the BSS color of the BSS operated by the base wireless communication terminal transmitting the trigger frame so that it is possible to prevent failing to set a value of the BSS color indicated by the trigger-based PPDU. This will be described with reference to FIG. 16.

FIG. 16 shows the format of a User Info field of a trigger frame according to an embodiment of the present invention.

The trigger frame may include a field indicating a value of BSS color of the BSS operated by the base wireless communication terminal transmitting the trigger frame. In more detail, the Common Info field of the trigger frame may include a field indicating a value of BSS color value the BSS operated by the base wireless communication terminal transmitting the trigger frame. For convenience of description, a field indicating a value of BSS color is referred to as a BSS Color field. In more detail, the Common Info field of the trigger frame may selectively include a BSS Color field for transmitting the trigger frame. According to a specific embodiment, when the trigger type of the trigger frame is a predefined type, the Common Info field may selectively include a BSS Color field for transmitting the trigger frame. In this case, the predetermined trigger type may indicate a trigger frame that triggers random access of a wireless communication terminal unassociated with a base wireless communication terminal that transmits the trigger frame.

In another specific embodiment, the User Info field of the trigger frame may include a BSS Color field for transmitting the trigger frame. In more detail, the User Info field of the trigger frame may selectively include a BSS Color field for transmitting the trigger frame. For example, when the User Info field indicates a wireless communication terminal unassociated with the base wireless communication terminal transmitting the trigger frame, the User Info field may include a BSS Color field transmitting the trigger frame. In this case, the User Info field may include a BSS Color field for transmitting a trigger frame instead of the SS Allocation field. In this case, the wireless communication terminal may assume that the SS Allocation field indicates a predetermined value. For example, the wireless communication terminal may regard that the SS Allocation field indicates that both STARTING_SS_NUM and NUM_SS are 1.

FIG. 16(a) shows a specific format of a User info field when the User Info field is associated with a base wireless communication terminal that transmits a trigger frame. In addition, FIG. 16(b) shows a specific format of a User info field including a BSS Color field when the User Info field is unassociated with a base wireless communication terminal transmitting a trigger frame in a specific embodiment. In this case, the BSS Color field is a BSS Color field for transmitting a trigger frame.

In another specific embodiment, when the User Info field indicates a wireless communication terminal unassociated with the base wireless communication terminal transmitting the trigger frame, the User Info field may further include a BSS Color field transmitting the trigger frame. In this case, the length of the User Info field indicating a wireless communication terminal unassociated with the base wireless communication terminal transmitting the trigger frame is different from the length of the User Info field indicating a wireless communication terminal associated with the base wireless communication terminal transmitting the trigger frame. But, in the trigger frame, when among the User Info fields, a User Info field indicating a wireless communication terminal unassociated with a base wireless communication terminal transmitting a trigger frame is located behind another User Info field and the wireless communication terminal has a User Info field indicating the wireless communication terminal, it may not decode anymore. Therefore, even if the trigger frame includes a User Info field having a different length, the User Info field indicating the wireless communication terminal can be found.

In addition, the base wireless communication terminal may obtain the value of the BSS color of the BSS operated by the base wireless communication terminal from the trigger frame. In more detail, the wireless communication terminal may obtain a value of BSS color of the BSS operated by the base wireless communication terminal from the BSS Color field included in the trigger frame.

In another specific embodiment, when the base wireless communication terminal triggers transmission of a wireless communication terminal unassociated with the base wireless communication terminal using a trigger frame, the wireless communication terminal can transmit the trigger-based PPDU only when the HE operation element transmitted by the base wireless communication terminal is obtained. This will be described with reference to FIG. 17.

Figure 17:
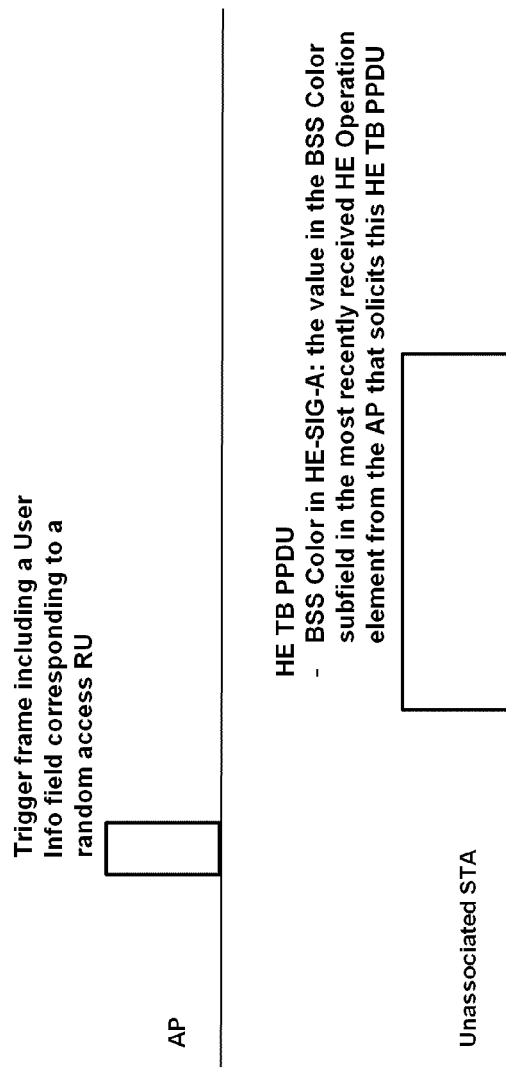
FIG. 17 shows a method in which a wireless communication terminal sets a value of a BSS color indicated by a trigger based PPDU when a wireless communication terminal according to an embodiment of the present invention transmits a trigger-based PPDU to a base wireless communication terminal unassociated with the wireless communication terminal.

FIG. 17 shows a method in which a wireless communication terminal sets a value of a BSS color indicated by a trigger based PPDU when a wireless communication terminal according to an embodiment of the present invention transmits a trigger-based PPDU to a base wireless communication terminal unassociated with the wireless communication terminal.

Specifically, when the wireless communication terminal is unassociated with the base wireless communication terminal that transmits the trigger frame, the wireless communication terminal may attempt uplink transmission based random access for the base wireless communication terminal based on whether the HE Operation element is obtained from the base wireless communication terminal. Specifically, when the wireless communication terminal is unassociated with the base wireless communication terminal that transmits the trigger frame and the wireless communication terminal obtains the HE Operation element from the base wireless communication terminal, the wireless communication terminal may attempt uplink transmission based random access to the base wireless communication terminal based on the trigger frame. In this case, the wireless communication terminal may set the value of the signaling field of the trigger-based PPDU to indicate the value of the BSS Color field of the HE Operation element obtained by the trigger-based PPDU. In addition, when the wireless communication terminal is unassociated with the base wireless communication terminal that transmits the trigger frame and the wireless communication terminal does not obtain the HE Operation element from the base wireless communication terminal, the wireless communication terminal may not perform uplink transmission based random access to the base wireless communication terminal based on the trigger frame. However, when the wireless communication terminal is unassociated with the base wireless communication terminal that transmits the trigger frame, and the wireless communication terminal receives the PPDU including the trigger frame and the signaling field indicating the BSS color, the wireless communication terminal may perform uplink transmission based random access to the base wireless communication terminal based on the trigger frame even when the HE operation element is not obtained.

In the embodiment of FIG. 17, the AP transmits a trigger frame that triggers random access of a station unassociated with the AP. In this case, the wireless communication terminal that receives the HE Operation element from the AP among the stations unassociated with the AP performs uplink transmission based random access based on the trigger frame. In addition, the wireless communication terminal may set the value of the BSS Color field of the HE-SIG-A field of the trigger-based PPDU to the value of the BSS Color field of the HE Operation element obtained from the AP.

In addition, the wireless communication terminal may set the value of the signaling field of the trigger-based PPDU so that the trigger-based PPDU indicates the active BSS color corresponding to the BSS operated by the base wireless communication terminal instead of the value of the BSS Color field of the HE Operation element. Specifically, after the BSS color change time point, the wireless communication terminal may set a value of a signaling field of the trigger-based PPDU such that the trigger-based PPDU indicates a value of the BSS color signaled by the base wireless communication terminal through the BSS color change information.

In the above-described embodiments, the base wireless communication terminal may correspond to a multiple BSSIDs set. In this case, the wireless communication terminal may receive the HE Operation element from the base wireless communication terminal to obtain the HE Operation element from the base wireless communication terminal of the reference BSSID, and regard the HE Operation element from the base wireless communication terminal of the reference BSSID in the same manner as the HE Operation element obtained from the base wireless communication terminal.

In another specific embodiment, when the base wireless communication terminal triggers transmission of a wireless communication terminal unassociated with the base wireless communication terminal using a trigger frame, the wireless communication terminal may transmit only the PPDU indicating the value of the BSS color. In this case, the PPDU indicating the value of the BSS color may be a HE PPDU. In this case, transmission of a wireless communication terminal unassociated with the base wireless communication terminal may indicate uplink transmission based random access.

As described above, the value of the BSS color may be indicated by using the Partial AID field of the VHT SU PPDU. This will be described with reference to FIGS. 18 to 19.

FIG. 18 shows a method of a wireless communication terminal to set TXVECTOR parameters GROUP_ID and PARTIAL_AID of a VHT SU PPDU according to an embodiment of the present invention.

The table of FIG. 18 shows a GROUP_IP and PARTIAL_AID setting method for each condition. In this case, [b:c] represents a value from the bit index b to the bit index c. In addition, bit n represents a bit index n. Accordingly, bit 0 represents an Individual/Group bit and bit 47 represents the last bit of the Partial AID field. In addition, the bit position b may be scaled to 2^0, and the bit position c may be scaled to 2^(c-b). The base wireless communication terminal may not allocate a value of AID having a PARTIAL_AID value of 0 to the wireless communication terminal.

The base wireless communication terminal may indicate the value of the BSS color of the BSS operated by the base wireless communication terminal using the value of the Partial AID field. In more detail, the base wireless communication terminal may set a value of the partial AID field by using a part of bits of the value of the BSS color of the BSS operated by the base wireless communication terminal. In more detail, the base wireless communication terminal may set a value of the partial AID field by using the following equation.

AID[5:8]=bin[(BCB[0:3]–(BSSID[44:47]XOR BSSID[40:43]))mod 2^4,4]

BCB [0: 3] may represent a value (4 LSBs) from bit index 0 to bit index 3 of the BSS color of the BSS. In addition, bin [x, 4] may be a value representing a decimal value x as a 4-bit binary vector. As described above, the base wireless communication terminal may set the Partial BSS Color field of the HE Operation element to 1, and then set the value of the Partial AID field using some bits of the value of the BSS color. The wireless communication terminal may determine whether the PPDU received by the wireless communication terminal is an Inter-BSS PPDU or an Inter-BSS PPDU using the value of the Partial AID field according to the above-described Inter-BSS PPDU and Intra-BSS PPDU determination methods. Specifically, when the value of the Group ID field is 63 and the value of the Partial AID field is not 0, the wireless communication terminal may determine whether the PPDU received by the wireless communication terminal is an Inter-BSS PPDU or an Inter-BSS PPDU using the value of the Partial AID field.

FIG. 19 is a view of determining whether a VHT PPDU received by a wireless communication terminal according to an embodiment of the present invention is an Inter-BSS PPDU or an Intra-BSS PPDU using the value of the Partial AID field of the signaling field of the VHT PPDU received by the wireless communication terminal.

In the embodiment described with reference to FIG. 18, when the value of the BSS color is 48(b110000) or 16(b010000), 4 LSBs of the Partial AID field of the PPDU are set to 0. In addition, when the base wireless communication terminal transmits the VHT PPDU to a wireless communication terminal unassociated with the base wireless communication terminal, the base wireless communication terminal sets the Group ID field to 63 and sets 4 LSBs of the Partial AID field to 0. The wireless communication terminal that is included in a BSS in which a value of the BSS color is 48(b110000) or 16(b010000) and is unassociated with the base wireless communication terminal may determine that the PPDU is an Intra-BSS PPDU even though the PPDU is an Inter-BSS PPDU. In the embodiment of FIG. 19, the value of the partial BSS color of the first BSS BSS1 is 0. Therefore, when an AP other than the AP operating the first BSS BSS1 transmits the VHT PPDU by setting the value of the Group ID field of the VHT PPDU to 63 and the 4 LSBs of the Partial AID field to 0, the station included in the first BSS BSS1 may determine the VHT PPDU as an intra-BSS PPDU. Accordingly, the station included in the first BSS BSS1 may perform CCA by applying a PD threshold other than the OBSS PD threshold to the corresponding VHT PPDU. In addition, when the value of the BSS color of the BSS operated by the base wireless communication terminal is 48(b110000) or 16(b010000), even when the base wireless communication terminal transmits the VHT PPDU to the wireless communication terminal associated with the base wireless communication terminal, the base wireless communication terminal sets 4 LSBs of the Partial AID field of the VHT PPDU to 0. Accordingly, the wireless communication terminal capable of performing the SR operation may not perform the OBSS PD based SR operation according to the Partial AID field of the VHT PPDU.

Therefore, when the value of the Group ID field of the VHT PPDU received by the wireless communication terminal is 63 and the value of the Partial AID field is not 0, it may be determined whether 4 LSBs of the Partial AID field are equal to the value of the BSS color of the BSS including the wireless communication terminal. If the value of the Group ID field of the VHT PPDU received by the wireless communication terminal is 63, the value of the Partial AID field is not 0, and 4 LSBs of the Partial AID field are equal to the value of the BSS color of the BSS including the wireless communication terminal, the wireless communication terminal may determine the VHT PPDU as an Intra-BSS PPDU. In a specific embodiment, when the Partial BSS Color field of the recent HE Operation element indicates that Partial BSS Color is available, the wireless communication terminal can determine whether 4 LSBs of the partial AID field are equal to the value of the BSS color of the BSS including the wireless communication terminal.

A method of setting a value of a TXOP Duration field of a PPDU by a wireless communication terminal will be described with reference to FIGS. 20 to 21.

Figure 20:
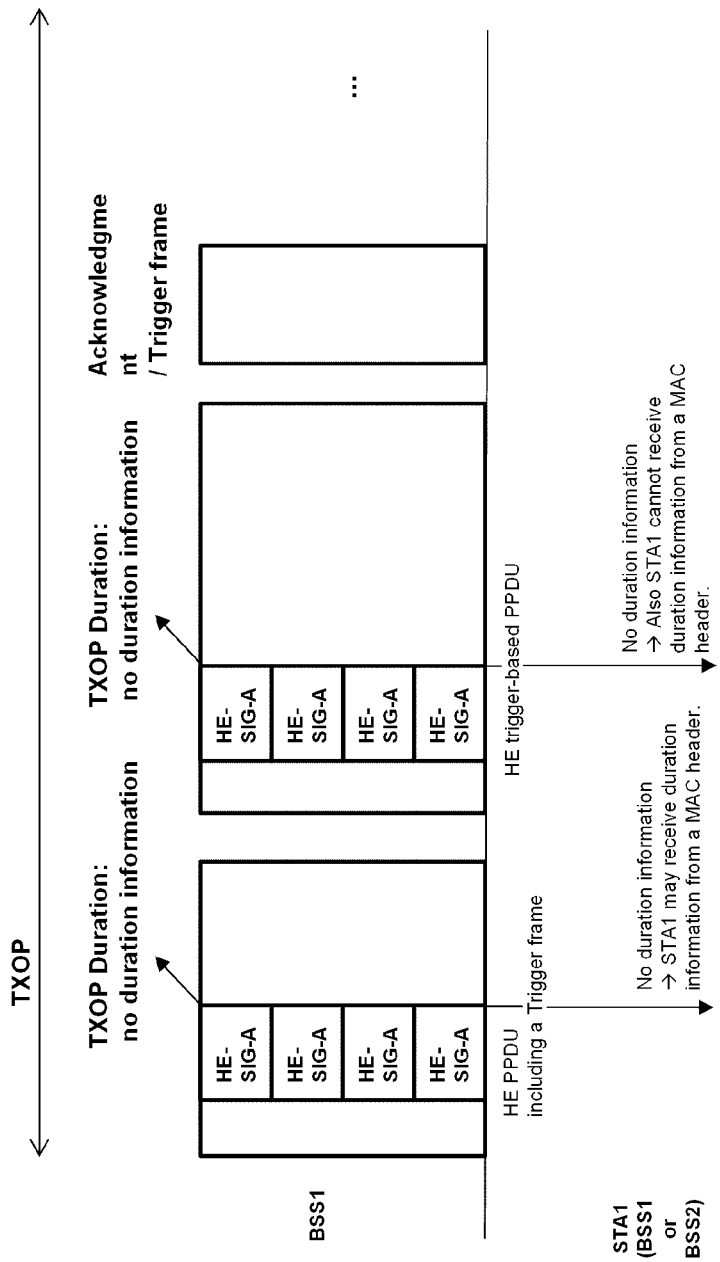
FIG. 20 shows that a wireless communication terminal sets a TXOP Duration field of a PPDU according to an embodiment of the present invention.

FIG. 20 shows that a wireless communication terminal sets a TXOP Duration field of a PPDU according to an embodiment of the present invention.

As described above, the wireless communication terminal may set the NAV based on the duration information indicated by the TXOP Duration field of the HE-SIG-A of the PPDU. In this case, when the TXOP Duration field of the HE-SIG-A of the PPDU indicates duration information, the wireless communication terminal may set the NAV based on the TXOP Duration field of the HE-SIG-A of the PPDU. For example, when all bits of the TXOP Duration field of the HE-SIG-A of the PPDU are set to 1, the wireless communication terminal may not set the NAV based on the TXOP Duration field of the HE-SIG-A of the PPDU. In a specific embodiment, when the wireless communication terminal transmits a PPDU including a PS-Poll frame, the wireless communication terminal may set a value of the TOXP Duration field so that the TOXP Duration field does not indicate duration information. In addition, when the TXOP Duration field of the PPDU soliciting the response does not indicate duration information, the wireless communication terminal, which is a TXOP responder, may set a value of the TOXP Duration field so that the TOXP Duration field does not indicate duration information. In addition, when the PPDU soliciting the response does not include the TXOP Duration field, the wireless communication terminal, which is the TXOP responder, may set a value of the TOXP Duration field so that the TOXP Duration field does not indicate duration information. In this case, the PPDU soliciting the response may be a non-HE PPDU.

In addition, the base wireless communication terminal may signal, to the wireless communication terminal included in the BSS operated by the base communication terminal, not to determine whether the PPDU received by the wireless communication terminal is an Inter-BSS PPDU or an Intra-BSS PPDU using a BSS color value. For this, the base wireless communication terminal may set the value of the BSS Color Disabled field of the HE operation element to 1. For example, since the number of values that the BSS Color bits can represent is smaller than the number of values that the BSSID can have, the same BSS color value may be used for different BSSs. At this point, the base wireless communication terminal may set the value of the BSS Color Disabled field of the HE operation element to 1. If the value of the BSS Color Disabled field of the HE Operation element obtained by the wireless communication terminal is 1, the wireless communication terminal may determine whether the PPDU received by the wireless communication terminal is an Inter-BSS PPDU or an Intra-BSS PPDU using the MAC header Address field instead of the value of the BSS color indicated by the PPDU. In addition, when the base wireless communication terminal sets the value of the BSS Color Disabled field of the HE Operation element to 1, the base wireless communication terminal may set a value of the TOXP Duration field so that the TOXP Duration field does not indicate duration information.

However, when the TXOP Duration field of the trigger-based PPDU does not indicate duration information, the wireless communication terminal that is not the intended receiver of the trigger-based PPDU may not obtain the duration information from the trigger-based PPDU or the frame included in the trigger-based PPDU. This is because a wireless communication terminal that is not an intended recipient of a trigger based PPDU cannot decode a trigger based PPDU frame.

In the embodiment of FIG. 20, the AP operating the first BSS BSS1 set the TXOP Duration field of the PPDU including the trigger frame not to indicate duration information. At this point, when the second station supports PPDU reception, the second station may obtain duration information from a frame included in the PPDU. Since the TXOP Duration field of the PPDU does not indicate duration information, the second station set so that the TXOP Duration field of the trigger-based PPDU transmitted in response to the PPDU including the trigger frame does not indicate duration information. The first station STA1 receives a trigger-based PPDU but cannot obtain duration information from a trigger-based PPDU or a frame included in the trigger-based PPDU. Therefore, the first station STA1 does not set the NAV and the frame exchange sequence between the AP and the second wireless communication terminal may not be adequately protected. Therefore, a method for solving these problems is needed. This will be described with reference to FIG. 21.

Figure 21:
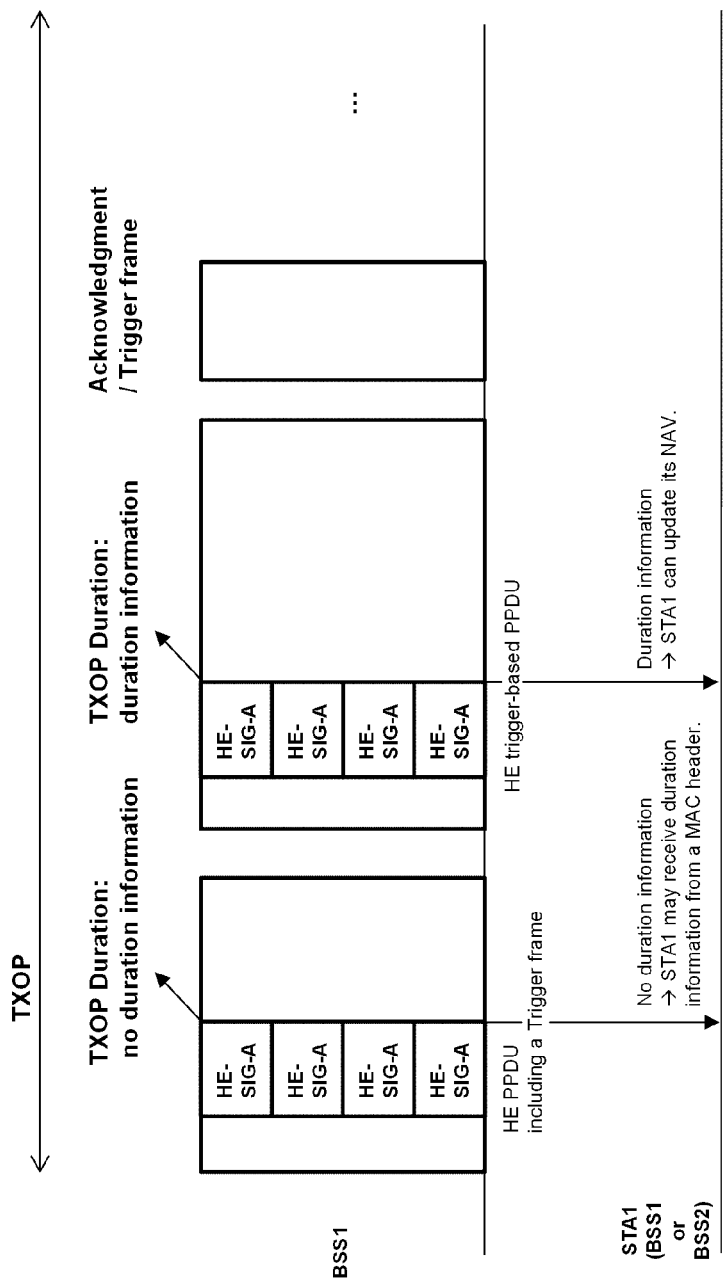
FIG. 21 shows that a wireless communication terminal sets a TXOP Duration field of a PPDU according to another embodiment of the present invention.

FIG. 21 shows that a wireless communication terminal sets a TXOP Duration field of a PPDU according to another embodiment of the present invention.

When the wireless communication terminal transmits a trigger-based PPDU, the wireless communication terminal may set a value of the TXOP Duration field so that the TXOP Duration field always indicates duration information. Specifically, when a wireless communication terminal that is a TXOP responder transmits a trigger-based PPDU, regardless of whether the TXOP Duration field of the PPDU soliciting a response indicates duration information, the wireless communication terminal may set a value of the TXOP Duration field so that the TXOP Duration field of the PPDU that is transmitted always indicates the duration information. However, when a wireless communication terminal that is a TXOP responder transmits a HE SU PPDU or HE ER PPDU, the wireless communication terminal may set the TXOP Duration field so that the TXOP Duration field of the transmitting PPDU does not indicate duration information.

In the embodiment of FIG. 21, the AP operating the first BSS BSS1 configures the TXOP Duration field of the PPDU including the trigger frame not to indicate duration information. At this point, when the second station supports PPDU reception, the second station may obtain duration information from a frame included in the PPDU. Although the TXOP Duration field of the PPDU does not indicate duration information, the second station sets a value of the TXOP Duration field so that the TXOP Duration field of the trigger-based PPDU transmitted in response to the PPDU including the trigger frame indicates duration information. The first station STA1 may receive a trigger-based PPDU but may configure a NAV by obtaining duration information from the trigger-based PPDU. Therefore, even when the first station STA1 does not receive the PPDU including the trigger frame, the frame exchange sequence between the AP and the second station may be protected.

When the base wireless communication terminal changes the BSS color of the BSS, even the wireless communication terminal included in the same BSS may use different BSS colors. Specifically, before the base wireless communication terminal changes the BSS color of the BSS, the base wireless communication terminal may transmit signaling information on the BSS color change as described above. In this case, the signaling information on the BSS color change may be a HE BSS Color Change Announcement element. However, when the wireless communication terminal included in the corresponding BSS fails to obtain signaling information on the BSS color change and fails to obtain the HE Operation Element after the BSS Color is changed, even wireless communication terminals included in the same BSS may use different BSS colors. In this case, a problem that may occur will be described with reference to FIG. 22.

Figure 22:
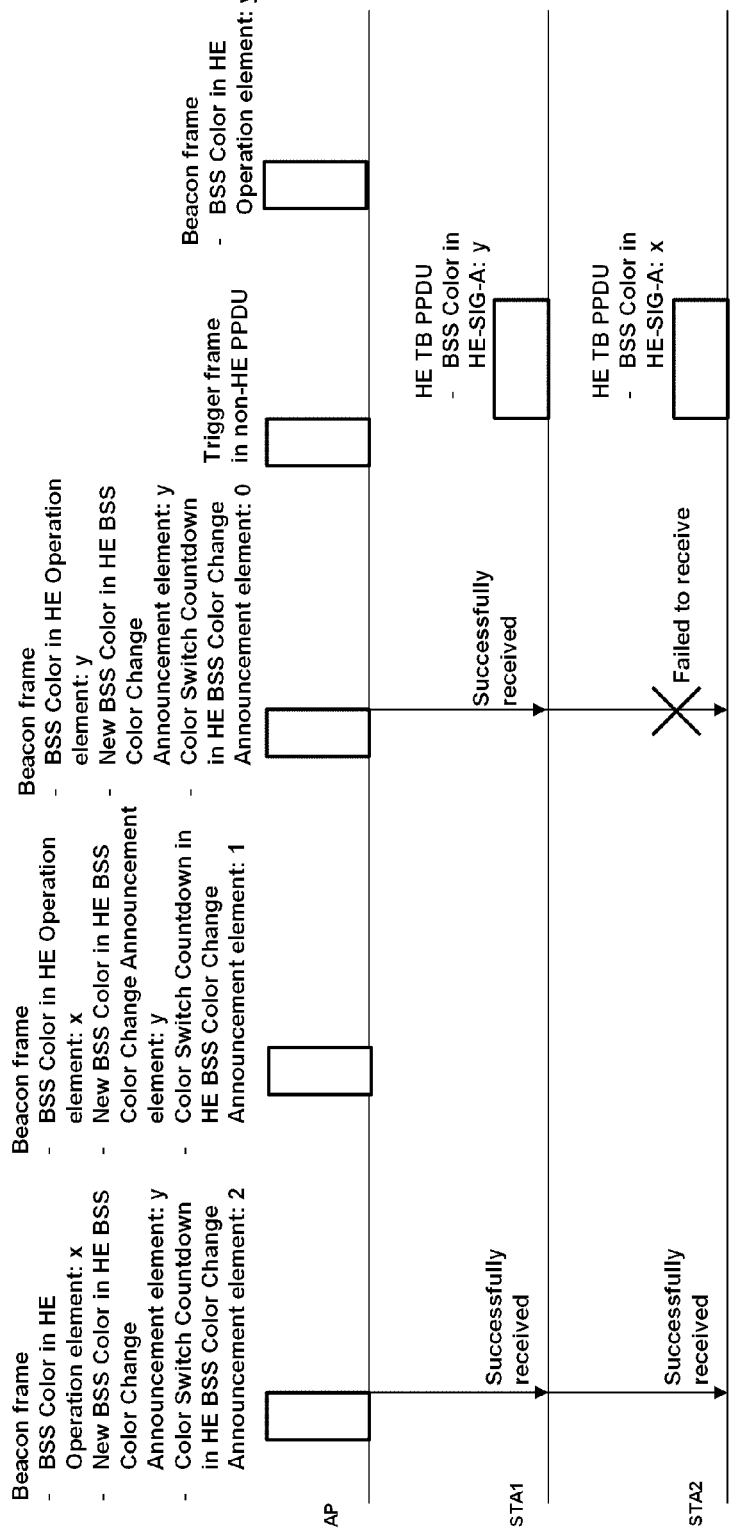
FIG. 22 shows that a wireless communication terminal performs UL MU transmission according to an embodiment of the present invention.

FIG. 22 shows that a wireless communication terminal performs UL MU transmission according to an embodiment of the present invention.

The wireless communication terminal receiving the PPDU including the trigger information may set the value of the BSS color indicated by the trigger-based PPDU to the value of the BSS Color field of the HE Operation element most recently received by the wireless communication terminal. Specifically, when the PPDU including the trigger information does not include a field indicating the BSS color, the wireless communication terminal receiving the PPDU including the trigger information may set the value of the BSS color indicated by the trigger-based PPDU to the value of the BSS Color field of the HE Operation element most recently received by the wireless communication terminal. In addition, when the wireless communication terminal receiving the PPDU including the trigger information cannot use the value of the BSS color indicated by the PPDU including the trigger information, the wireless communication terminal receiving the PPDU including the trigger information may set the value of the BSS color indicated by the trigger-based PPDU to the value of the BSS Color field of the HE Operation element most recently received by the wireless communication terminal. In these embodiments, if the wireless communication terminal does not obtain the HE Operation Element after the BSS Color is changed, the wireless communication terminal may transmit a modulated signal of a HE-SIG-A field different from that of another wireless communication terminal simultaneously transmitting a trigger-based PPDU. As a result, the base wireless communication terminal may fail to receive a trigger-based PPDU.

In the embodiment of FIG. 22, the AP transmits a beacon frame including the HE BSS Color Change Announcement element. In this case, the value of the New BSS Color field of the HE Color Change Announcement element is y, the value of the BSS Color field of the HE Operation element is x, and the Color Switch Countdown field represents 3. The first station STA1 and the second station STA2 receive the beacon frame to obtain the HE BSS Color Change Announcement element. Each time the AP transmits a beacon frame including the HE BSS Color Change Announcement element, the AP decreases the value of the Color Switch Countdown field and repeatedly transmits a beacon frame including the HE BSS Color Change Announcement element. When the value of the Color Switch Countdown field becomes 0, the AP starts using the value of the new BSS color. Therefore, when the AP transmits a PPDU whose value of the Color Switch Countdown field is 0, the AP sets the value of the BSS Color field of the HE Operation element to y.

Since the BSS color change time point signaled by the HE BSS Color Change Announcement element elapses, both the first station STA1 and the second station change the value of the active BSS color to y. However, the first station SAT1 receives the beacon frame after the BSS color is changed, but the second station STA2 fails to receive the beacon frame after the BSS color is changed. Thereafter, the AP transmits a trigger frame using a PPDU instead of a HE PPDU. In this case, since the value of the BSS Color field of the HE operation element most recently received by the first station STA1 is y, the first station STA1 transmits a trigger-based PPDU indicating the BSS color y. Since the value of the BSS Color field of the HE operation element most recently received by the second station SAT2 is x, the second station STA2 transmits a trigger-based PPDU indicating the BSS color x. Accordingly, the AP may fail to receive the trigger-based PPDU transmitted by the first station STA1 and the second station STA2.

Figure 23:
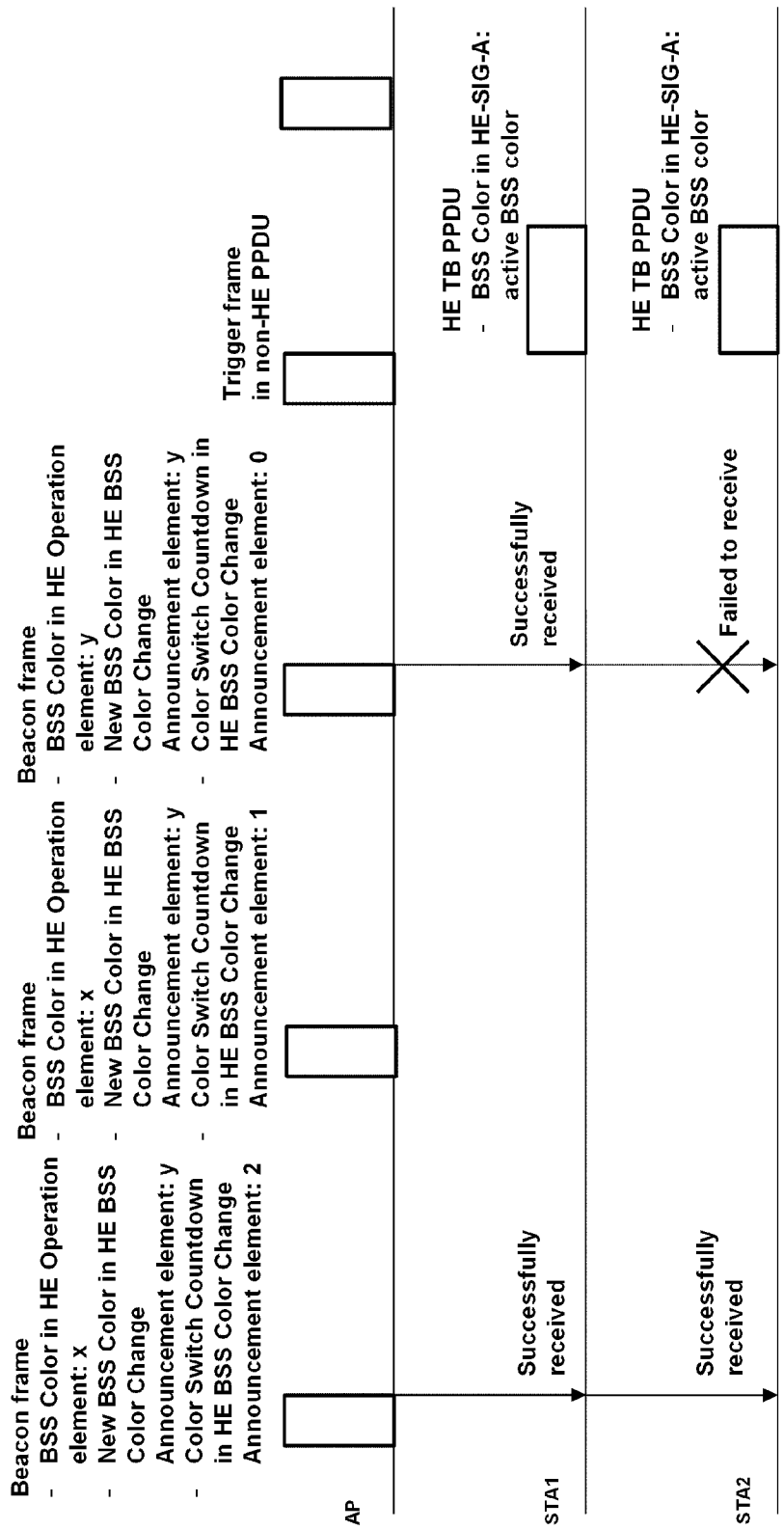
FIG. 23 shows that a wireless communication terminal performs a UL MU transmission by according to another embodiment of the present invention.

FIG. 23 shows that a wireless communication terminal performs a UL MU transmission by according to another embodiment of the present invention.

When the wireless communication terminal transmits a trigger based PPDU, the wireless communication terminal may configure the trigger based PPDU to indicate an active BSS color of the wireless communication terminal. In more detail, when the wireless communication terminal transmits a trigger-based PPDU, the wireless communication terminal may set a value of the BSS Color field of the HE-SIG-A field of the trigger-based PPDU to the active BSS color of the wireless communication terminal. According to a specific embodiment, when the wireless communication terminal receives a PPDU that includes a trigger frame and does not indicate a value of a BSS color, the wireless communication terminal may set the value of the BSS Color field of the HE-SIG-A field of the trigger-based PPDU to the active BSS color of the wireless communication terminal. A PPDU that includes a trigger frame and does not indicate a value of a BSS color may indicate a non-HE PPDU. As mentioned above, after receiving the BSS Color Change Announcement element, when the BSS color change time point elapses, the wireless communication terminal may set the value of the New BSS Color field of the BSS Color Change Announcement element to the value of the active BSS color.

In the embodiment of FIG. 23, in addition to the operation of transmitting the trigger-based PPDU by the first station STA1 and the second station STA2, the operations of the AP, the first station STA1, and the second station STA2 are identical to those in the embodiment of FIG. 22. The second station STA2 did not receive the HE Operation element from the AP after the BSS color change. However, both the first station SAT1 and the STA2 set the value of the BSS Color field of the HE-SIG-A of the trigger-based PPDU according to the active BSS color. Therefore, both the first station SAT1 and the second station STA2 transmit a trigger-based PPDU indicating that the value of the BSS color is y, and the AP thus succeeds in trigger-based reception transmitted from each of the first station SAT1 and the second station STA2.

Through FIGS. 24 to 25, a method of transmitting a trigger-based PPDU to a base wireless communication terminal by a wireless communication terminal unassociated with the base wireless communication terminal will be described. Especially, a method of signaling information of an operating channel operated by a base wireless communication terminal to a base wireless communication terminal unassociated with the base wireless communication terminal is shown.

FIG. 24 shows an encoding value of an RU Allocation field used by a wireless communication terminal according to an embodiment of the present invention.

When the trigger frame indicates the RU, the trigger frame may indicate the relative position and size of the RU in the operating channel of the BSS in which the frame is transmitted. In this case, the relative position and size of the RU may be a combination of a predetermined relative position and size. For example, the trigger frame may indicate to which RU among RUs of a specific size it corresponds.

In more detail, the trigger frame may indicate the relative position and size of the RU using the RU Allocation field described with reference to FIG. 8. A bit corresponding to bit index 12 of the RU Allocation field may indicate whether the RU is located in a primary 80 MHz channel. A bit corresponding to bit index 12 of the RU Allocation field may indicate whether the RU is located in a primary 80 MHz channel. In addition, when the RU is located in the secondary 80 MHz channel, the value of the bit corresponding to bit index 12 of the RU Allocation field may be 1. When the RU is in a 160 MHz size (2*996-tone RU), the value of the bit corresponding to bit index 12 of the RU Allocation field may be a predetermined value. In another specific embodiment, when the RU is in a 160 MHz size (2*996-tone RU), the value of the bit corresponding to bit index 12 of the RU Allocation field may be set to any value. In addition, a value corresponding to bit index 19 to bit index 13 of the RU Allocation field may indicate the index of the RU and the size of the RU. When the value corresponding to bit index 19 to bit index 13 of the RU Allocation field is 0 to 36, a value corresponding to bit index 19 to bit index 13 of the RU Allocation field may indicate the number of cases in which a 26-tone RU may be located in a frequency band having an 80 MHz bandwidth. In addition, when the value corresponding to bit index 19 to bit index 13 of the RU Allocation field is 37 to 52, a value corresponding to bit index 19 to bit index 13 of the RU Allocation field may indicate the number of cases in which a 52-tone RU may be located in a frequency band having an 80 MHz bandwidth. In more detail, a value corresponding to bit index 19 to bit index 13 of the RU Allocation field and the location of the RU may be mapped as shown in FIG. 24.

Figure 25:
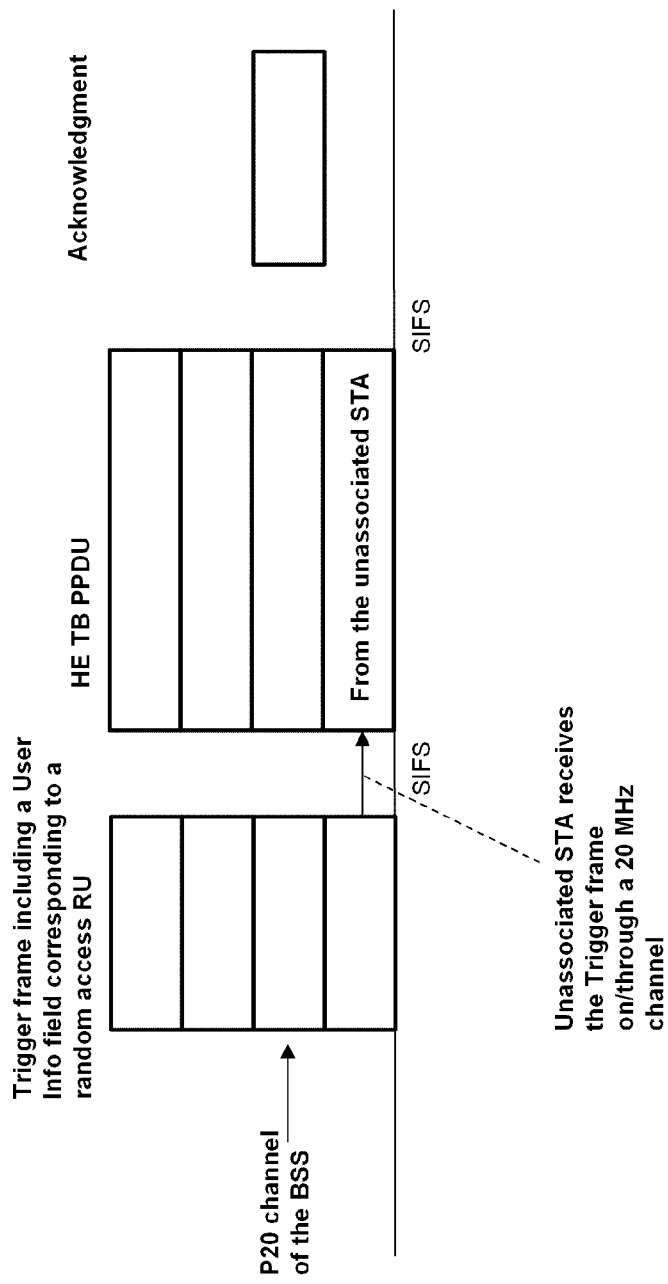
FIG. 25 shows a UL MU transmission for a base wireless communication terminal unassociated with a wireless communication terminal according to an embodiment of the present invention.

FIG. 25 shows a UL MU transmission for a base wireless communication terminal unassociated with a wireless communication terminal according to an embodiment of the present invention.

As described above, the wireless communication terminal unassociated with the base wireless communication terminal may perform transmission for the random access based base wireless communication terminal without obtaining the HE Operation element or the VHT Operation element. In more detail, the wireless communication terminal unassociated with the base wireless communication terminal may perform transmission for the UORA-based base wireless communication terminal using a default UORA parameter set without obtaining a HE Operation element. However, the HE operation element may indicate information on the operation channel of the BSS operated by the base wireless communication terminal in addition to the information on the UORA parameter set. In more detail, the HE Operation element may signal information on a primary 20 MHz channel used by the base wireless communication terminal. In addition, the HE Operation element may signal information on the center frequency of the 80 MHz segment. In addition, as described with reference to FIG. 24, the trigger frame may indicate a relative position of an RU to be used by a wireless communication terminal triggered by the trigger frame. Therefore, when a wireless communication terminal unassociated with the base wireless communication terminal does not obtain the HE Operation element, the trigger frame may not accurately determine the location of the RU indicating the random access.

As in the embodiment of FIG. 25, the AP may transmit a PPDU including a trigger frame using a frequency band having a bandwidth greater than 20 MHz. In this case, the station unassociated with the AP receives a trigger frame on a channel other than the 20 MHz primary channel used by the base wireless communication terminal. In this case, the trigger frame may be transmitted as a non-HT duplicate PPDU. In addition, the trigger frame may be transmitted through a HE PPDU in which the legacy preamble and the HE-SIG-A field are repeated every 20 MHz. In such cases, the station unassociated with the AP may receive the trigger frame but cannot determine the position of the primary 20 MHz channel used by the base wireless communication terminal. Accordingly, the station unassociated with the AP may not accurately determine the location of the RU in which the trigger frame indicates random access. As a result, a station unassociated with the AP may attempt random access to the RU in which the trigger frame does not indicate random access. Also, even if a station unassociated with an AP succeeds in transmitting a trigger-based PPDU, since the station cannot accurately determine the location of the primary 20 MHz channel, the station may not receive an ACK for the trigger based PPDU.

In relation to these problems, the base wireless communication terminal may insert information on the operating channel of the BSS operated by the base wireless communication terminal in the trigger frame. Specifically, the base wireless communication terminal may insert information on the primary channel used by the base wireless communication terminal in the trigger frame. In a specific embodiment, the base wireless communication terminal may insert information on a 20 MHz primary channel used by the base wireless communication terminal in a trigger frame. In addition, the base wireless communication terminal may insert information on the 80 MHz primary channel used by the base wireless communication terminal in the trigger frame. The information on the 80 MHz primary channel may be a 1-bit indicator indicating whether the RU in which the trigger frame is transmitted is the primary 80 MHz channel. In addition, the information on the 80 MHz primary channel may be information indicating the center frequency of the 80 MHz frequency band. In addition, when the trigger frame triggers random access of a wireless communication terminal unassociated with the base wireless communication terminal, the base wireless communication terminal may insert information on the operating channel of the BSS operated by the base wireless communication terminal in the trigger frame. In addition, the wireless communication terminal unassociated with the base wireless communication terminal may obtain information on the operating channel of the BSS from the trigger frame, and determine the location of the RU indicated by the trigger frame based on the information on the operating channel of the BSS.

In another specific embodiment, the base wireless communication terminal may not transmit a PPDU including a trigger frame using a 160 MHz or 80 MHz frequency band. In another specific embodiment, the base wireless communication terminal may set a value of the RU Allocation field of the trigger frame such that only the RU whose trigger frame is not the 160 MHz or 80 MHz frequency band is indicated to the RU to be used for the transmission triggered by the trigger frame. In another specific embodiment, the base wireless communication terminal may set a value of the RU Allocation field of the trigger frame such that only the RU not in the secondary 80 MHz frequency band is indicated to the RU to be used for the transmission triggered by the trigger frame. When the trigger frame triggers random access of a wireless communication terminal unassociated with the base wireless communication terminal, the base wireless communication terminal may determine the RU indicated by the trigger frame according to the constraints of any one of the above-described embodiments. In addition, the base wireless communication terminal may indicate the RU to be used for random access of the wireless communication terminal unassociated with the base wireless communication terminal in the RU located in the 80 MHz segment in which the trigger frame is transmitted.

In addition, the base wireless communication terminal may prevent the wireless communication terminal unassociated with the base wireless communication terminal from not receiving a response to the trigger-based PPDU through the following embodiments. In more detail, the base wireless communication terminal may transmit a response to a trigger-based PPDU transmitted by a wireless communication terminal unassociated with the base wireless communication terminal using a non-HT duplication PPDU. This is because when a response to a trigger-based PPDU is transmitted to a non-HT duplication PPDU, a wireless communication terminal unassociated with the base wireless communication terminal may receive a non-HT duplication PPDU transmitted by the base wireless communication terminal regardless of which 20 MHz channel is received. In this case, the base wireless communication terminal may transmit a response to the trigger-based PPDU transmitted by the wireless communication terminal unassociated with the base wireless communication terminal in the frequency band in which the base wireless communication terminal transmits a trigger frame or in a frequency band including a frequency band in which the base wireless communication terminal transmits a trigger frame.

In addition, the base wireless communication terminal may transmit a response to a trigger-based PPDU transmitted by a wireless communication terminal unassociated with the base wireless communication terminal using a wideband frequency band having a frequency bandwidth greater than 20 MHz. In this case, the wideband frequency band having a frequency bandwidth greater than 20 MHz may include a frequency band used for trigger-based PPDU transmission by a wireless communication terminal unassociated with the base wireless communication terminal. In addition, the base wireless communication terminal may transmit a response to the trigger-based PPDU transmitted by the wireless communication terminal unassociated with the base wireless communication terminal to the HE SU PPDU or the HE MU PPDU. In such an embodiment, the base wireless communication terminal may transmit a response to the trigger-based PPDU transmitted by the wireless communication terminal unassociated with the base wireless communication terminal in the frequency band in which the base wireless communication terminal transmits a trigger frame or in a frequency band including a frequency band in which the base wireless communication terminal transmits a trigger frame. When the base wireless communication terminal transmits a response to the trigger-based PPDU in the frequency band having a 160 MHz or 80+80 MHz bandwidth, the base wireless communication terminal may transmit a response to the trigger-based PPDU using a predetermined 80 MHz segment. In this case, the predetermined 80 MHz segment may be an 80 MHz segment including a frequency band in which the base wireless communication terminal transmits a trigger frame.

In the above-described embodiments, the response to the trigger based PPDU may be an immediate response to the trigger based PPDU. In addition, the response to the trigger-based PPDU may be a response transmitted after the TXOP in which the trigger-based PPDU is transmitted. For example, the trigger-based PPDU may include at least one of a Probe Request Frame, a (Re)association Request Frame, and an Authentication Request Frame. The response to the trigger-based PPDU may include at least one of a Probe Response Frame, a (Re)association Response Frame, and an Authentication Response Frame.

When a contention procedure is performed every time one MPDU is transmitted, as the number of MPDUs to be transmitted increases, transmission efficiency may drop rapidly. In order to improve the transmission efficiency of the wireless communication terminal, a plurality of MPDUs may be combined to generate one aggregated MPDU (A-MPDU) and transmit the generated A-MPDUs. This will be described with reference to FIGS. 26 to 27.

Figure 26:
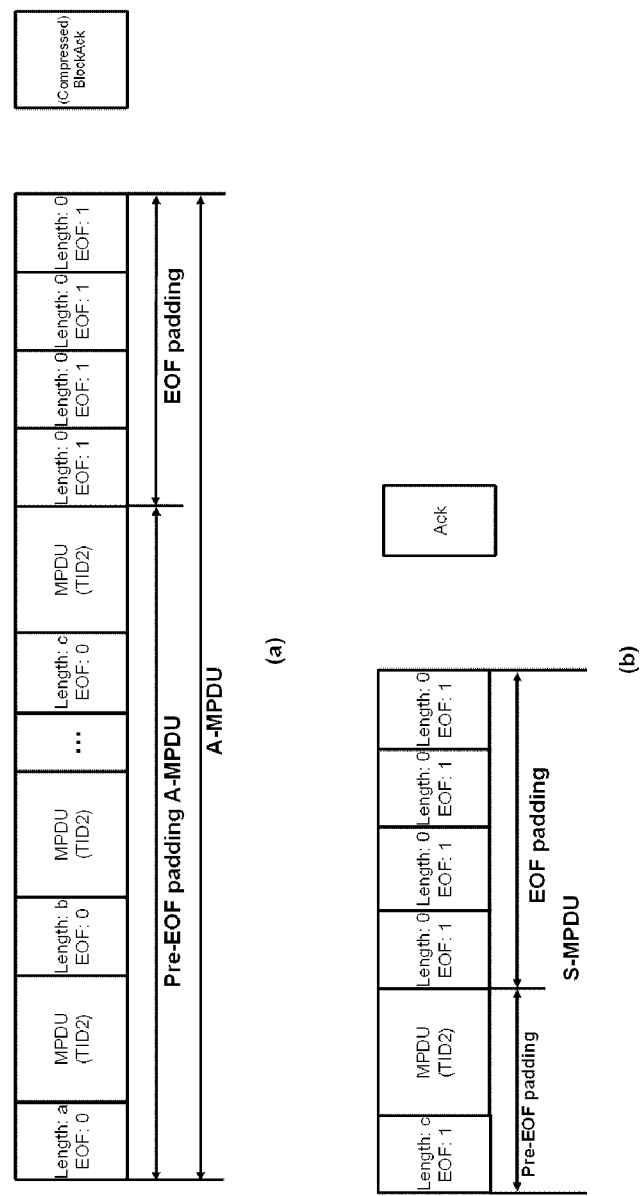
FIG. 26 shows a method for generating an A-MPDU by aggregating MPDUs through a wireless communication terminal according to an embodiment of the present invention.

FIG. 26 shows a method for generating an A-MPDU by aggregating MPDUs through a wireless communication terminal according to an embodiment of the present invention.

When the wireless communication terminal generates the A-MPDU, the wireless communication terminal may identify an individual MPDU and insert a delimiter for signaling information on the MPDUs before an individual MPDU. The delimeter may include an End Of Frame (EOF) field indicating whether it is the last MPDU of the A-MPDU, a Length field indicating the length of the MPDU, a CRC field for detecting an error of a delimeter, and a Delimiter Signature field for detecting a delimeter. A delimiter with a value of 0 in the EOF field and a non-zero value in the Length field indicates that the MPDU located after the delimeter is an MPDU including data corresponding to the TID that agrees on the BlockACK transmission. In such a way, one or more MPDUs indicated by the delimeter may be referred to as Pre EOF padding A-MPDUs. A delimeter with a value of 1 in the EOF field and a value of 0 in the Length field indicates the end of the A-MPDU after the Pre EOF padding A-MPDU. One or more of these delimeters may be referred to as an EOF padding delimeter. FIG. 26(a) shows specific examples of Pre EOF padding A-MPDU and EOF padding.

When the transmitter transmits an A-MPDU, the receiver may need to transmit a BlockAck based response frame including a BlockAck (BA) bitmap. Therefore, when the A-MPDU includes only one MPDU, the response frame transmission efficiency for the A-MPDU may be reduced. In addition, in the 802.11ac standard, the wireless communication terminal should transmit all MPDUs included in the VHT PPDU to the A-MPDU. In order to improve such inefficiency, an ACK frame response to an A-MPDU including one MPDU may be allowed. Specifically, when the value of the EOF field of the delimeter is one and the value of the Length field is not 0, the delimeter may indicate that the MPDU after the delimeter is a single MPDU (S-MPDU) in the A-MPDU. The EOF padding described above may be located after the S-MPDU. When receiving the A-MPDU indicating the S-MPDU, the wireless communication terminal may transmit an ACK frame other than BlockAck as a response to the A-MPDU regardless of whether or not the BA agrees on the TID corresponding to the received MPDU. FIG. 26(b) shows a specific example of an A-MPDU including an S-MPDU.

Figure 27:
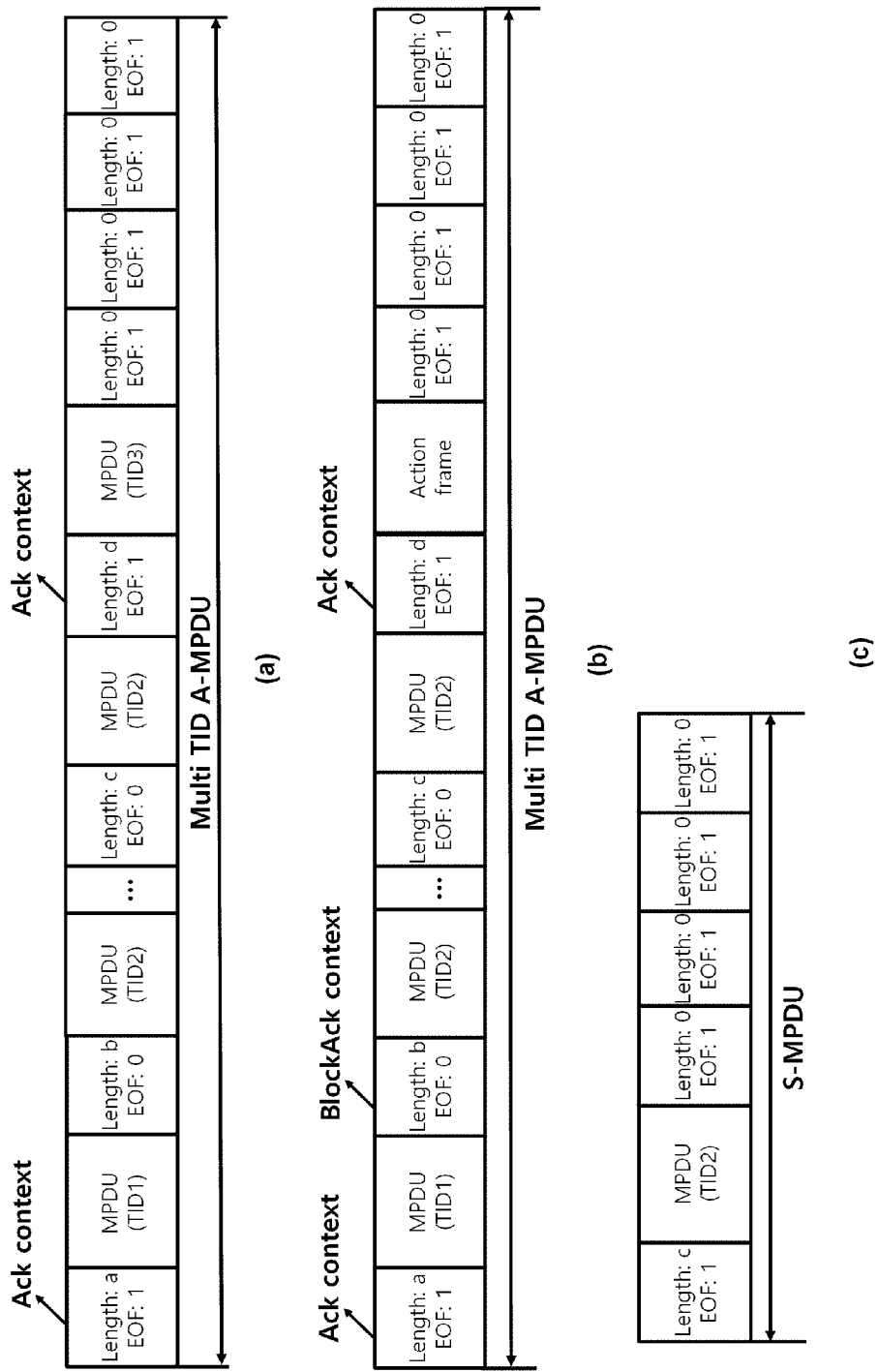
FIG. 27 shows a method for generating an A-MPDU by a wireless communication terminal according to another embodiment of the present invention.

FIG. 27 shows a method for generating an A-MPDU by a wireless communication terminal according to another embodiment of the present invention.

In a specific embodiment, the wireless communication terminal can generate an A-MPDU by combining only MPDUs having the same traffic identifier (TID). In such an embodiment, the wireless communication terminal may not aggregate MPDUs corresponding to a plurality of TIDs in the A-MPDU and thus may not transmit the maximum size that can be transmitted using the A-MPDU. Therefore, the efficiency of transmission through the A-MPDU may be reduced. In another specific embodiment, the wireless communication terminal may aggregate a plurality of MPDUs having different TIDs to generate one A-MPDU. For convenience of explanation, an A-MPDU including a plurality of MPDUs corresponding to a plurality of different TIDs is referred to as a Multi-TID A-MPDU or an A-MPDU with Multiple TIDs. In this embodiment, the number of types of A-MPDUs and the number of response methods for the A-MPDUs become larger than those in the previously described embodiments.

In more detail, the wireless communication terminal may generate an A-MPDU by aggregating a plurality of MPDUs having a value of 1 in the EOF field. In this case, each of the plurality of MPDUs may correspond to different TIDs and may be a unique MPDU corresponding to each TID. When an MPDU including Quality of Service (QoS) data corresponding to a TID with a BA agreement is the only MPDU corresponding to a specific TID within that A-MPDU, the wireless communication terminal may set the value of the EOF field of the delimeter corresponding to the MPDU to 1. FIG. 27(a) shows a specific example of an A-MPDU in which a plurality of MPDUs having an EOF field value of 1 is aggregated. In addition, when the action frame requesting the response of the ACK frame is unique in the corresponding A-MPDU, the value of the EOF field of the delimeter corresponding to the action frame may be set to 1. FIG. 27(b) shows a specific example of an A-MPDU in which an MPDU having an EOF field value of 1 and an action frame having an EOF field value of 1 are aggregated. When an MPDU corresponding to a delimeter having an EOF field of 1 is transmitted alone, the receiver may transmit an ACK frame in response to the MPDU. FIG. 27(c) shows a case in which an A-MPDU includes only one MPDU corresponding to a delimeter having an EOF field of 1.

When an MPDU corresponding to a delimeter with an EOF field of 1 is transmitted with another MPDU requiring an immediate response, the receiver may transmit a per AID TID field in which a BA bitmap is omitted in a Multi-BA (M-BA) in response to an MPDU corresponding to a delimeter having an EOF field of 1. In this case, the receiver may set a value of the Ack type field of the per AID TID field, in which the BA bitmap is omitted, differently from a value of the Ack type field of the other per AID TID field including the BA bitmap. In more detail, the receiver may set a value of the Ack type field of the per AID TID field to 1. In addition, a per AID TID field in which a BA bitmap is omitted is referred to as an Ack context, and a per AID TID field including a BA bitmap is referred to as a BA context.

The wireless communication terminal sets a value of the EOF field of the corresponding delimiter to 1, and aggregates and transmits the MPDU corresponding to the TID without the BA agreement with the MPDU corresponding to another TID. In this case, the receiver may transmit the M-BA including the Ack context response in response to the MPDU corresponding to the TID without the BA agreement. When a wireless communication terminal transmits an MPDU corresponding to a TID without a BA agreement by using an A-MPDU, it can be assured that an MPDU corresponding to a TID without a BA agreement is the only MPDU corresponding to that TID in the corresponding A-MPDU. Accordingly, the wireless communication terminal may set the value of the EOF field of the delimeter of the MPDU corresponding to the TID without the BA agreement to 0. In this case, when another MPDU of the A-MPDU requires an immediate response, the receiver may transmit the M-BA including the Ack context response in response to the MPDU corresponding to the TID without BA agreement. In addition, the wireless communication terminal may set the value of the EOF field of the delimeter of the MPDU corresponding to the TID with the BA agreement to 0. In such embodiments, even if the value of the EOF field of the delimeter is 1, the receiver cannot determine with only the corresponding delimiter that the MPDU corresponding to the delimeter is the only MPDU S-MPDU in the A-MPDU. In this case, the receiver may determine that the MPDU is the only MPDU in the corresponding A-MPDU based on data and other delimeters included in the MPDU.

As described above, in a frequency band commonly used by various wireless communication devices, such as an unlicensed band, a wireless communication terminal can access the channel through a contention procedure. Specifically, when the channel to be accessed by the wireless communication terminal is idle for a predetermined time, the wireless communication terminal starts the backoff procedure. In the backoff procedure, the wireless communication terminal obtains a random integer value in a Contention Window (CW) and sets the random integer value as a backoff timer. When the corresponding channel is idle during a predetermined slot time, the wireless communication terminal decreases the backoff timer. When the value of the backoff timer is 0, the wireless communication terminal accesses the corresponding channel. In this case, when the corresponding channel is busy, the wireless communication terminal stops the backoff procedure. When the channel to be accessed by the wireless communication terminal is idle for a predetermined time, the wireless communication terminal resumes the backoff procedure again.

Further, the wireless communication terminal may access the channel according to the priority of the data to be transmitted. Specifically, the wireless communication terminal may use the CW determined according to the priority of the data to be transmitted. In this case, the minimum value CWmin and the maximum value CWmax of CW are determined according to the priority of data to be transmitted by the wireless communication terminal. In addition, the predetermined time at which the wireless communication terminal waits to start the backoff procedure is determined according to the priority of the data to be transmitted by the wireless communication terminal. Also, the wireless communication terminal may wait for a designated time according to the priority of the data to be transmitted, and then start the backoff procedure. The designated time according to the priority is referred to as arbitration interframe space (AIFS). This operation is referred to as enhanced distributed channel access (EDCA). In addition, the priority of data may be determined according to an Access Category (AC).

As described above, the base wireless communication terminal may trigger uplink transmission to the base wireless communication terminal of one or more wireless communication terminals. In this case, the base wireless communication terminal accesses the channel for uplink transmission of one or more wireless communication terminals. In addition, one or more wireless communication terminals access the channel for uplink transmission of each of the one or more wireless communication terminals. Therefore, when the uplink transmission of one or more wireless communication terminals is scheduled for uplink transmission by the base wireless communication terminal, the uplink transmission of one or more wireless communication terminals has a higher priority than transmission of other wireless communication terminals that transmit data having the same priority. In addition, since the base wireless communication terminal and one or more wireless communication terminals simultaneously access the channel for the same transmission, the channel access efficiency may decrease. Therefore, when the uplink Multi-User (UL-MU) transmission is scheduled, it is necessary to adjust the EDCA parameter value. This will be described with reference to FIGS. 28 to 31.

Figure 28:
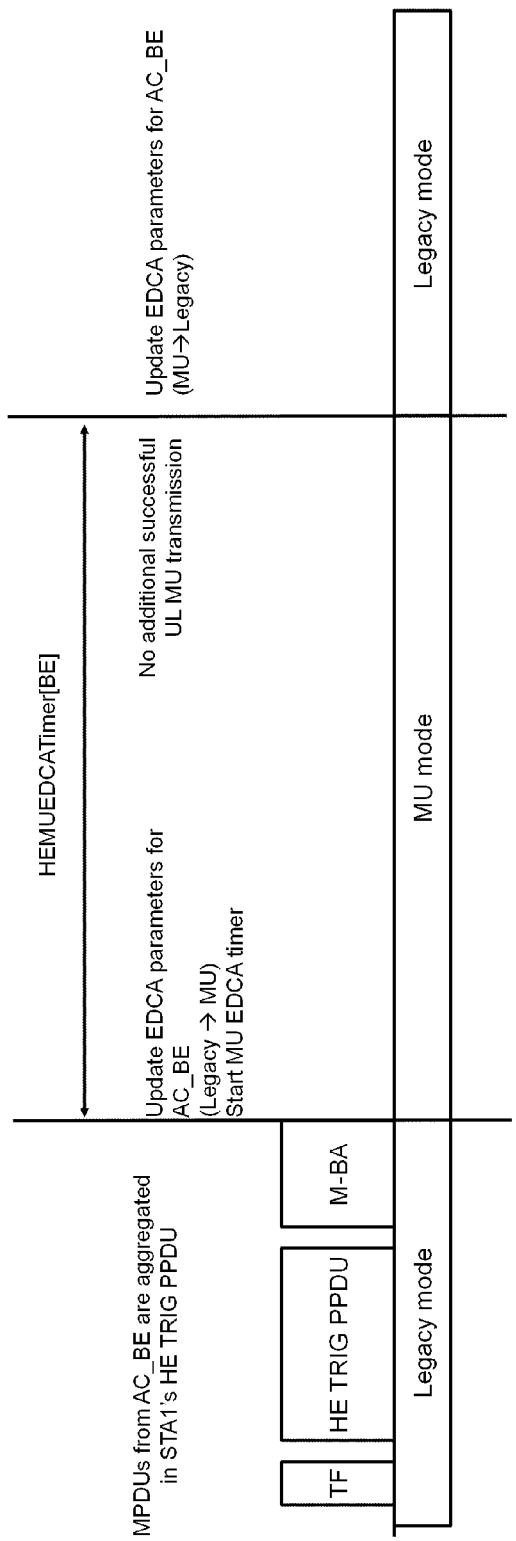
FIG. 28 shows a control method of an EDCA parameter used by a wireless communication terminal during MU UL transmission according to an embodiment of the present invention.

FIG. 28 shows a control method of an EDCA parameter used by a wireless communication terminal during MU UL transmission according to an embodiment of the present invention.

When a wireless communication terminal scheduled for UL MU transmission succeeds in UL MU transmission, the wireless communication terminal may use a channel access method that guarantees channel access success with a lower probability than when it is not scheduled for UL MU transmission. In more detail, the wireless communication terminal may use a separate EDCA parameter set. In a specific embodiment, a corresponding wireless communication terminal may use an EDCA parameter set that attempts to access the channel with a lower probability than the previously used EDCA parameter set in channel access for transmitting the same data. In this case, the EDCA parameter set is a set of parameters used in the EDCA operation according to the priority of the data transmitted by the wireless communication terminal. Specifically, the EDCA parameter set may include parameters for CW. In this case, the parameter for CW may include at least one of CWmin and CWmax. In addition, the EDCA parameter set may include a parameter value related to a predetermined time at which the wireless communication terminal waits to start the backoff procedure. In this case, the predetermined time may be the AIFS described above. For convenience of description, when a wireless communication terminal scheduled for UL MU transmission succeeds in UL MU transmission, a separate EDCA parameter set used by the corresponding wireless communication terminal is referred to as a MU EDCA parameter set.

In addition, when a wireless communication terminal scheduled for UL MU transmission succeeds in UL MU transmission, it may represent a case where all of the following conditions are satisfied. 1) The wireless communication terminal transmits information on data to be transmitted to the base wireless communication terminal. In this case, the wireless communication terminal may transmit information on data to be transmitted to the base wireless communication terminal by transmitting a Buffer Status Report (BSR). 2) The wireless communication terminal receives trigger information including a User Info field indicating the AID of the wireless communication terminal. In this case, the trigger information may be a trigger frame. 3) The wireless communication terminal transmits QoS data in response to the trigger information. 4) The wireless communication terminal determines that QoS data transmission is successful. In this case, when the wireless communication terminal receives the immediate response to the QoS data transmission, the wireless communication terminal may determine that the QoS data transmission is successful.

The base wireless communication terminal may transmit information on the MU EDCA parameter set to the wireless communication terminal. In more detail, the base wireless communication terminal may transmit an MU EDCA parameter set element including information on the MU EDCA parameter set to the wireless communication terminal. In this case, the base wireless communication terminal may transmit the MU EDCA parameter set element using a beacon frame.

When the wireless communication terminal receives the MU EDCA parameter set element and the conditions described above are satisfied, the wireless communication terminal may update the EDCA parameter values of all ACs corresponding to the QoS data transmitted through the trigger-based PPDU by the wireless communication terminal. Specifically, the wireless communication terminal may update the end time point of the PPDU including the immediate response to the trigger-based PPDU or the end value of the trigger-based PPDU including the QoS data that does not request the immediate response with the EDCA parameter values of all ACs corresponding to QoS data.

When the MU EDCA parameter set application condition is not satisfied until a predetermined time elapses from when the timer is set, the wireless communication terminal can set an MU EDCA timer for terminating the MU EDCA parameter set application. Specifically, the wireless communication terminal can set the MU EDCA timer when receiving the trigger information. In this case, if the MU EDCA parameter set application condition is not satisfied for a certain period after setting the MU EDCA timer, the wireless communication terminal can terminate the MU EDCA parameter set application. In this case, the MU EDCA timer may be applied for each AC. In addition, the MU EDCA timer value may also be included in the MU EDCA parameter set. Accordingly, the base wireless communication terminal may transmit a MU EDCA parameter set element including information on the MU EDCA timer value to the wireless communication terminal.

In the embodiment of FIG. 28, the AP transmits a trigger frame to the first station STA1. The first station STA1 receives a trigger frame from the AP and transmits a trigger-based PPDU in which an AC includes QoS data corresponding to the BE based on the trigger frame. The AP receives a trigger based PPDU from the first station STA1 and transmits an M-BA in response to the MPDU including the trigger based PPDU. The first station STA1 receives the M-BA from the base wireless communication terminal and applies the MU EDCA parameter set for QoS data in which an AC is a BE. In this case, the first station STA1 sets a MU EDCA timer for QoS data in which an AC is a BE. The first station STA1 does not succeed in transmitting the UL MU until the MU EDCA timer expires. Accordingly, the first station STA1 terminates the application of the MU EDCA parameter set when the MU EDCA timer expires.

Figure 29:
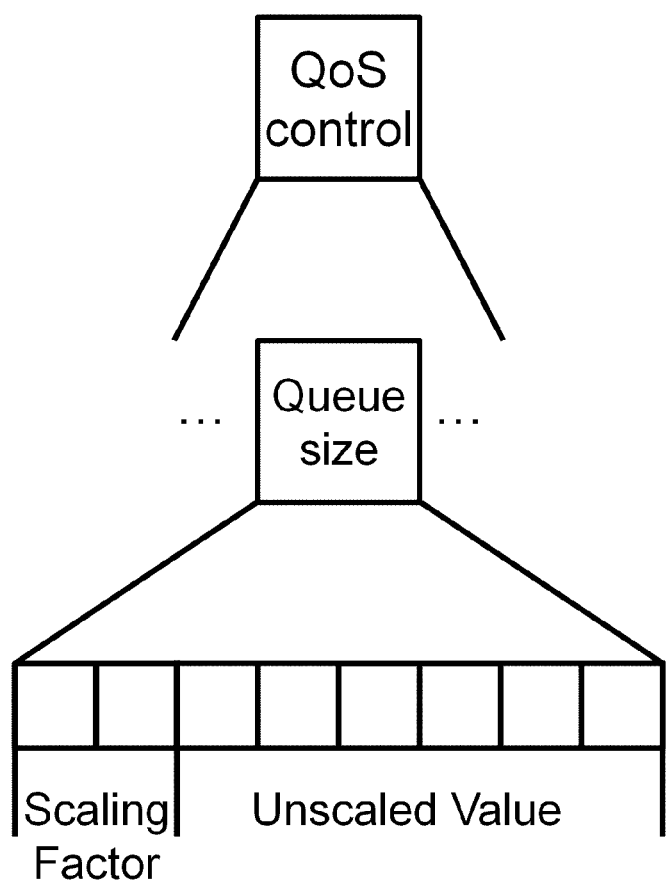
FIG. 29 shows a method of transmitting a BSR by a wireless communication terminal according to an embodiment of the present invention.

FIG. 29 shows a method of transmitting a BSR by a wireless communication terminal according to an embodiment of the present invention.

As described above, it is important for the base wireless communication terminal to determine a buffer status of the wireless communication terminal associated with the base wireless communication terminal. For this, the wireless communication terminal can transmit the BSR to the base wireless communication terminal using various methods. In more detail, the wireless communication terminal may transmit a buffer status report (BSR) using the Queue Size subfield of the QoS Control field of the QoS data. In this case, the BSR is information indicating a buffer state.

The wireless communication terminal may set a 2-bit Most Significant bits (MSB) as an SF subfield indicating a scaling factor in the Queue Size subfield, and set the remaining 6 bits as a UV subfield indicating an unscaled value. The specific format of the Queue Size subfield may be as shown in FIG. 29. In this case, the wireless communication terminal may obtain an approximation value for the total amount of the MPDU included in the A-MPDU currently being transmitted and the data stored in the buffer of the same TID according to a formula specified for each scaling factor, and insert the obtained approximation value into the Queue Size subfield. The wireless communication terminal may perform a round up operation while obtaining an approximation value for the total amount of data. The base wireless communication terminal may estimate the total amount of buffered data of the wireless communication terminal based on the queue size subfield received from the wireless communication terminal. In this case, since the wireless communication terminal determines the value of the queue size subfield based on the rounded-up total amount value of buffered data, even if the buffer of the wireless communication terminal corresponding to a specific TID is empty, the base wireless communication terminal may determine that data is buffered by a value within an error range due to a rounding up operation on a buffer of the wireless communication terminal corresponding to a specific TID. Accordingly, the base wireless communication terminal may additionally schedule the UL transmission of the wireless communication terminal unnecessarily. Therefore, the wireless communication terminal may obtain an approximation value for the total amount of the MPDU included in the A-MPDU currently being transmitted and the data stored in the buffer of the same TID by using a rounding down operation. In more detail, the base wireless communication terminal may obtain a value to be inserted into the queue size subfield according to the following rule.

When the value of the scaling factor is 0, the wireless communication terminal may round down the actual queue size to the nearest 16 octets and insert it into the UV subfield.

When the value of the scaling factor is 1, the wireless communication terminal may round down a value obtained by subtracting 1024 from the actual queue size to the nearest 256 octets and insert it into the UV subfield.

When the value of the scaling factor is 2, the wireless communication terminal may round down a value obtained by subtracting 17,408 from the actual queue size to the nearest 2048 octets and insert it into the UV subfield.

When the value of the scaling factor is 3, the wireless communication terminal can round down a value obtained by subtracting 148,480 from the actual queue size to the nearest 32,768 octets and insert it into the UV subfield.

In this case, the actual queue size may indicate the total amount of the MPDU included in the A-MPDU currently being transmitted and the data stored in the buffer of the same TID.

In this embodiment, even though the data transmitted from an AP to a terminal remains in the buffer of the wireless communication terminal, the base wireless communication terminal may not schedule UL transmission of the corresponding wireless communication terminal. However, the wireless communication terminal may transmit the data stored in the buffer through the SU transmission, and may transmit the data stored in the buffer together when uplink transmission for another TID is scheduled. Therefore, compared to a case where the wireless communication terminal inserts the value obtained based on the rounding up operation into the queue size subfield, a case where the wireless communication terminal inserts a value obtained based on a rounding down operation into the queue size subfield may be more efficient in terms of resource management.

In another specific embodiment, when the wireless communication terminal transmits all buffered data of the TID indicated by the Queue Size subfield, the wireless communication terminal may set the value of the Queue Size subfield to a predetermined value. In this case, the predetermined value may be 11111110.

Figure 30:
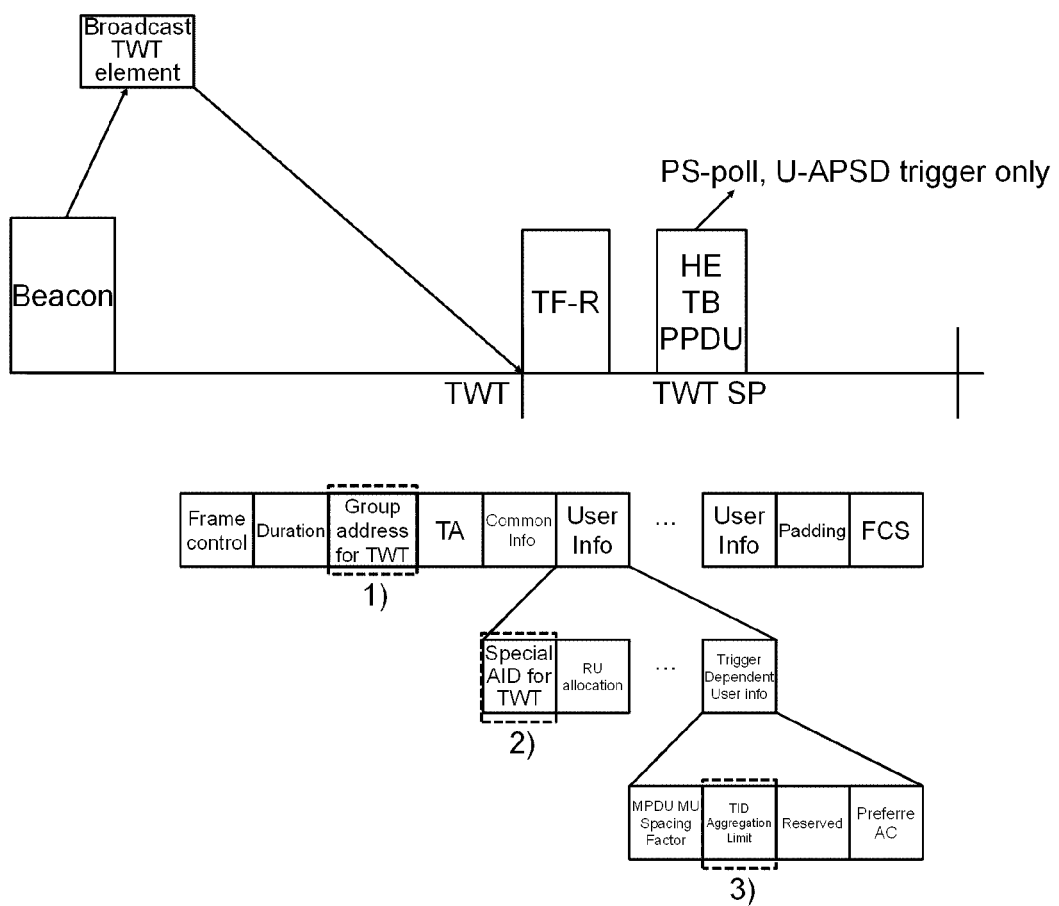
FIG. 30 shows a Target Wake Time (TWT) operation of a wireless communication terminal according to an embodiment of the present invention.

FIG. 30 shows a Target Wake Time (TWT) operation of a wireless communication terminal according to an embodiment of the present invention.

In the 802.11ah standard, a wireless communication terminal sets a TWT and a Service Period (SP) of a TWT, separately from a base wireless communication terminal. The base wireless communication terminal according to an embodiment of the present invention may signal information related to the TWT and the SP of the TWT to all wireless communication terminals of the BSS operated by the base wireless communication terminal. In more detail, the base wireless communication terminal may signal information related to the TWT and the SP of the corresponding TWT by using a beacon frame. The base wireless communication terminal may signal that it will transmit a trigger frame that triggers uplink transmission based random access in the SP of the TWT. In this case, the base wireless communication terminal sets the trigger field of the Request Type field to one in the TWT element and the TWT Flow Identifier field to a value other than one so that it may indicate that a trigger frame triggering uplink transmission based random access is to be transmitted in the SP of the TWT. In such an embodiment, the wireless communication terminal supporting random access may perform a TWT operation without additional negotiation with the base wireless communication terminal. In more detail, the wireless communication terminal may maintain a doze state until the TWT and transit to an awake state in the TWT. In this case, the wireless communication terminal may transmit a frame indicating that the wireless communication terminal is awake state to the base wireless communication terminal. In this case, the frame indicating the awake state may be a PS-poll frame or an Unscheduled Automatic Power Save Delivery (U-APSD) trigger frame.

In addition, the base wireless communication terminal may transmit, in the TWT, a trigger frame for triggering the transmission of information on the buffer status of the wireless communication terminal in the awake state. In this case, the information on the buffer state may be a bufferable unit (BU). In addition, the trigger frame for triggering the transmission of information on the buffer status may trigger uplink transmission based random access of all wireless communication terminals of the BSS operated by the base wireless communication terminal as well as the wireless communication terminal performing the TWT operation. Therefore, the random access success rate of the wireless communication terminal performing the TWT operation can be very low. Accordingly, the wireless communication terminal may set the Receiver Address (RA) field of the trigger frame transmitted at the TWT as a group address for the wireless communication terminal participating in the TWT operation. In more detail, the base wireless communication terminal may set the RA field of the trigger frame transmitted at the TWT as shown in 1) of FIG. 30. In addition, the base wireless communication terminal may signal a group address for the wireless communication terminal participating in the TWT operation using the TWT element. In this embodiment, when the wireless communication terminal receives a trigger frame in which the value of the RA field is a group address for the wireless communication terminal participating in the TWT operation, only the wireless communication terminal that is to exchange a frame with the base wireless communication terminal in the TWT SP may attempt random access based on the trigger frame.

In another specific embodiment, the base wireless communication terminal may set the value of the AID12 subfield of the User Info field of the trigger frame transmitted at the TWT to a predetermined value indicating the wireless communication terminal participating in the TWT operation. In this case, the predetermined value may be a reserved value that is not allocated for another purpose. For example, the predetermined value may be 2044. In more detail, the base wireless communication terminal may set the value of the AID12 subfield of the User Info field transmitted at the TWT as shown in 2) of FIG. 30. When the value of the AID12 subfield of the User Info field of the trigger frame received by the wireless communication terminal is a predetermined value, only a wireless communication terminal for exchanging a frame with the base wireless communication terminal in the TWT SP may attempt random access in the RU indicated by the corresponding User Info field.

In another specific embodiment, the base wireless communication terminal may set a value of a specific subfield of the Trigger Dependent User Info field of the User Info field of the trigger frame transmitted at the TWT to a predetermined value. In this case, a specific subfield of the Trigger Dependent User Info field may be a TID Aggregation Limit field. In this case, the TID Aggregation limit field may be a field used to indicate the limit of the number of TIDs corresponding to data that can be aggregated in the A-MPDU transmitted based on the trigger frame. For example, the base wireless communication terminal may set the value of the TID Aggregation Limit field to six. In more detail, the base wireless communication terminal may set the TID Aggregation Limit field of the Trigger Dependent User Info field of the trigger frame transmitted in the TWT as shown in 3) of FIG. 30. In addition, a specific subfield of the Trigger Dependent User Info field may be one of the reserved fields. When the value of a specific subfield of the Trigger Dependent User Info field of the User Info field received by the wireless communication terminal is a predetermined value, only a wireless communication terminal for exchanging a frame with the base wireless communication terminal in the TWT SP may attempt random access in the RU indicated by the corresponding User Info field.

In the above embodiments, the wireless communication terminal that is to exchange a frame with the base wireless communication terminal in the TWT SP may transmit only a frame indicating that the wireless communication terminal is in an awake state by using random access. In this case, the frame indicating that the wireless communication terminal is in the awake state may be a PS-poll frame or a U-APSD trigger frame.

Figure 31:
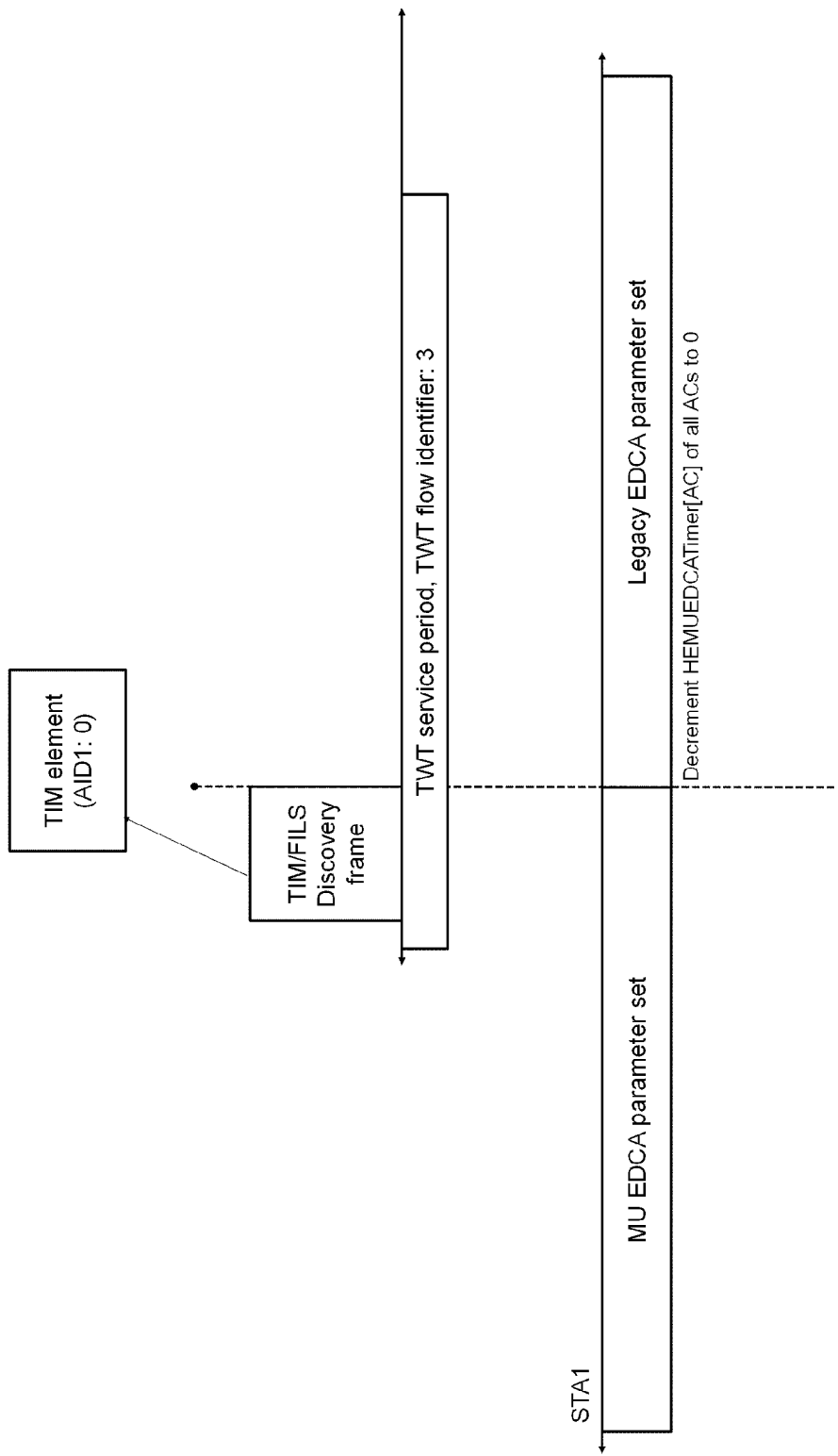
FIG. 31 shows that a wireless communication terminal sets a MU EDCA parameter in a TWT operation according to an embodiment of the present invention.

FIG. 31 shows that a wireless communication terminal sets a MU EDCA parameter in a TWT operation according to an embodiment of the present invention.

In the TWT operation, the wireless communication terminal may perform an Opportunistic Power Saving (OPS) operation under a predetermined condition. The base wireless communication terminal sets the TWT Flow Identifier field to three so that it may indicate that the base wireless communication terminal supports the OPS operation. The base wireless communication terminal may signal scheduling information on all wireless communication terminals participating in the OPS TWT using the TIME element at the start time point of the OPS TWT SP. The base wireless communication terminal deactivates the bit corresponding to the AID of the wireless communication terminal in the bitmap of the TIM element to indicate a wireless communication terminal for which transmission is not scheduled in the corresponding OPS TWT. Also, the base wireless communication terminal may signal identically to the existing TIM element for the wireless communication terminal not participating in the OPS TWT. A wireless communication terminal in which transmission is not scheduled in the corresponding OPS TWT may maintain a doze state until the next OPS TWT. When the corresponding wireless communication terminal needs additional uplink transmission, the corresponding wireless communication terminal may attempt UL SU transmission by individually operating an EDCA.

In this case, when the wireless communication terminal uses the MU EDCA parameter set, the wireless communication terminal may not expect UL MU scheduling, and the probability of channel access success of the wireless communication terminal may be too low. Therefore, a situation in which the wireless communication terminal cannot transmit data to be urgently transmitted may occur. In a specific embodiment, when the wireless communication terminal receives a TIM element including a bitmap in which a bit corresponding to the wireless communication terminal is inactivated in the OPS TWT SP, the wireless communication terminal may stop using the MU EDCA parameter set. In more detail, when the wireless communication terminal receives a TIM element including a bitmap in which a bit corresponding to the wireless communication terminal is inactivated in the OPS TWT SP, the wireless communication terminal may set the MU EDCA timer to 0. In a specific embodiment, in more detail, when the wireless communication terminal receives a TIM element including a bitmap in which a bit corresponding to the wireless communication terminal is inactivated in the OPS TWT SP, the wireless communication terminal may stop the application of the MU EDCA parameter set for an AC whose value of the MU EDCA timer is faster than the next OPS TWT. In a specific embodiment, in more detail, when the wireless communication terminal receives a TIM element including a bitmap in which a bit corresponding to the wireless communication terminal is inactivated in the OPS TWT SP, the wireless communication terminal may set the MU EDCA timer to 0 at an AC whose value of the MU EDCA timer is faster than the next OPS TWT. This is because there may be too many wireless communication terminals for which no UL transmission is scheduled in the OPS TWT SP. Accordingly, this is because when all the wireless communication terminals not scheduled for UL transmission stop the application of the MU EDCA parameter, the channel access probability of the base wireless communication terminal may be too low.

In the above embodiments, when the wireless communication terminal stops applying the MU EDCA parameter set, the wireless communication terminal may set the EDCA parameter set according to the most recently received EDCA parameter set element. When the wireless communication terminal does not receive the EDCA parameter set element, the wireless communication terminal may set the EDCA parameter set according to the default EDCA parameter set.

In the embodiment of FIG. 31, the first station STA1 applies the MU EDCA parameter set. The first station STA1 receives a TIM/FILS discovery frame including a TIM element from the AP. In this case, the bit corresponding to the first station STA1 in the bitmap of the TIM element is set to 0. Therefore, the wireless communication terminal stops the application of the MU EDCA parameter set by setting the MU EDCA parameters of all ACs to 0.

Figure 32:
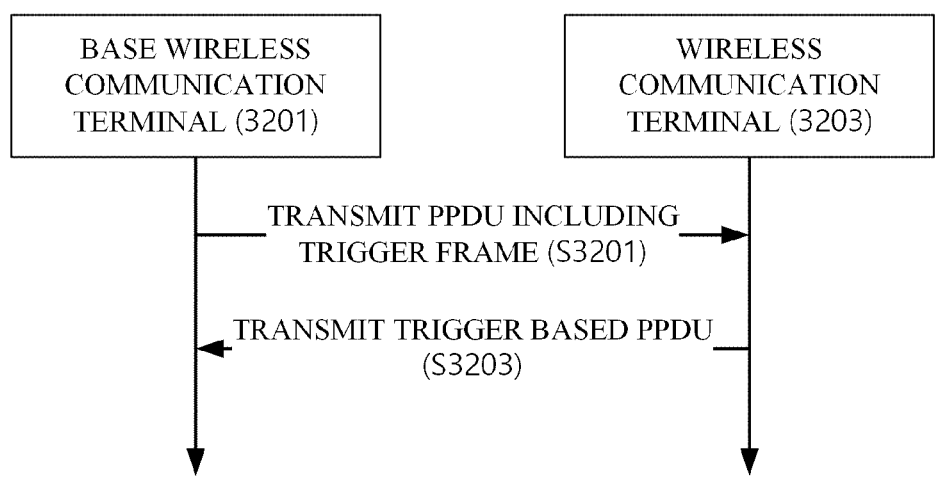
FIG. 32 shows operations of a base wireless communication terminal and a wireless communication terminal according to an embodiment of the present invention.

FIG. 32 shows operations of a base wireless communication terminal and a wireless communication terminal according to an embodiment of the present invention.

The base wireless communication terminal 3201 transmits a PPDU including a trigger frame for triggering transmission of at least one wireless communication terminal 3203 (S3201). In more detail, the base wireless communication terminal 3201 may generate a trigger frame for triggering uplink transmission based random access of at least one wireless communication terminal 3203, and may insert and transmit the trigger frame. In this case, the trigger frame may trigger uplink transmission based random access of the wireless communication terminal 3203 unassociated with the BSS operated by the base wireless communication terminal 3201.

When the trigger frame triggers uplink transmission based random access of the wireless communication terminal 3203 unassociated with the BSS operated by the base wireless communication terminal 3201, the base wireless communication terminal 3201 may transmit a PPDU including a trigger frame using a PPDU format including a field indicating a BSS color. In more detail, when the trigger frame triggers uplink transmission based random access of the wireless communication terminal 3203 unassociated with the BSS operated by the base wireless communication terminal 3201, the base wireless communication terminal 3201 may insert the trigger frame into the HE PPDU. In the above embodiments, the method for setting a value of the field indicating the BSS color may follow the embodiments described with reference to FIGS. 14 to 15.

Further, when the trigger frame triggers random access of the wireless communication terminal 3203 unassociated with the BSS operated by the base wireless communication terminal 3201, the base wireless communication terminal 3201 may insert a field indicating the BSS color in the trigger frame. In this case, the base wireless communication terminal 3201 may insert a field indicating a BSS color into a User Info field signaling information individually applied to one or more wireless communication terminals 3203 for which a trigger frame triggers transmission. In another specific embodiment, the base wireless communication terminal 3201 may insert a field indicating the BSS color into a Common Info field signaling information commonly applied to one or more wireless communication terminals 3203 for which a trigger frame triggers transmission.

The base wireless communication terminal 3201 may set a specific field of the trigger frame to a value of a predetermined AID so that it may trigger random access of the wireless communication terminal 3203 that is unassociated with the BSS operated by the base wireless communication terminal 3201.

The base wireless communication terminal 3201 may trigger uplink transmission based random access of the wireless communication terminal 3203 that is unassociated with the BSS operated by the base wireless communication terminal 3201 according to the embodiments described with reference to FIG. 16.

Also, the base wireless communication terminal 3201 may transmit a trigger frame based on a predetermined schedule. In more detail, the base wireless communication terminal 3201 may transmit a trigger frame according to the TWT operation described above. The trigger frame may trigger random access uplink based transmission of the wireless communication terminal 3203 performing a power saving operation based on a predetermined schedule. In this case, the wireless communication terminal 3203 that performs the power saving operation based on the predetermined schedule may maintain the doze state until the TWT and change to the awake state in the TWT as described above. The base wireless communication terminal 3201 may set the receiver address field of the trigger frame to a group address indicating the wireless communication terminal 3203 performing a power saving operation based on the predetermined schedule. In another specific embodiment, the base wireless communication terminal 3201 may set an AID value indicated by a User Info field corresponding to a frequency band allocated for uplink transmission based random access to a predetermined value indicating the wireless communication terminal 3203 that performs a power saving operation based on the predetermined schedule. For example, the predetermined value may be 2044. In this case, the predetermined value may be a reserved value that is not allocated for another purpose. In another specific embodiment, the base wireless communication terminal 3201 sets a value of one of the fields determined according to the type of the trigger frame of the User Info field corresponding to the frequency band allocated for uplink transmission based random access to a predetermined value indicating the wireless communication terminal 3203 that performs a power saving operation based on a predetermined schedule. The base wireless communication terminal 3201 sets a TID aggregation limit field included in a User Info field corresponding to a frequency band allocated for uplink transmission based random access to a predetermined value indicating the wireless communication terminal 3203 that performs a power saving operation based on a predetermined schedule. In this case, the TID Aggregation limit field may be a field used to indicate the limit of the number of TIDs corresponding to data that can be aggregated in the A-MPDU transmitted based on the trigger frame. Specifically, the base wireless communication terminal 3201 may operate as in an embodiment described with reference to FIGS. 30 to 31.

The wireless communication terminal 3203 receives a PPDU including a trigger frame that triggers a transmission to the base wireless communication terminal 3201 from the base wireless communication terminal 3201. The wireless communication terminal 3203 transmits a trigger-based PPDU to the base wireless communication terminal 3201 based on the trigger frame (S3203). When the PPDU including the trigger frame indicates a Basic Service Set (BSS) color, the wireless communication terminal 3203 may set a value of the BSS color indicated by the trigger-based PPDU based on the value of the BSS color indicated by the PPDU including the trigger frame. If the PPDU containing the trigger frame does not indicate BSS color, the wireless communication terminal 3203 may set a value of the BSS color indicated by the trigger-based PPDU according to the active BSS color of the wireless communication terminal 3203. In this case, the active BSS color may indicate the BSS color actually used by the wireless communication terminal 3203 as described above. In this embodiment, the wireless communication terminal 3203 may receive information on the BSS color change from the base wireless communication terminal. In addition, when the BSS color change time point indicated by the information on the BSS color change is reached, the wireless communication terminal 3203 may set the active BSS color to a value of the BSS color indicated by the information on the BSS color change. In this case, the BSS color change time point may be set based on a target beacon transmission time transmitted by the base wireless communication terminal. In addition, specific operations of the wireless communication terminal 3203 may follow the embodiments described with reference to FIGS. 22 to 23.

When the PPDU indicates the partial BSS color, the wireless communication terminal 3203 may determine whether the PPDU is an Intra-BSS PPDU or an Inter-BSS PPDU based on the value of the partial BSS color when the value of the Partial AID field is non-zero. In this case, specific operations of the wireless communication terminal 3203 may follow the embodiments described with reference to FIGS. 18 to 19. The embodiment in which the wireless communication terminal 3203 determines whether the Intra-BSS or the Inter-BSS may be applied to the PPDU not including the trigger frame as well as when receiving the PPDU including the trigger frame as described above.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal wirelessly communicating with a base wireless communication terminal, the wireless communication terminal comprising:
   a transceiver configured to transmit and receive wireless signals; and
   a processor configured to process the wireless signals, wherein the processor is configured to:
   receive a physical layer protocol data unit (PPDU) including a trigger frame for triggering transmission to the base wireless communication terminal, wherein the trigger frame includes an identifier which identifies a wireless communication terminal which is triggered by the trigger frame, and the trigger frame indicates a resource unit (RU) which is allocated to the wireless communication terminal,
   when a format of the PPDU including the trigger frame is a PPDU format in which at least one of physical layer signaling fields including a field for indicating a Basic Service Set (BSS) color is included, set a value of a BSS color to be indicated by a trigger-based PPDU based on the BSS color indicated by the field,
   when the format of the PPDU including the trigger frame is a PPDU format in which any physical layer signaling field including the field for indicating the BSS color is not included, set the value of the BSS color to be indicated by the trigger-based PPDU according to an active BSS color of the wireless communication terminal, and
   transmit the trigger-based PPDU based on the trigger frame,
   wherein the active BSS color is a BSS color actually used by the wireless communication terminal and set by an Operation element,
   wherein when the wireless communication terminal receives information on a BSS color change from the base wireless communication terminal and a BSS color change time point indicated by the information on the BSS color change is reached, the active BSS color is set to a value of a BSS color indicated by the information on the BSS color change, and
   wherein the BSS color is one of identifiers identifying a BSS.

2. The wireless communication terminal of claim 1, wherein the BSS color change time point is set based on a target beacon transmission time transmitted by the base wireless communication terminal.

3. The wireless communication terminal of claim 1, wherein if the PPDU indicates a partial Basic Service Set (BSS) color using a Partial Association ID (AID) field, the processor determines whether the PPDU is an Intra-BSS PPDU or an Inter-BSS PPDU based on the partial BSS color when the value of the partial AID field is non-zero,
   wherein the partial AID field is a signaling field used to indicate a value obtained based on an AID value.

4. A method of operating a wireless communication terminal wirelessly communicating with a base wireless communication terminal, the method comprising:
   receiving a physical layer protocol data unit (PPDU) including a trigger frame for triggering transmission to the base wireless communication terminal, wherein the trigger frame includes an identifier which identifies a wireless communication terminal which is triggered by the trigger frame, and the trigger frame indicates a resource unit (RU) which is allocated to the wireless communication terminal,
   when a format of the PPDU including the trigger frame is a PPDU format in which at least one of physical layer signaling fields including a field for indicating a Basic Service Set (BSS) color is included, setting a value of a BSS color to be indicated by a trigger-based PPDU based on the BSS color indicated by the field,
   when the format of the PPDU including the trigger frame is a PPDU format in which any physical layer signaling field including the field for indicating the BSS color is not included, setting the value of the BSS color to be indicated by the trigger-based PPDU according to an active BSS color of the wireless communication terminal, and
   transmitting the trigger-based PPDU based on the trigger frame,
   wherein the active BSS color is a BSS color actually used by the wireless communication terminal and set by an Operation element,
   wherein when the wireless communication terminal receives information on a BSS color change from the base wireless communication terminal and a BSS color change time point indicated by the information on the BSS color change is reached, the active BSS color is set to a value of a BSS color indicated by the information on the BSS color change, and
   wherein the BSS color is one of identifiers identifying a BSS.

* * * * *